United States Patent
Tang et al.

(10) Patent No.: US 9,851,537 B2
(45) Date of Patent: *Dec. 26, 2017

(54) OPTICAL IMAGE CAPTURING SYSTEM

(71) Applicant: ABILITY OPTO-ELECTRONICS TECHNOLOGY CO., LTD., Taichung (TW)

(72) Inventors: Nai-Yuan Tang, Taichung (TW); Yeong-Ming Chang, Taichung (TW)

(73) Assignee: Ability Opto-Electronics Technology Co., Ltd., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/159,115

(22) Filed: May 19, 2016

(65) Prior Publication Data

US 2017/0168268 A1   Jun. 15, 2017

(30) Foreign Application Priority Data

Dec. 9, 2015  (TW) .............................. 104141307 A

(51) Int. Cl.
| | |
|---|---|
| *G02B 13/18* | (2006.01) |
| *G02B 9/64* | (2006.01) |
| *G02B 13/00* | (2006.01) |
| *G02B 15/177* | (2006.01) |
| *G02B 3/04* | (2006.01) |

(Continued)

(52) U.S. Cl.
CPC ........... *G02B 13/0045* (2013.01); *G02B 9/64* (2013.01); *G02B 27/005* (2013.01); *G02B 3/04* (2013.01); *G02B 5/005* (2013.01); *G02B 13/002* (2013.01); *G02B 13/04* (2013.01); *G02B 13/18* (2013.01); *G02B 15/177* (2013.01); *G02B 27/0081* (2013.01); *G02B 27/646* (2013.01);

(Continued)

(58) Field of Classification Search
CPC .. G02B 13/0045; G02B 27/646; G02B 13/18; G02B 9/64; G02B 15/177; G02B 3/04; G02B 5/005; G02B 13/04; G02B 13/002; G02B 2003/0093; G02B 27/0081; G03B 2205/0007; G03B 2217/002
USPC ................ 359/557, 708, 713, 740, 751, 755
See application file for complete search history.

(56) References Cited

U.S. PATENT DOCUMENTS

| | | | | |
|---|---|---|---|---|
| 2015/0378131 | A1* | 12/2015 | Tang ........................ | G02B 9/64 359/708 |
| 2016/0131874 | A1* | 5/2016 | Tang .................. | G02B 13/0045 359/708 |
| 2016/0299319 | A1* | 10/2016 | Tang ........................ | G02B 9/64 359/708 |

FOREIGN PATENT DOCUMENTS

| | | |
|---|---|---|
| CN | 203595858 U | 5/2014 |
| CN | 104950424 A | 9/2015 |

(Continued)

*Primary Examiner* — Evelyn A Lester
(74) *Attorney, Agent, or Firm* — Lynette Wylie; Apex Juris, PLLC.

(57) ABSTRACT

An optical image capturing system includes, along the optical axis in order from an object side to an image side, a first lens, a second lens, a third lens, a fourth lens, a fifth lens, a sixth lens, and a seventh lens. At least one lens among the first to the sixth lenses has positive refractive force. The seventh lens can have negative refractive force, wherein both surfaces thereof can be aspheric, and at least one surface thereof has an inflection point. The lenses in the optical image capturing system which have refractive power include the first to the seventh lenses. The optical image capturing system can increase aperture value and improve the imagining quality for use in compact cameras.

25 Claims, 24 Drawing Sheets

(51) Int. Cl.
G02B 5/00 (2006.01)
G02B 3/00 (2006.01)
G02B 13/04 (2006.01)
G02B 27/64 (2006.01)
G02B 27/00 (2006.01)

(52) U.S. Cl.
CPC ............ G02B 2003/0093 (2013.01); G03B 2205/0007 (2013.01); G03B 2217/002 (2013.01)

(56) References Cited

FOREIGN PATENT DOCUMENTS

| | | |
|---|---|---|
| TW | 201403166 A | 1/2014 |
| TW | 201407187 A | 2/2014 |
| TW | 1510804 B | 12/2015 |

\* cited by examiner

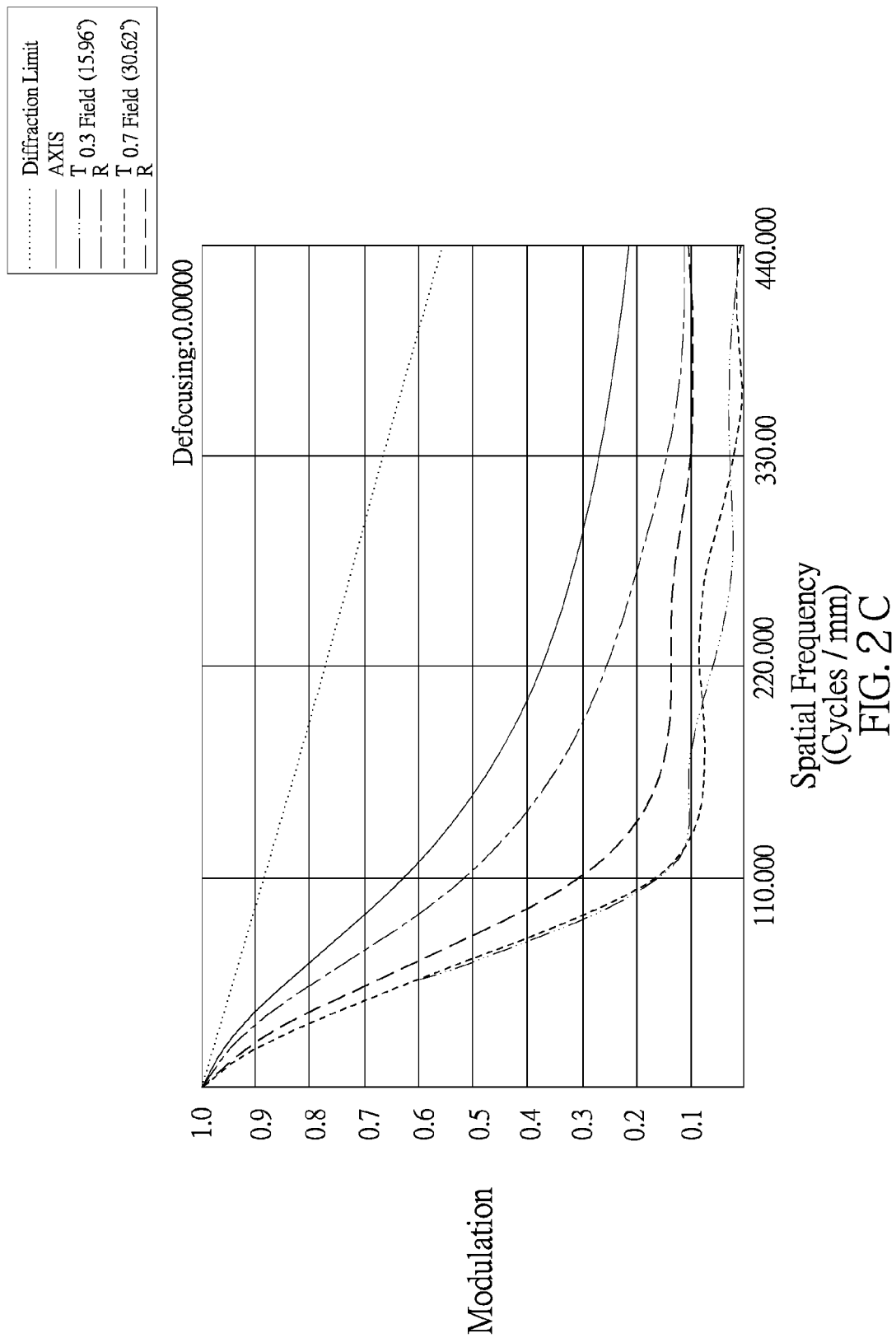

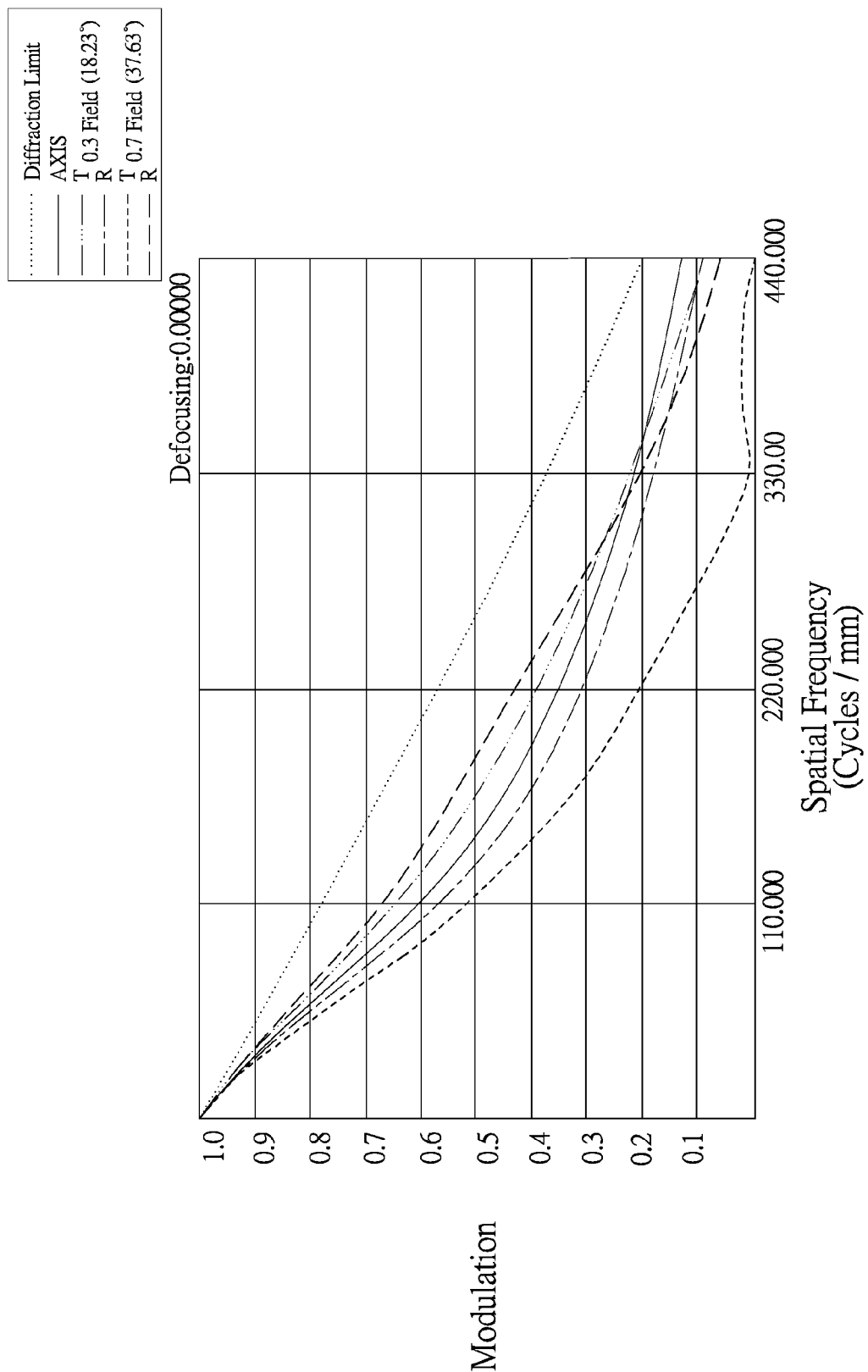

— 1 —

OPTICAL IMAGE CAPTURING SYSTEM

The current application claims a foreign priority to application number 104141305 filed on Dec. 9, 2015 in Taiwan.

BACKGROUND OF THE INVENTION

1. Technical Field

The present invention generally relates to an optical system, and more particularly to a compact optical image capturing system for an electronic device.

2. Description of Related Art

In recent years, with the rise of portable electronic devices having camera functionalities, the demand for an optical image capturing system is raised gradually. The image sensing device of the ordinary photographing camera is commonly selected from charge coupled device (CCD) or complementary metal-oxide semiconductor sensor (CMOS Sensor). Also, as advanced semiconductor manufacturing technology enables the minimization of the pixel size of the image sensing device, the development of the optical image capturing system towards the field of high pixels. Therefore, the requirement for high imaging quality is rapidly raised.

The conventional optical system of the portable electronic device usually has five or sixth lenses. However, the optical system is asked to take pictures in a dark environment, in other words, the optical system is asked to have a large aperture. The conventional optical system provides high optical performance as required.

It is an important issue to increase the quantity of light entering the lens. Also, the modern lens is also asked to have several characters, including high image quality.

BRIEF SUMMARY OF THE INVENTION

The aspect of embodiment of the present disclosure directs to an optical image capturing system and an optical image capturing lens which use combination of refractive powers, convex and concave surfaces of seven-piece optical lenses (the convex or concave surface in the disclosure denotes the geometrical shape of an image-side surface or an object-side surface of each lens on an optical axis) to increase the quantity of incoming light of the optical image capturing system, and to improve imaging quality for image formation, so as to be applied to minimized electronic products.

The term and its definition to the lens parameter in the embodiment of the present are shown as below for further reference.

The lens parameter related to a length or a height in the lens:

A maximum height for image formation of the optical image capturing system is denoted by HOI. A height of the optical image capturing system is denoted by HOS. A distance from the object-side surface of the first lens to the image-side surface of the seventh lens is denoted by InTL. A distance from the first lens to the second lens is denoted by IN12 (instance). A central thickness of the first lens of the optical image capturing system on the optical axis is denoted by TP1 (instance).

The lens parameter related to a material in the lens:

An Abbe number of the first lens in the optical image capturing system is denoted by NA1 (instance). A refractive index of the first lens is denoted by Nd1 (instance).

The lens parameter related to a view angle of the lens:

A view angle is denoted by AF. Half of the view angle is denoted by HAF. A major light angle is denoted by MRA.

The lens parameter related to exit/entrance pupil in the lens:

An entrance pupil diameter of the optical image capturing system is denoted by HEP. For any surface of any lens, a maximum effective half diameter (EHD) is a perpendicular distance between an optical axis and a crossing point on the surface where the incident light with a maximum viewing angle of the system passing the very edge of the entrance pupil. For example, the maximum effective half diameter of the object-side surface of the first lens is denoted by EHD11, the maximum effective half diameter of the image-side surface of the first lens is denoted by EHD12, the maximum effective half diameter of the object-side surface of the second lens is denoted by EHD21, the maximum effective half diameter of the image-side surface of the second lens is denoted by EHD22, and so on.

The lens parameter related to a depth of the lens shape:

A distance in parallel with the optical axis from a point where the optical axis passes through to an end point of the maximum effective semi diameter on the object-side surface of the seventh lens is denoted by InRS71 (the depth of the maximum effective semi diameter). A distance in parallel with the optical axis from a point where the optical axis passes through to an end point of the maximum effective semi diameter on the image-side surface of the seventh lens is denoted by InRS72 (the depth of the maximum effective semi diameter). The depth of the maximum effective semi diameter (sinkage) on the object-side surface or the image-side surface of any other lens is denoted in the same manner.

The lens parameter related to the lens shape:

A critical point C is a tangent point on a surface of a specific lens, and the tangent point is tangent to a plane perpendicular to the optical axis and the tangent point cannot be a crossover point on the optical axis. Following the above description, a distance perpendicular to the optical axis between a critical point C51 on the object-side surface of the fifth lens and the optical axis is HVT51 (instance), and a distance perpendicular to the optical axis between a critical point C52 on the image-side surface of the fifth lens and the optical axis is HVT52 (instance). A distance perpendicular to the optical axis between a critical point C61 on the object-side surface of the sixth lens and the optical axis is HVT61 (instance), and a distance perpendicular to the optical axis between a critical point C62 on the image-side surface of the sixth lens and the optical axis is HVT62 (instance). A distance perpendicular to the optical axis between a critical point on the object-side or image-side surface of other lenses, such as the seventh lens, the optical axis is denoted in the same manner.

The object-side surface of the seventh lens has one inflection point IF711 which is nearest to the optical axis, and the sinkage value of the inflection point IF711 is denoted by SGI711 (instance). A distance perpendicular to the optical axis between the inflection point IF711 and the optical axis is HIF711 (instance). The image-side surface of the seventh lens has one inflection point IF721 which is nearest to the optical axis, and the sinkage value of the inflection point IF721 is denoted by SGI721 (instance). A distance perpendicular to the optical axis between the inflection point IF721 and the optical axis is HIF721 (instance).

The object-side surface of the seventh lens has one inflection point IF712 which is the second nearest to the optical axis, and the sinkage value of the inflection point IF712 is denoted by SGI712 (instance). A distance perpendicular to the optical axis between the inflection point IF712 and the optical axis is HIF712 (instance). The image-side surface of the seventh lens has one inflection point IF722 which is the second nearest to the optical axis, and the sinkage value of the inflection point IF722 is denoted by SGI722 (instance). A distance perpendicular to the optical axis between the inflection point IF722 and the optical axis is HIF722 (instance).

The object-side surface of the seventh lens has one inflection point IF713 which is the third nearest to the optical axis, and the sinkage value of the inflection point IF713 is denoted by SGI713 (instance). A distance perpendicular to the optical axis between the inflection point IF713 and the optical axis is HIF713 (instance). The image-side surface of the seventh lens has one inflection point IF723 which is the third nearest to the optical axis, and the sinkage value of the inflection point IF723 is denoted by SGI723 (instance). A distance perpendicular to the optical axis between the inflection point IF723 and the optical axis is HIF723 (instance).

The object-side surface of the seventh lens has one inflection point IF714 which is the fourth nearest to the optical axis, and the sinkage value of the inflection point IF714 is denoted by SGI714 (instance). A distance perpendicular to the optical axis between the inflection point IF714 and the optical axis is HIF714 (instance). The image-side surface of the seventh lens has one inflection point IF724 which is the fourth nearest to the optical axis, and the sinkage value of the inflection point IF724 is denoted by SGI724 (instance). A distance perpendicular to the optical axis between the inflection point IF724 and the optical axis is HIF724 (instance).

An inflection point, a distance perpendicular to the optical axis between the inflection point and the optical axis, and a sinkage value thereof on the object-side surface or image-side surface of other lenses is denoted in the same manner.

The lens parameter related to an aberration:

Optical distortion for image formation in the optical image capturing system is denoted by ODT. TV distortion for image formation in the optical image capturing system is denoted by TDT. Further, the range of the aberration offset for the view of image formation may be limited to 50%-100% field. An offset of the spherical aberration is denoted by DFS. An offset of the coma aberration is denoted by DFC.

A modulation transfer function (MTF) graph of an optical image capturing system is used to test and evaluate the contrast and sharpness of the generated images. The vertical axis of the coordinate system of the MTF graph represents the contrast transfer rate, of which the value is between 0 and 1, and the horizontal axis of the coordinate system represents the spatial frequency, of which the unit is cycles/mm or lp/mm, i.e., line pairs per millimeter. Theoretically, a perfect optical image capturing system can present all detailed contrast and every line of an object in an image. However, the contrast transfer rate of a practical optical image capturing system along a vertical axis thereof would be less than 1. In addition, peripheral areas in an image would have a poorer realistic effect than a center area thereof has. For visible spectrum, the values of MTF in the spatial frequency of 55 cycles/mm at the optical axis, 0.3 field of view, and 0.7 field of view on an image plane are respectively denoted by MTFE0, MTFE3, and MTFE7; the values of MTF in the spatial frequency of 110 cycles/mm at the optical axis, 0.3 field of view, and 0.7 field of view on an image plane are respectively denoted by MTFQ0, MTFQ3, and MTFQ7; the values of MTF in the spatial frequency of 220 cycles/mm at the optical axis, 0.3 field of view, and 0.7 field of view on an image plane are respectively denoted by MTFH0, MTFH3, and MTFH7; the values of MTF in the spatial frequency of 440 cycles/mm at the optical axis, 0.3 field of view, and 0.7 field of view on the image plane are respectively denoted by MTF0, MTF3, and MTF7. The three aforementioned fields of view respectively represent the center, the inner field of view, and the outer field of view of a lens, and, therefore, can be used to evaluate the performance of an optical image capturing system. If the optical image capturing system provided in the present invention corresponds to photosensitive components which provide pixels having a size no large than 1.12 micrometer, a quarter of the spatial frequency, a half of the spatial frequency (half frequency), and the full spatial frequency (full frequency) of the MTF diagram are respectively at least 110 cycles/mm, 220 cycles/mm and 440 cycles/mm.

If an optical image capturing system is required to be able also to image for infrared spectrum, e.g., to be used in low-light environments, then the optical image capturing system should be workable in wavelengths of 850 nm or 800 nm. Since the main function for an optical image capturing system used in low-light environment is to distinguish the shape of objects by light and shade, which does not require high resolution, it is appropriate to only use spatial frequency less than 110 cycles/mm for evaluating the performance of optical image capturing system in the infrared spectrum. When the aforementioned wavelength of 850 nm focuses on the image plane, the contrast transfer rates (i.e., the values of MTF) in spatial frequency of 55 cycles/mm at the optical axis, 0.3 field of view, and 0.7 field of view on an image plane are respectively denoted by MTFI0, MTFI3, and MTFI7. However, infrared wavelengths of 850 nm or 800 nm are far away from the wavelengths of visible light; it would be difficult to design an optical image capturing system capable of focusing visible and infrared light (i.e., dual-mode) at the same time and achieving certain performance.

The present invention provides an optical image capturing system, which is capable of focusing visible and infrared light (i.e., dual-mode) at the same time and achieving certain performance, wherein the seventh lens thereof is provided with an inflection point at the object-side surface or at the image-side surface to adjust the incident angle of each view field and modify the ODT and the TDT. In addition, the surfaces of the seventh lens are capable of modifying the optical path to improve the imagining quality.

The optical image capturing system of the present invention includes a first lens, a second lens, a third lens, a fourth lens, a fifth lens, a sixth lens, a seventh lens, and an image plane in order along an optical axis from an object side to an image side. The first lens has refractive power. The optical image capturing system satisfies:

$1.0 \leq f/HEP \leq 10.0$; $0 \deg < HAF \leq 150 \deg$; and
$0.5 \leq SETP/STP < 1$;

where f1, f2, f3, f4, f5, f6, and f7 are respectively a focal length of the first lens to the seventh lens; f is a focal length of the optical image capturing system; HEP is an entrance pupil diameter of the optical image capturing system; HOS is a distance between the object-side surface of the first lens and the image plane; InTL is a distance from the object-side surface of the first lens to the image-side surface of the seventh lens on the optical axis; HAF is a half of the maximum field angle of the optical image capturing system; ETP1, ETP2, ETP3, ETP4, ETP5, ETP6, and ETP7 are respectively a thickness in parallel with the optical axis at a height of ½ HEP of the first lens to the seventh lens, wherein SETP is a sum of the aforementioned ETP1 to ETP7; TP1, TP2, TP3, TP4, TP5, TP6, and TP7 are respectively a thickness at the optical axis of the first lens to the seventh lens, wherein STP is a sum of the aforementioned TP1 to TP7.

The present invention further provides an optical image capturing system, including a first lens, a second lens, a third lens, a fourth lens, a fifth lens, a sixth lens, a seventh lens, and an image plane in order along an optical axis from an object side to an image side. The first lens has refractive power. The second lens has refractive power. The third lens has refractive power. The fourth lens has refractive power. The fifth lens has refractive power. The sixth lens has refractive power. The seventh lens has refractive power, and the object-side surface and the image-side surface thereof are both aspheric. Each lens of at least two lenses among the first lens to the seventh lens has at least an inflection point on at least a surface thereof. The optical image capturing system satisfies:

$$1.0 \leq f/HEP \leq 10.0;\ 0\ \deg < HAF \leq 150\ \deg;\ \text{and}$$
$$0.2 \leq EIN/ETL < 1;$$

where f1, f2, f3, f4, f5, f6, and f7 are respectively a focal length of the first lens to the seventh lens; f is a focal length of the optical image capturing system; HEP is an entrance pupil diameter of the optical image capturing system; HOS is a distance between a point on an object-side surface, which face the object side, of the first lens where the optical axis passes through and a point on the image plane where the optical axis passes through; InTL is a distance from the object-side surface of the first lens to the image-side surface of the seventh lens on the optical axis; HAF is a half of the maximum field angle of the optical image capturing system; ETL is a distance in parallel with the optical axis between a coordinate point at a height of ½ HEP on the object-side surface of the first lens and the image plane; EIN is a distance in parallel with the optical axis between the coordinate point at the height of ½ HEP on the object-side surface of the first lens and a coordinate point at a height of ½ HEP on the image-side surface of the seventh lens.

The present invention further provides an optical image capturing system, including a first lens, a second lens, a third lens, a fourth lens, a fifth lens, a sixth lens, a seventh lens, and an image plane, in order along an optical axis from an object side to an image side. The number of the lenses having refractive power in the optical image capturing system is seven. Each lens of at least three lenses among the first to the seventh lenses has at least an inflection point on at least one surface thereof. The first lens has positive refractive power, and the second lens has refractive power. The third lens has refractive power. The fourth lens has refractive power. The fifth lens has refractive power. The sixth lens has refractive power. The seventh lens has refractive power. The optical image capturing system satisfies:

$$1.0 \leq f/HEP \leq 3.5;\ 0\ \deg < HAF \leq 100\ \deg;\ \text{and}\ 0.2 \leq EIN/ETL < 1;$$

where f1, f2, f3, f4, f5, f6, and f7 are respectively a focal length of the first lens to the seventh lens; f is a focal length of the optical image capturing system; HEP is an entrance pupil diameter of the optical image capturing system; HOS is a distance between a point on an object-side surface, which face the object side, of the first lens where the optical axis passes through and a point on the image plane where the optical axis passes through; InTL is a distance from the object-side surface of the first lens to the image-side surface of the seventh lens on the optical axis; HAF is a half of the maximum field angle of the optical image capturing system; ETL is a distance in parallel with the optical axis between a coordinate point at a height of ½ HEP on the object-side surface of the first lens and the image plane; EIN is a distance in parallel with the optical axis between the coordinate point at the height of ½ HEP on the object-side surface of the first lens and a coordinate point at a height of ½ HEP on the image-side surface of the seventh lens.

For any lens, the thickness at the height of a half of the entrance pupil diameter (HEP) particularly affects the ability of correcting aberration and differences between optical paths of light in different fields of view of the common region of each field of view of light within the covered range at the height of a half of the entrance pupil diameter (HEP). With greater thickness, the ability to correct aberration is better. However, the difficulty of manufacturing increases as well. Therefore, the thickness at the height of a half of the entrance pupil diameter (HEP) of any lens has to be controlled. The ratio between the thickness (ETP) at the height of a half of the entrance pupil diameter (HEP) and the thickness (TP) of any lens on the optical axis (i.e., ETP/TP) has to be particularly controlled. For example, the thickness at the height of a half of the entrance pupil diameter (HEP) of the first lens is denoted by ETP1, the thickness at the height of a half of the entrance pupil diameter (HEP) of the second lens is denoted by ETP2, and the thickness at the height of a half of the entrance pupil diameter (HEP) of any other lens in the optical image capturing system is denoted in the same manner. The optical image capturing system of the present invention satisfies:

$$0.3 \leq SETP/EIN < 1;$$

where SETP is the sum of the aforementioned ETP1 to ETP5.

In order to enhance the ability of correcting aberration and to lower the difficulty of manufacturing at the same time, the ratio between the thickness (ETP) at the height of a half of the entrance pupil diameter (HEP) and the thickness (TP) of any lens on the optical axis (i.e., ETP/TP) has to be particularly controlled. For example, the thickness at the height of a half of the entrance pupil diameter (HEP) of the first lens is denoted by ETP1, the thickness of the first lens on the optical axis is TP1, and the ratio between these two parameters is ETP1/TP1; the thickness at the height of a half of the entrance pupil diameter (HEP) of the first lens is denoted by ETP2, the thickness of the second lens on the optical axis is TP2, and the ratio between these two parameters is ETP2/TP2. The ratio between the thickness at the height of a half of the entrance pupil diameter (HEP) and the thickness of any other lens in the optical image capturing system is denoted in the same manner. The optical image capturing system of the present invention satisfies:

$$0.2 \leq ETP/TP \leq 3.$$

The horizontal distance between two neighboring lenses at the height of a half of the entrance pupil diameter (HEP) is denoted by ED, wherein the aforementioned horizontal distance (ED) is parallel to the optical axis of the optical image capturing system, and particularly affects the ability of correcting aberration and differences between optical paths of light in different fields of view of the common region of each field of view of light at the height of a half of the entrance pupil diameter (HEP). With longer distance, the ability to correct aberration is potential to be better. However, the difficulty of manufacturing increases, and the feasibility of "slightly shorten" the length of the optical image capturing system is limited as well. Therefore, the horizontal distance (ED) between two specific neighboring lenses at the height of a half of the entrance pupil diameter (HEP) has to be controlled.

In order to enhance the ability of correcting aberration and to lower the difficulty of "slightly shorten" the length of the optical image capturing system at the same time, the ratio between the horizontal distance (ED) between two neighboring lenses at the height of a half of the entrance pupil diameter (HEP) and the parallel distance (IN) between these two neighboring lens on the optical axis (i.e., ED/IN) has to be particularly controlled. For example, the horizontal distance between the first lens and the second lens at the height of a half of the entrance pupil diameter (HEP) is denoted by ED12, the horizontal distance between the first lens and the second lens on the optical axis is denoted by IN12, and the ratio between these two parameters is ED12/IN12; the horizontal distance between the second lens and the third lens at the height of a half of the entrance pupil diameter (HEP) is denoted by ED23, the horizontal distance between the second lens and the third lens on the optical axis is denoted by IN23, and the ratio between these two parameters is ED23/IN23. The ratio between the horizontal distance between any two neighboring lenses at the height of a half of the entrance pupil diameter (HEP) and the horizontal distance between these two neighboring lenses on the optical axis is denoted in the same manner.

The horizontal distance in parallel with the optical axis between a coordinate point at the height of ½ HEP on the image-side surface of the seventh lens and image surface is denoted by EBL. The horizontal distance in parallel with the optical axis between the point on the image-side surface of the seventh lens where the optical axis passes through and the image plane is denoted by BL. To enhance the ability to correct aberration and to preserve more space for other optical components, the optical image capturing system of the present invention can satisfy $0.2 \leq EBL/BL \leq 1.1$. The optical image capturing system can further include a filtering component, which is provided between the seventh lens and the image plane, wherein the horizontal distance in parallel with the optical axis between the coordinate point at the height of ½ HEP on the image-side surface of the seventh lens and the filtering component is denoted by EIR, and the horizontal distance in parallel with the optical axis between the point on the image-side surface of the seventh lens where the optical axis passes through and the filtering component is denoted by PIR. The optical image capturing system of the present invention can satisfy $0.1 \leq EIR/PIR \leq 1$.

In an embodiment, a height of the optical image capturing system (HOS) can be reduced while $|f1|>|f7|$.

In an embodiment, when the lenses satisfy $|f2|+|f3|+|f4|+|f5|+|f6|$ and $|f1|+|f7|$, at least one lens among the second to the sixth lenses could have weak positive refractive power or weak negative refractive power. Herein the weak refractive power means the absolute value of the focal length of one specific lens is greater than 10. When at least one lens among the second to the sixth lenses has weak positive refractive power, it may share the positive refractive power of the first lens, and on the contrary, when at least one lens among the second to the sixth lenses has weak negative refractive power, it may fine tune and correct the aberration of the system.

In an embodiment, the seventh lens could have negative refractive power, and an image-side surface thereof is concave, it may reduce back focal length and size. Besides, the seventh lens can have at least an inflection point on at least a surface thereof, which may reduce an incident angle of the light of an off-axis field of view and correct the aberration of the off-axis field of view.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 2C shows a feature map of modulation transformation of the optical image capturing system of the second embodiment of the present application in visible spectrum;

FIG. 8C shows a feature map of modulation transformation of the optical image capturing system of the eighth embodiment of the present application in visible spectrum.

DETAILED DESCRIPTION OF THE INVENTION

Figure 1A:
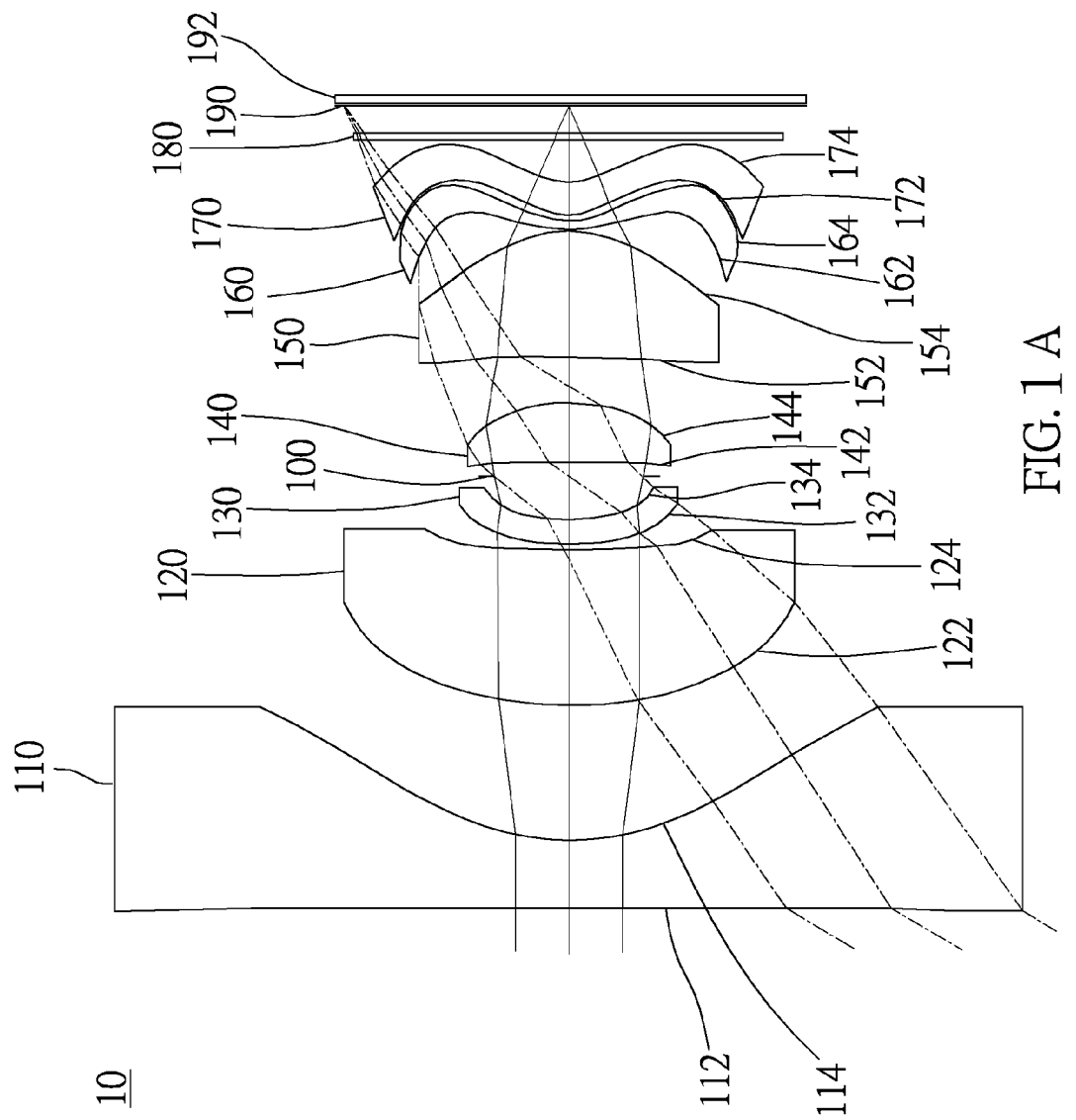
FIG. 1A is a schematic diagram of a first embodiment of the present invention.

An optical image capturing system of the present invention includes a first lens, a second lens, a third lens, a fourth lens, a fifth lens, a sixth lens, a seventh lens, and an image plane from an object side to an image side. The optical image capturing system further is provided with an image sensor at an image plane. Image heights in the following embodiments are all almost 3.91 mm.

The optical image capturing system can work in three wavelengths, including 486.1 nm, 587.5 nm, and 656.2 nm, wherein 587.5 nm is the main reference wavelength and is the reference wavelength for obtaining the technical characters. The optical image capturing system can also work in five wavelengths, including 470 nm, 510 nm, 555 nm, 610 nm, and 650 nm wherein 555 nm is the main reference wavelength, and is the reference wavelength for obtaining the technical characters.

The optical image capturing system of the present invention satisfies 0.5≤ΣPPR/|ΣNPR|≤15, and a preferable range is 1≤ΣPPR/|ΣNPR|≤3.0, where PPR is a ratio of the focal length f of the optical image capturing system to a focal length fp of each of lenses with positive refractive power; NPR is a ratio of the focal length f of the optical image capturing system to a focal length fn of each of lenses with negative refractive power; ΣPPR is a sum of the PPRs of each positive lens; and ΣNPR is a sum of the NPRs of each negative lens. It is helpful for control of an entire refractive power and an entire length of the optical image capturing system.

The image sensor is provided on the image plane. The optical image capturing system of the present invention satisfies HOS/HOI≤10 and 0.5≤HOS/f≤10, and a preferable range is 1≤HOS/HOI≤5 and 1≤HOS/f≤7, where HOI is a half of a diagonal of an effective sensing area of the image sensor, i.e., the maximum image height, and HOS is a height of the optical image capturing system, i.e. a distance on the optical axis between the object-side surface of the first lens and the image plane. It is helpful for reduction of the size of the system for used in compact cameras.

The optical image capturing system of the present invention further is provided with an aperture to increase image quality.

In the optical image capturing system of the present invention, the aperture could be a front aperture or a middle aperture, wherein the front aperture is provided between the object and the first lens, and the middle is provided between the first lens and the image plane. The front aperture provides a long distance between an exit pupil of the system and the image plane, which allows more elements to be installed. The middle could enlarge a view angle of view of the system and increase the efficiency of the image sensor. The optical image capturing system satisfies 0.2≤InS/HOS≤1.1, where InS is a distance between the aperture and the image-side surface of the sixth lens. It is helpful for size reduction and wide angle.

The optical image capturing system of the present invention satisfies 0.1≤ΣTP/InTL≤0.9, where InTL is a distance between the object-side surface of the first lens and the image-side surface of the seventh lens, and ΣTP is a sum of central thicknesses of the lenses on the optical axis. It is helpful for the contrast of image and yield rate of manufacture and provides a suitable back focal length for installation of other elements.

The optical image capturing system of the present invention satisfies 0.001≤|R1/R2|≤20, and a preferable range is 0.01≤|R1/R2|<10, where R1 is a radius of curvature of the object-side surface of the first lens, and R2 is a radius of curvature of the image-side surface of the first lens. It provides the first lens with a suitable positive refractive power to reduce the increase rate of the spherical aberration.

The optical image capturing system of the present invention satisfies −7<(R13−R14)/(R13+R14)<50, where R13 is a radius of curvature of the object-side surface of the seventh lens, and R14 is a radius of curvature of the image-side surface of the seventh lens. It may modify the astigmatic field curvature.

The optical image capturing system of the present invention satisfies IN12/f≤3.0, where IN12 is a distance on the optical axis between the first lens and the second lens. It may correct chromatic aberration and improve the performance.

The optical image capturing system of the present invention satisfies IN67/f≤0.8, where IN67 is a distance on the optical axis between the sixth lens and the seventh lens. It may correct chromatic aberration and improve the performance.

The optical image capturing system of the present invention satisfies 0.1≤(TP1+IN12)/TP2≤10, where TP1 is a central thickness of the first lens on the optical axis, and TP2 is a central thickness of the second lens on the optical axis. It may control the sensitivity of manufacture of the system and improve the performance.

The optical image capturing system of the present invention satisfies 0.1≤(TP7+IN67)/TP6≤10, where TP6 is a central thickness of the sixth lens on the optical axis, TP7 is a central thickness of the seventh lens on the optical axis, and IN67 is a distance between the sixth lens and the seventh lens. It may control the sensitivity of manufacture of the system and improve the performance.

The optical image capturing system of the present invention satisfies 0.1≤TP4/(IN34+TP4+IN45)<1, where TP3 is a central thickness of the third lens on the optical axis, TP4 is a central thickness of the fourth lens on the optical axis, TP5 is a central thickness of the fifth lens on the optical axis, IN34 is a distance on the optical axis between the third lens and the fourth lens, IN45 is a distance on the optical axis between the fourth lens and the fifth lens, and InTL is a distance between the object-side surface of the first lens and the image-side surface of the seventh lens. It may fine tune and correct the aberration of the incident rays layer by layer, and reduce the height of the system.

The optical image capturing system satisfies 0 mm≤HVT71≤3 mm; 0 mm<HVT72≤6 mm; 0≤HVT71/HVT72; 0 mm≤|SGC71|≤0.5 mm; 0 mm<|SGC72|≤2 mm; and 0<|SGC72|/(|SGC72|+TP7)≤0.9, where HVT71 a distance perpendicular to the optical axis between the critical point C71 on the object-side surface of the seventh lens and the optical axis; HVT72 a distance perpendicular to the optical axis between the critical point C72 on the image-side surface of the seventh lens and the optical axis; SGC71 is a distance in parallel with the optical axis between an point on the object-side surface of the seventh lens where the optical axis passes through and the critical point C71; SGC72 is a distance in parallel with the optical axis between a point on the image-side surface of the seventh lens where the optical axis passes through and the critical point C72. It is helpful to correct the off-axis view field aberration.

The optical image capturing system satisfies 0.2≤HVT72/HOI≤0.9, and preferably satisfies 0.3≤HVT72/HOI≤0.8. It may help to correct the peripheral aberration.

The optical image capturing system satisfies 0≤HVT72/HOS≤0.5, and preferably satisfies 0.2≤HVT72/HOS≤0.45. It may help to correct the peripheral aberration.

The optical image capturing system of the present invention satisfies 0<SGI711/(SGI711+TP7)≤0.9; 0<SGI721/(SGI721+TP7)≤0.9, and it is preferable to satisfy 0.1≤SGI711/(SGI711+TP7)≤0.6; 0.1≤SGI721/(SGI721+TP7)≤0.6, where SGI711 is a displacement in parallel with the optical axis, from a point on the object-side surface of the seventh lens, through which the optical axis passes, to the inflection point on the object-side surface, which is the closest to the optical axis, and SGI721 is a displacement in parallel with the optical axis, from a point on the image-side surface of the seventh lens, through which the optical axis passes, to the inflection point on the image-side surface, which is the closest to the optical axis.

The optical image capturing system of the present invention satisfies 0<SGI712/(SGI712+TP7)≤0.9; 0<SGI722/(SGI722+TP7)≤0.9, and it is preferable to satisfy 0.1≤SGI712/(SGI712+TP7)≤0.6; 0.1≤SGI722/(SGI722+TP7)≤0.6, where SGI712 is a displacement in parallel with the optical axis, from a point on the object-side surface of the seventh lens, through which the optical axis passes, to the inflection point on the object-side surface, which is the second closest to the optical axis, and SGI722 is a displacement in parallel with the optical axis, from a point on the image-side surface of the seventh lens, through which the optical axis passes, to the inflection point on the image-side surface, which is the second closest to the optical axis.

The optical image capturing system of the present invention satisfies 0.001 mm≤|HIF711|≤5 mm; 0.001 mm≤|HIF721|≤5 mm, and it is preferable to satisfy 0.1 mm≤|HIF711|≤3.5 mm; 1.5 mm≤|HIF721|≤3.5 mm, where HIF711 is a distance perpendicular to the optical axis between the inflection point on the object-side surface of the seventh lens, which is the closest to the optical axis, and the optical axis; HIF721 is a distance perpendicular to the optical axis between the inflection point on the image-side surface of the seventh lens, which is the closest to the optical axis, and the optical axis.

The optical image capturing system of the present invention satisfies 0.001 mm≤|HIF712|≤5 mm; 0.001 mm≤|HIF722|≤5 mm, and it is preferable to satisfy 0.1 mm≤|HIF722|≤3.5 mm; 0.1 mm≤|HIF712|≤3.5 mm, where HIF712 is a distance perpendicular to the optical axis between the inflection point on the object-side surface of the seventh lens, which is the second closest to the optical axis, and the optical axis; HIF722 is a distance perpendicular to the optical axis between the inflection point on the image-side surface of the seventh lens, which is the second closest to the optical axis, and the optical axis.

The optical image capturing system of the present invention satisfies 0.001 mm≤|HIF713|≤5 mm; 0.001 mm≤|HIF723|≤5 mm, and it is preferable to satisfy 0.1 mm≤|HIF723|≤3.5 mm; 0.1 mm≤|HIF713|≤3.5 mm, where HIF713 is a distance perpendicular to the optical axis between the inflection point on the object-side surface of the seventh lens, which is the third closest to the optical axis, and the optical axis; HIF723 is a distance perpendicular to the optical axis between the inflection point on the image-side surface of the seventh lens, which is the third closest to the optical axis, and the optical axis.

The optical image capturing system of the present invention satisfies 0.001 mm≤|HIF714|≤5 mm; 0.001 mm≤|HIF724|≤5 mm, and it is preferable to satisfy 0.1 mm≤|HIF724|≤3.5 mm; 0.1 mm≤|HIF714|≤3.5 mm, where HIF714 is a distance perpendicular to the optical axis between the inflection point on the object-side surface of the seventh lens, which is the fourth closest to the optical axis, and the optical axis; HIF724 is a distance perpendicular to the optical axis between the inflection point on the image-side surface of the seventh lens, which is the fourth closest to the optical axis, and the optical axis.

In an embodiment, the lenses of high Abbe number and the lenses of low Abbe number are arranged in an interlaced arrangement that could be helpful for correction of aberration of the system.

An equation of aspheric surface is $$z = ch^2/[1+[1(k+1)c^2h^2]^{0.5}] + A4h^4 + A6h^6 + A8h^8 + A10h^{10} + A12h^{12} + A14h^{14} + A16h^{16} + A18h^{18} + A20h^{20} + \quad (1)$$

where z is a depression of the aspheric surface; k is conic constant; c is reciprocal of the radius of curvature; and A4, A6, A8, A10, A12, A14, A16, A18, and A20 are high-order aspheric coefficients.

In the optical image capturing system, the lenses could be made of plastic or glass. The plastic lenses may reduce the weight and lower the cost of the system, and the glass lenses may control the thermal effect and enlarge the space for arrangement of the refractive power of the system. In addition, the opposite surfaces (object-side surface and image-side surface) of the first to the seventh lenses could be aspheric that can obtain more control parameters to reduce aberration. The number of aspheric glass lenses could be less than the conventional spherical glass lenses, which is helpful for reduction of the height of the system.

When the lens has a convex surface, which means that the surface is convex around a position, through which the optical axis passes, and when the lens has a concave surface, which means that the surface is concave around a position, through which the optical axis passes.

The optical image capturing system of the present invention could be applied in a dynamic focusing optical system. It is superior in the correction of aberration and high imaging quality so that it could be allied in lots of fields.

The optical image capturing system of the present invention could further include a driving module to meet different demands, wherein the driving module can be coupled with the lenses to move the lenses. The driving module can be a voice coil motor (VCM), which is used to move the lens for focusing, or can be an optical image stabilization (OIS) component, which is used to lower the possibility of having the problem of image blurring which is caused by subtle movements of the lens while shooting.

To meet different requirements, at least one lens among the first lens to the seventh lens of the optical image capturing system of the present invention can be a light filter, which filters out light of wavelength shorter than 500 nm. Such effect can be achieved by coating on at least one surface of the lens, or by using materials capable of filtering out short waves to make the lens.

We provide several embodiments in conjunction with the accompanying drawings for the best understanding, which are:

[First Embodiment]

Figure 1B:
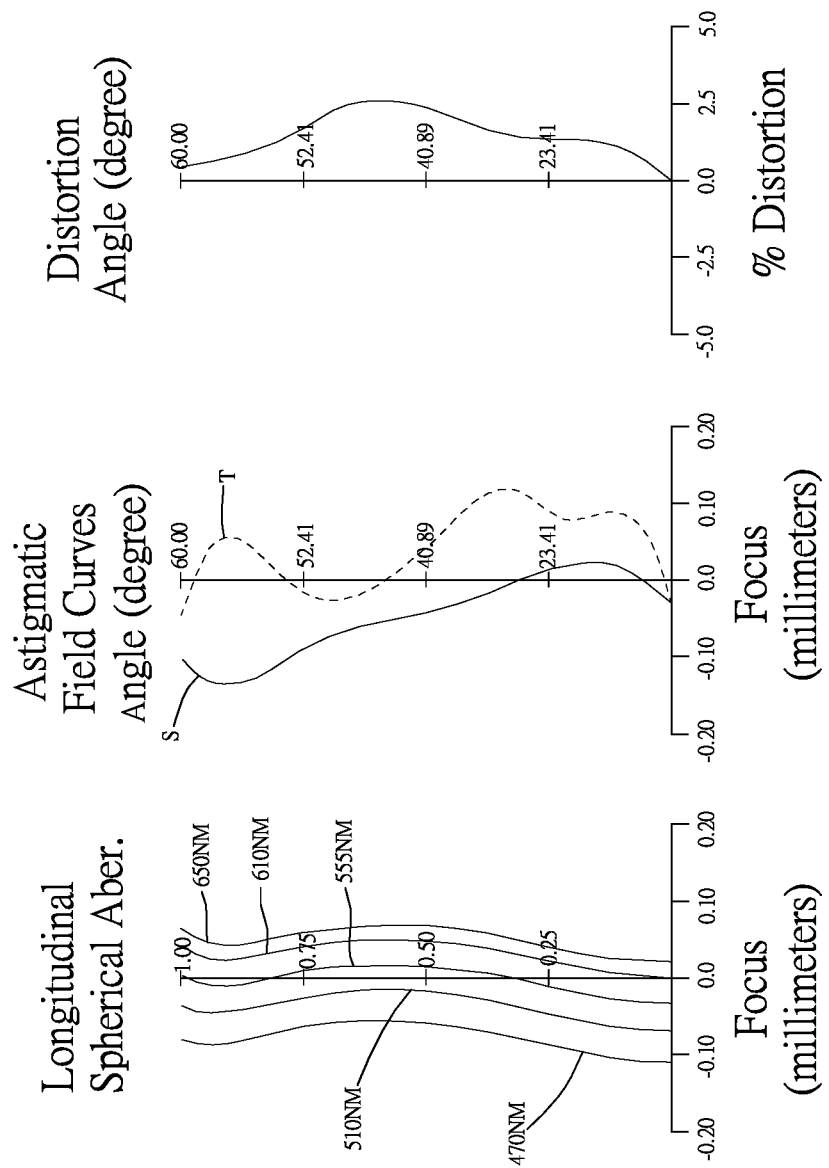
FIG. 1B shows curve diagrams of longitudinal spherical aberration, astigmatic field, and optical distortion of the optical image capturing system in the order from left to right of the first embodiment of the present application.
Figure 1C:
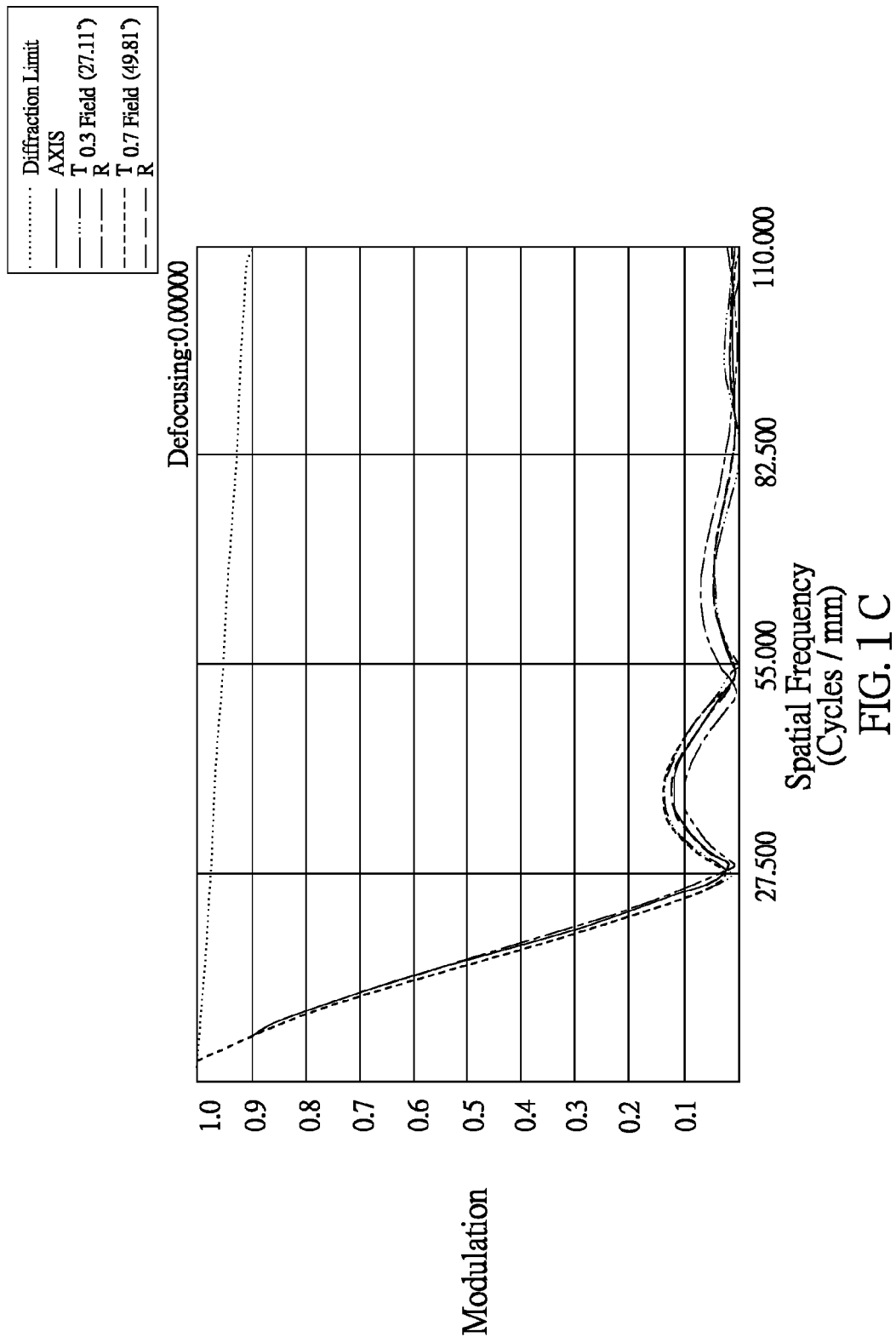
FIG. 1C shows a feature map of modulation transformation of the optical image capturing system of the first embodiment of the present application in visible spectrum.

As shown in FIG. 1A and FIG. 1B, an optical image capturing system 10 of the first embodiment of the present invention includes, along an optical axis from an object side to an image side, a first lens 110, an aperture 100, a second lens 120, a third lens 130, a fourth lens 140, a fifth lens 150, a sixth lens 160, a seventh lens 170, an infrared rays filter 180, an image plane 190, and an image sensor 192. FIG. 1C shows a modulation transformation of the optical image capturing system 10 of the first embodiment of the present application in visible spectrum.

The first lens 110 has negative refractive power and is made of plastic. An object-side surface 112 thereof, which faces the object side, is a concave aspheric surface, and an image-side surface 114 thereof, which faces the image side, is a concave aspheric surface. The object-side surface 112 and the image-side surface 114 both have two inflection points. A thickness of the first lens 110 on the optical axis is TP1, and a thickness of the first lens 110 at the height of a half of the entrance pupil diameter (HEP) is denoted by ETP1.

The first lens satisfies SGI111=−0.1110 mm; SGI121=2.7120 mm; TP1=2.2761 mm; |SGI111|/(|SGI111|+TP1)=0.0465; |SGI121|/(|SGI121|+TP1)=0.5437, where a displacement in parallel with the optical axis from a point on the object-side surface of the first lens, through which the optical axis passes, to the inflection point on the image-side surface, which is the closest to the optical axis is denoted by SGI111, and a displacement in parallel with the optical axis from a point on the image-side surface of the first lens, through which the optical axis passes, to the inflection point on the image-side surface, which is the closest to the optical axis is denoted by SGI111.

The first lens satisfies SGI112=0 mm; SGI122=4.2315 mm; |SGI112|/(|SGI112|+TP1)=0; |SGI122|/(|SGI122|+TP1)=0.6502, where a displacement in parallel with the optical axis from a point on the object-side surface of the first lens, through which the optical axis passes, to the inflection point on the image-side surface, which is the second closest to the optical axis is denoted by SGI112, and a displacement in parallel with the optical axis from a point on the image-side surface of the first lens, through which the optical axis passes, to the inflection point on the image-side surface, which is the second closest to the optical axis is denoted by SGI122.

The first lens satisfies HIF111=12.8432 mm; HIF111/HOI=1.7127; HIF121=7.1744 mm; HIF121/HOI=0.9567, where a displacement perpendicular to the optical axis from a point on the object-side surface of the first lens, through which the optical axis passes, to the inflection point, which is the closest to the optical axis is denoted by HIF111, and a displacement perpendicular to the optical axis from a point on the image-side surface of the first lens, through which the optical axis passes, to the inflection point, which is the closest to the optical axis is denoted by HIF121.

The first lens satisfies HIF112=0 mm; HIF112/HOI=0; HIF122=9.8592 mm; HIF122/HOI=1.3147, where a displacement perpendicular to the optical axis from a point on the object-side surface of the first lens, through which the optical axis passes, to the inflection point, which is the second closest to the optical axis is denoted by HIF112, and a displacement perpendicular to the optical axis from a point on the image-side surface of the first lens, through which the optical axis passes, to the inflection point, which is the second closest to the optical axis is denoted by HIF122.

The second lens 120 has positive refractive power and is made of plastic. An object-side surface 122 thereof, which faces the object side, is a convex aspheric surface, and an image-side surface 124 thereof, which faces the image side, is a concave aspheric surface. A thickness of the second lens 120 on the optical axis is TP2, and thickness of the second lens 120 at the height of a half of the entrance pupil diameter (HEP) is denoted by ETP2.

For the second lens, a displacement in parallel with the optical axis from a point on the object-side surface of the second lens, through which the optical axis passes, to the inflection point on the image-side surface, which is the closest to the optical axis is denoted by SGI211, and a displacement in parallel with the optical axis from a point on the image-side surface of the second lens, through which the optical axis passes, to the inflection point on the image-side surface, which is the closest to the optical axis is denoted by SGI221.

For the second lens, a displacement perpendicular to the optical axis from a point on the object-side surface of the second lens, through which the optical axis passes, to the inflection point, which is the closest to the optical axis is denoted by HIF211, and a displacement perpendicular to the optical axis from a point on the image-side surface of the second lens, through which the optical axis passes, to the inflection point, which is the closest to the optical axis is denoted by HIF221.

The third lens 130 has negative refractive power and is made of plastic. An object-side surface 132, which faces the object side, is a convex aspheric surface, and an image-side surface 134, which faces the image side, is a concave aspheric surface. A thickness of the third lens 130 on the optical axis is TP3, and a thickness of the third lens 130 at the height of a half of the entrance pupil diameter (HEP) is denoted by ETP3.

For the third lens 130, SGI311 is a displacement in parallel with the optical axis, from a point on the object-side surface of the third lens, through which the optical axis passes, to the inflection point on the object-side surface, which is the closest to the optical axis, and SGI321 is a displacement in parallel with the optical axis, from a point on the image-side surface of the third lens, through which the optical axis passes, to the inflection point on the image-side surface, which is the closest to the optical axis.

For the third lens 130, SGI312 is a displacement in parallel with the optical axis, from a point on the object-side surface of the third lens, through which the optical axis passes, to the inflection point on the object-side surface, which is the second closest to the optical axis, and SGI322 is a displacement in parallel with the optical axis, from a point on the image-side surface of the third lens, through which the optical axis passes, to the inflection point on the object-side surface, which is the second closest to the optical axis.

For the third lens 130, HIF311 is a distance perpendicular to the optical axis between the inflection point on the object-side surface of the third lens, which is the closest to the optical axis, and the optical axis; HIF321 is a distance perpendicular to the optical axis between the inflection point on the image-side surface of the third lens, which is the closest to the optical axis, and the optical axis.

For the third lens 130, HIF312 is a distance perpendicular to the optical axis between the inflection point on the object-side surface of the third lens, which is the second closest to the optical axis, and the optical axis; HIF322 is a distance perpendicular to the optical axis between the inflection point on the image-side surface of the third lens, which is the second closest to the optical axis, and the optical axis.

The fourth lens 140 has positive refractive power and is made of plastic. An object-side surface 142, which faces the object side, is a convex aspheric surface, and an image-side surface 144, which faces the image side, is a convex aspheric surface. The object-side surface 142 has an inflection point. A thickness of the fourth lens 140 on the optical axis is TP4, and a thickness of the fourth lens 140 at the height of a half of the entrance pupil diameter (HEP) is denoted by ETP4.

The fourth lens 140 satisfies SGI411=0.0018 mm; |SGI411|/(|SGI411|+TP4)=0.0009, where SGI411 is a displacement in parallel with the optical axis, from a point on the object-side surface of the fourth lens, through which the optical axis passes, to the inflection point on the object-side surface, which is the closest to the optical axis, and SGI421 is a displacement in parallel with the optical axis, from a point on the image-side surface of the fourth lens, through which the optical axis passes, to the inflection point on the image-side surface, which is the closest to the optical axis.

For the fourth lens 140, SGI412 is a displacement in parallel with the optical axis, from a point on the object-side surface of the fourth lens, through which the optical axis passes, to the inflection point on the object-side surface, which is the second closest to the optical axis, and SGI422 is a displacement in parallel with the optical axis, from a point on the image-side surface of the fourth lens, through which the optical axis passes, to the inflection point on the object-side surface, which is the second closest to the optical axis.

The fourth lens 140 further satisfies HIF411=0.7191 mm; HIF411/HOI=0.0959, where HIF411 is a distance perpendicular to the optical axis between the inflection point on the object-side surface of the fourth lens, which is the closest to the optical axis, and the optical axis; HIF421 is a distance perpendicular to the optical axis between the inflection point on the image-side surface of the fourth lens, which is the closest to the optical axis, and the optical axis.

For the fourth lens 140, HIF412 is a distance perpendicular to the optical axis between the inflection point on the object-side surface of the fourth lens, which is the second closest to the optical axis, and the optical axis; HIF422 is a distance perpendicular to the optical axis between the inflection point on the image-side surface of the fourth lens, which is the second closest to the optical axis, and the optical axis.

The fifth lens 150 has positive refractive power and is made of plastic. An object-side surface 152, which faces the object side, is a concave aspheric surface, and an image-side surface 154, which faces the image side, is a convex aspheric surface. The object-side surface 152 and the image-side surface 154 both have an inflection point. A thickness of the fifth lens 150 on the optical axis is TP5, and a thickness of the fifth lens 150 at the height of a half of the entrance pupil diameter (HEP) is denoted by ETP5.

The fifth lens 150 satisfies SGI511=−0.1246 mm; SGI521=−2.1477 mm; |SGI511|/(|SGI511|+TP5)=0.0284; |SGI521|/(|SGI521|+TP5)=0.3346, where SGI511 is a displacement in parallel with the optical axis, from a point on the object-side surface of the fifth lens, through which the optical axis passes, to the inflection point on the object-side surface, which is the closest to the optical axis, and SGI521 is a displacement in parallel with the optical axis, from a point on the image-side surface of the fifth lens, through which the optical axis passes, to the inflection point on the image-side surface, which is the closest to the optical axis.

For the fifth lens 150, SGI512 is a displacement in parallel with the optical axis, from a point on the object-side surface of the fifth lens, through which the optical axis passes, to the inflection point on the object-side surface, which is the second closest to the optical axis, and SGI522 is a displacement in parallel with the optical axis, from a point on the image-side surface of the fifth lens, through which the optical axis passes, to the inflection point on the object-side surface, which is the second closest to the optical axis.

The fifth lens 150 further satisfies HIF511=3.8179 mm; HIF521=4.5480 mm; HIF511/HOI=0.5091; HIF521/HOI=0.6065, where HIF511 is a distance perpendicular to the optical axis between the inflection point on the object-side surface of the fifth lens, which is the closest to the optical axis, and the optical axis; HIF521 is a distance perpendicular to the optical axis between the inflection point on the image-side surface of the fifth lens, which is the closest to the optical axis, and the optical axis.

For the fifth lens 150, HIF512 is a distance perpendicular to the optical axis between the inflection point on the object-side surface of the fifth lens, which is the second closest to the optical axis, and the optical axis; HIF522 is a distance perpendicular to the optical axis between the inflection point on the image-side surface of the fifth lens, which is the second closest to the optical axis, and the optical axis.

The sixth lens 160 has negative refractive power and is made of plastic. An object-side surface 162, which faces the object side, is a convex aspheric surface, and an image-side surface 164, which faces the image side, is a concave aspheric surface. The object-side surface 162 and the image-side surface 164 both have an inflection point. Whereby, the incident angle of each view field entering the sixth lens 160 can be effectively adjusted to improve aberration. A thickness of the sixth lens 160 on the optical axis is TP6, and a thickness of the sixth lens 160 at the height of a half of the entrance pupil diameter (HEP) is denoted by ETP6.

The sixth lens 160 satisfies SGI611=0.3208 mm; SGI621=0.5937 mm; |SGI611|/(|SGI611|+TP6)=0.5167; |SGI621|/(|SGI621|+TP6)=0.6643, where SGI611 is a displacement in parallel with the optical axis, from a point on the object-side surface of the sixth lens, through which the optical axis passes, to the inflection point on the object-side surface, which is the closest to the optical axis, and SGI621 is a displacement in parallel with the optical axis, from a point on the image-side surface of the sixth lens, through which the optical axis passes, to the inflection point on the image-side surface, which is the closest to the optical axis.

The sixth lens 160 further satisfies HIF611=1.9655 mm; HIF621=2.0041 mm; HIF611/HOI=0.2621; HIF621/HOI=0.2672, where HIF611 is a distance perpendicular to the optical axis between the inflection point on the object-side surface of the sixth lens, which is the closest to the optical axis, and the optical axis; HIF621 is a distance perpendicular to the optical axis between the inflection point on the image-side surface of the sixth lens, which is the closest to the optical axis, and the optical axis.

The seventh lens 170 has positive refractive power and is made of plastic. An object-side surface 172, which faces the object side, is a convex aspheric surface, and an image-side surface 174, which faces the image side, is a concave aspheric surface. The object-side surface 172 and the image-side surface 174 both have an inflection point. A thickness of the seventh lens 170 on the optical axis is TP7, and a thickness of the seventh lens 170 at the height of a half of the entrance pupil diameter (HEP) is denoted by ETP7.

The seventh lens 170 satisfies SGI711=0.5212 mm; SGI721=0.5668 mm; |SGI711|/(|SGI711|+TP7)=0.3179;

|SGI721|/(|SGI721|+TP7)=0.3364, where SGI711 is a displacement in parallel with the optical axis, from a point on the object-side surface of the seventh lens, through which the optical axis passes, to the inflection point on the object-side surface, which is the closest to the optical axis, and SGI721 is a displacement in parallel with the optical axis, from a point on the image-side surface of the seventh lens, through which the optical axis passes, to the inflection point on the image-side surface, which is the closest to the optical axis.

The seventh lens 170 further satisfies HIF711=1.6707 mm; HIF721=1.8616 mm; HIF711/HOI=0.2228; HIF721/HOI=0.2482, where HIF711 is a distance perpendicular to the optical axis between the inflection point on the object-side surface of the seventh lens, which is the closest to the optical axis, and the optical axis; HIF721 is a distance perpendicular to the optical axis between the inflection point on the image-side surface of the seventh lens, which is the closest to the optical axis, and the optical axis.

A distance in parallel with the optical axis between a coordinate point at a height of ½ HEP on the object-side surface of the first lens 110 and the image plane is ETL, and a distance in parallel with the optical axis between the coordinate point at the height of ½ HEP on the object-side surface of the first lens 110 and a coordinate point at a height of ½ HEP on the image-side surface of the seventh lens 140 is EIN, which satisfies: ETL=26.980 mm; EIN=24.999 mm; EIN/ETL=0.927.

The optical image capturing system of the first embodiment satisfies: ETP1=2.470 mm; ETP2=5.144 mm; ETP3=0.898 mm; ETP4=1.706 mm; ETP5=3.901 mm; ETP6=0.528 mm; ETP7=1.077 mm. The sum of the aforementioned ETP1 to ETP7 is SETP, wherein SETP=15.723 mm. In addition, TP1=2.276 mm; TP2=5.240 mm; TP3=0.837 mm; TP4=2.002 mm; TP5=4.271 mm; TP6=0.300 mm; TP7=1.118 mm. The sum of the aforementioned TP1 to TP7 is STP, wherein STP=16.044 mm. In addition, SETP/STP=0.980, and SETP/EIN=0.629.

In order to enhance the ability of correcting aberration and to lower the difficulty of manufacturing at the same time, the ratio between the thickness (ETP) at the height of a half of the entrance pupil diameter (HEP) and the thickness (TP) of any lens on the optical axis (i.e., ETP/TP) in the optical image capturing system of the first embodiment is particularly controlled, which satisfies: ETP1/TP1=1.085; ETP2/TP2=0.982; ETP3/TP3=1.073; ETP4/TP4=0.852; ETP5/TP5=0.914; ETP6/TP6=1.759; ETP7/TP7=0.963.

In order to enhance the ability of correcting aberration, lower the difficulty of manufacturing, and "slightly shortening" the length of the optical image capturing system at the same time, the ratio between the horizontal distance (ED) between two neighboring lenses at the height of a half of the entrance pupil diameter (HEP) and the parallel distance (IN) between these two neighboring lens on the optical axis (i.e., ED/IN) in the optical image capturing system of the first embodiment is particularly controlled, which satisfies: the horizontal distance between the first lens 110 and the second lens 120 at the height of a half of the entrance pupil diameter (HEP) is denoted by ED12, wherein ED12=4.474 mm; the horizontal distance between the second lens 120 and the third lens 130 at the height of a half of the entrance pupil diameter (HEP) is denoted by ED23, wherein ED23=0.349 mm; the horizontal distance between the third lens 130 and the fourth lens 140 at the height of a half of the entrance pupil diameter (HEP) is denoted by ED34, wherein ED34=1.660 mm; the horizontal distance between the fourth lens 140 and the fifth lens 150 at the height of a half of the entrance pupil diameter (HEP) is denoted by ED45, wherein ED45=1.794 mm; the horizontal distance between the fifth lens 150 and the sixth lens 160 at the height of a half of the entrance pupil diameter (HEP) is denoted by ED56, wherein ED56=0.714 mm; the horizontal distance between the sixth lens 160 and the seventh lens 170 at the height of a half of the entrance pupil diameter (HEP) is denoted by ED67, wherein ED67=0.284 mm. The sum of the aforementioned ED12 to ED67 is SED, wherein SED=9.276 mm.

The horizontal distance between the first lens 110 and the second lens 120 on the optical axis is denoted by IN12, wherein IN12=4.552 mm, and ED12/IN12=0.983. The horizontal distance between the second lens 120 and the third lens 130 on the optical axis is denoted by IN23, wherein IN23=0.162 mm, and ED23/IN23=2.153. The horizontal distance between the third lens 130 and the fourth lens 140 on the optical axis is denoted by IN34, wherein IN34=1.927 mm, and ED34/IN34=0.862. The horizontal distance between the fourth lens 140 and the fifth lens 150 on the optical axis is denoted by IN45, wherein IN45=1.515 mm, and ED45/IN45=1.184. The horizontal distance between the fifth lens 150 and the sixth lens 160 on the optical axis is denoted by IN56, wherein IN56=0.050 mm, and ED56/IN56=14.285. The horizontal distance between the sixth lens 160 and the seventh lens 170 on the optical axis is denoted by IN67, wherein IN67=0.211 mm, and ED67/IN67=1.345. The sum of the aforementioned IN12 to IN67 is denoted by SIN, wherein SIN=8.418, and SED/SIN=1.102.

The optical image capturing system of the first embodiment satisfies: ED12/ED23=12.816; ED23/ED34=0.210; ED34/ED45=0.925; ED45/ED56=2.512; ED56/ED67=2.512; IN12/IN23=28.080; IN23/IN34=0.084; IN34/IN45=1.272; IN45/IN56=30.305; IN56/IN67=0.236.

The horizontal distance in parallel with the optical axis between a coordinate point at the height of ½ HEP on the image-side surface of the seventh lens 170 and image surface is denoted by EBL, wherein EBL=1.982 mm. The horizontal distance in parallel with the optical axis between the point on the image-side surface of the seventh lens 170 where the optical axis passes through and the image plane is denoted by BL, wherein BL=2.517 mm. The optical image capturing system of the first embodiment satisfies: EBL/BL=0.7874. The horizontal distance in parallel with the optical axis between the coordinate point at the height of ½ HEP on the image-side surface of the seventh lens 170 and the infrared rays filter 180 is denoted by EIR, wherein EIR=0.865 mm. The horizontal distance in parallel with the optical axis between the point on the image-side surface of the seventh lens 170 where the optical axis passes through and the infrared rays filter 180 is denoted by PIR, wherein PIR=1.400 mm, and it satisfies: EIR/PIR=0.618.

The description below and the features related to inflection points are obtained based on main reference wavelength of 555 nm.

The infrared rays filter 180 is made of glass and between the seventh lens 170 and the image plane 190. The infrared rays filter 180 gives no contribution to the focal length of the system.

The optical image capturing system 10 of the first embodiment has the following parameters, which are f=4.3019 mm; f/HEP=1.2; HAF=59.9968 degrees; and tan (HAF)=1.7318, where f is a focal length of the system; HAF is a half of the maximum field angle; and HEP is an entrance pupil diameter.

The parameters of the lenses of the first embodiment are f1=−14.5286 mm; |f/f1|=0.2961; f7=8.2933; |f1|>f7; and

|f1/f7|=1.7519, where f1 is a focal length of the first lens 110; and f7 is a focal length of the seventh lens 170.

The first embodiment further satisfies |f2|+|f3|+|f4|+|f5|+|f6|=144.7494; |f1|+|f7|=22.8219 and |f2|+|f3|+|f4|+|f5|+|f6|>|f1|+|f7|, where f2 is a focal length of the second lens 120, f3 is a focal length of the third lens 130, f4 is a focal length of the fourth lens 140, f5 is a focal length of the fifth lens 150, f6 is a focal length of the sixth lens 160, and f7 is a focal length of the seventh lens 170.

The optical image capturing system 10 of the first embodiment further satisfies ΣPPR=f/f2+f/f4+f/f5+f/f7=1.7384; ΣNPR=f/f1+f/f3+f/f6=−0.9999; ΣPPR/|ΣNPR|=1.7386; |f/f2|=0.1774; |f/f3|=0.0443; |f/f4|=0.4411; |f/f5|=0.6012; |f/f6|=0.6595; |f/f7|=0.5187, where PPR is a ratio of a focal length f of the optical image capturing system to a focal length fp of each of the lenses with positive refractive power; and NPR is a ratio of a focal length f of the optical image capturing system to a focal length fn of each of lenses with negative refractive power.

The optical image capturing system 10 of the first embodiment further satisfies InTL+BFL=HOS; HOS=26.9789 mm; HOI=7.5 mm; HOS/HOI=3.5977; HOS/f=6.2715; InS=12.4615 mm; and InS/HOS=0.4619, where InTL is a distance between the object-side surface 112 of the first lens 110 and the image-side surface 174 of the seventh lens 170; HOS is a height of the image capturing system, i.e. a distance between the object-side surface 112 of the first lens 110 and the image plane 190; InS is a distance between the aperture 100 and the image plane 190; HOI is a half of a diagonal of an effective sensing area of the image sensor 192, i.e., the maximum image height; and BFL is a distance between the image-side surface 174 of the seventh lens 170 and the image plane 190.

The optical image capturing system 10 of the first embodiment further satisfies ΣTP=16.0446 mm; and ΣTP/InTL=0.6559, where ΣTP is a sum of the thicknesses of the lenses 110-150 with refractive power. It is helpful for the contrast of image and yield rate of manufacture and provides a suitable back focal length for installation of other elements.

The optical image capturing system 10 of the first embodiment further satisfies |R1/R2|=129.9952, where R1 is a radius of curvature of the object-side surface 112 of the first lens 110, and R2 is a radius of curvature of the image-side surface 114 of the first lens 110. It provides the first lens with a suitable positive refractive power to reduce the increase rate of the spherical aberration.

The optical image capturing system 10 of the first embodiment further satisfies (R13−R14)/(R13+R14)=−0.0806, where R13 is a radius of curvature of the object-side surface 172 of the seventh lens 170, and R14 is a radius of curvature of the image-side surface 174 of the seventh lens 170. It may modify the astigmatic field curvature.

The optical image capturing system 10 of the first embodiment further satisfies ΣPP=f2+f4+f5+f7=49.4535 mm; and f4/(f2+f4+f5+f7)=0.1972, where ΣPP is a sum of the focal lengths fp of each lens with positive refractive power. It is helpful to share the positive refractive power of the fourth lens 140 to other positive lenses to avoid the significant aberration caused by the incident rays.

The optical image capturing system 10 of the first embodiment further satisfies ΣNP=f1+f3+f6=−118.1178 mm; and f1/(f1+f3+f6)=0.1677, where ΣNP is a sum of the focal lengths fn of each lens with negative refractive power. It is helpful to share the negative refractive power of the first lens 110 to the other negative lens, which avoids the significant aberration caused by the incident rays.

The optical image capturing system 10 of the first embodiment further satisfies IN12=4.5524 mm; IN12/f=1.0582, where IN12 is a distance on the optical axis between the first lens 110 and the second lens 120. It may correct chromatic aberration and improve the performance.

The optical image capturing system 10 of the first embodiment further satisfies TP1=2.2761 mm; TP2=0.2398 mm; and (TP1+IN12)/TP2=1.3032, where TP1 is a central thickness of the first lens 110 on the optical axis, and TP2 is a central thickness of the second lens 120 on the optical axis. It may control the sensitivity of manufacture of the system and improve the performance.

The optical image capturing system 10 of the first embodiment further satisfies TP6=0.3000 mm; TP7=1.1182 mm; and (TP7+IN67)/TP6=4.4322, where TP6 is a central thickness of the sixth lens 160 on the optical axis, TP7 is a central thickness of the seventh lens 170 on the optical axis, and IN67 is a distance on the optical axis between the sixth lens 160 and the seventh lens 170. It may control the sensitivity of manufacture of the system and lower the total height of the system.

The optical image capturing system 10 of the first embodiment further satisfies TP3=0.8369 mm; TP4=2.0022 mm; TP5=4.2706 mm; IN34=1.9268 mm; IN45=1.5153 mm; and TP4/(IN34+TP4+IN45)=0.3678, where TP3 is a central thickness of the third lens 130 on the optical axis, TP4 is a central thickness of the fourth lens 140 on the optical axis, TP5 is a central thickness of the fifth lens 150 on the optical axis; IN34 is a distance on the optical axis between the third lens 130 and the fourth lens 140; IN45 is a distance on the optical axis between the fourth lens 140 and the fifth lens 150; InTL is a distance between the object-side surface 112 of the first lens 110 and the image-side surface 174 of the seventh lens 170. It may control the sensitivity of manufacture of the system and lower the total height of the system.

The optical image capturing system 10 of the first embodiment further satisfies InRS61=−0.7823 mm; InRS62=−0.2166 mm; and |InRS62|/TP6=0.722, where InRS61 is a displacement in parallel with the optical axis from a point on the object-side surface 162 of the sixth lens 160, through which the optical axis passes, to a point at the maximum effective semi diameter of the object-side surface 162 of the sixth lens 160; InRS62 is a displacement in parallel with the optical axis from a point on the image-side surface 164 of the sixth lens 160, through which the optical axis passes, to a point at the maximum effective semi diameter of the image-side surface 164 of the sixth lens 160; and TP6 is a central thickness of the sixth lens 160 on the optical axis. It is helpful for manufacturing and shaping of the lenses and is helpful to reduce the size.

The optical image capturing system 10 of the first embodiment further satisfies HVT61=3.3498 mm; HVT62=3.9860 mm; and HVT61/HVT62=0.8404, where HVT61 is a distance perpendicular to the optical axis between the critical point on the object-side surface 162 of the sixth lens 160 and the optical axis; and HVT62 is a distance perpendicular to the optical axis between the critical point on the image-side surface 164 of the sixth lens 160 and the optical axis.

The optical image capturing system 10 of the first embodiment further satisfies InRS71=−0.2756 mm; InRS72=−0.0938 mm; and |InRS72|/TP7=0.0839, where InRS71 is a displacement in parallel with the optical axis from a point on the object-side surface 172 of the seventh lens 170, through which the optical axis passes, to a point at the maximum effective semi diameter of the object-side surface 172 of the seventh lens 170; InRS72 is a displacement in parallel with the optical axis from a point on the image-side surface 174 of the seventh lens 170, through which the optical axis passes, to a point at the maximum effective semi diameter of the image-side surface 174 of the seventh lens 170; and TP7 is a central thickness of the seventh lens 170 on the optical axis. It is helpful for manufacturing and shaping of the lenses and is helpful to reduce the size.

The optical image capturing system 10 of the first embodiment satisfies HVT71=3.6822 mm; HVT72=4.0606 mm; and HVT71/HVT72=0.9068, where HVT71 is a distance perpendicular to the optical axis between the critical point on the object-side surface 172 of the seventh lens 170 and the optical axis; and HVT72 is a distance perpendicular to the optical axis between the critical point on the image-side surface 174 of the seventh lens 170 and the optical axis.

The optical image capturing system 10 of the first embodiment satisfies HVT72/HOI=0.5414. It is helpful for correction of the aberration of the peripheral view field of the optical image capturing system.

The optical image capturing system 10 of the first embodiment satisfies HVT72/HOS=0.1505. It is helpful for correction of the aberration of the peripheral view field of the optical image capturing system.

The second lens 120, the third lens 130, and the seventh lens 170 have negative refractive power. The optical image capturing system 10 of the first embodiment further satisfies 1≤NA7/NA2, where NA2 is an Abbe number of the second lens 120; NA3 is an Abbe number of the third lens 130; and NA7 is an Abbe number of the seventh lens 170. It may correct the aberration of the optical image capturing system.

The optical image capturing system 10 of the first embodiment further satisfies |TDT|=2.5678%; |ODT|=2.1302%, where TDT is TV distortion; and ODT is optical distortion.

For the optical image capturing system of the first embodiment, the values of MTF in the spatial frequency of 55 cycles/mm at the optical axis, 0.3 field of view, and 0.7 field of view of visible light on an image plane are respectively denoted by MTFE0, MTFE3, and MTFE7, wherein MTFE0 is around 0.35, MTFE3 is around 0.14, and MTEF7 is around 0.28; the values of MTF in the spatial frequency of 110 cycles/mm at the optical axis, 0.3 field of view, and 0.7 field of view of visible light on an image plane are respectively denoted by MTFQ0, MTFQ3, and MTFQ7, wherein MTFQ0 is around 0.126, MTFQ3 is around 0.075, and MTFQ7 is around 0.177; the values of modulation transfer function (MTF) in the spatial frequency of 220 cycles/mm at the optical axis, 0.3 field of view, and 0.7 field of view on an image plane are respectively denoted by MTFH0, MTFH3, and MTFH7, wherein MTFH0 is around 0.01, MTFH3 is around 0.01, and MTFH7 is around 0.01.

For the optical image capturing system of the first embodiment, when the infrared of wavelength of 850 nm focuses on the image plane, the values of MTF in spatial frequency (55 cycles/mm) at the optical axis, 0.3 HOI, and 0.7 HOI on an image plane are respectively denoted by MTFI0, MTFI3, and MTFI7, wherein MTFI0 is around 0.01, MTFI3 is around 0.01, and MTFI7 is around 0.01.

The parameters of the lenses of the first embodiment are listed in Table 1 and Table 2.

TABLE 1 f = 4.3019 mm; f/HEP = 1.2; HAF = 59.9968 deg

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | $1^{st}$ lens | −1079.499964 | 2.276 | plastic | 1.565 | 58.00 | −14.53 |
| 2 | | 8.304149657 | 4.552 | | | | |
| 3 | $2^{nd}$ lens | 14.39130913 | 5.240 | plastic | 1.650 | 21.40 | 24.25 |
| 4 | | 130.0869482 | 0.162 | | | | |
| 5 | $3^{rd}$ lens | 8.167310118 | 0.837 | plastic | 1.650 | 21.40 | −97.07 |
| 6 | | 6.944477468 | 1.450 | | | | |
| 7 | Aperture | plane | 0.477 | | | | |
| 8 | $4^{th}$ lens | 121.5965254 | 2.002 | plastic | 1.565 | 58.00 | 9.75 |
| 9 | | −5.755749302 | 1.515 | | | | |
| 10 | $5^{th}$ lens | −86.27705938 | 4.271 | plastic | 1.565 | 58.00 | 7.16 |
| 11 | | −3.942936258 | 0.050 | | | | |
| 12 | $6^{th}$ lens | 4.867364751 | 0.300 | plastic | 1.650 | 21.40 | −6.52 |
| 13 | | 2.220604983 | 0.211 | | | | |
| 14 | $7^{th}$ lens | 1.892510651 | 1.118 | plastic | 1.650 | 21.40 | 8.29 |
| 15 | | 2.224128115 | 1.400 | | | | |
| 16 | Infrared rays filter | plane | 0.200 | BK_7 | 1.517 | 64.2 | |
| 17 | | plane | 0.917 | | | | |
| 18 | Image plane | plane | | | | | |

Reference wavelength (d-line): 555 mm.

TABLE 2

Coefficients of the aspheric surfaces

| Surface | 1 | 2 | 3 | 4 | 5 | 6 | 8 |
|---|---|---|---|---|---|---|---|
| k | 2.500000E+01 | −4.711931E−01 | 1.531617E+00 | −1.153034E+01 | −2.915013E+00 | 4.886991E+00 | −3.459463E+01 |

TABLE 2-continued

Coefficients of the aspheric surfaces

| | | | | | | | |
|---|---|---|---|---|---|---|---|
| A4 | 5.236918E−06 | −2.117558E−04 | 7.146736E−05 | 4.353586E−04 | 5.793768E−04 | −3.756697E−04 | −1.292614E−03 |
| A6 | −3.014384E−08 | −1.838670E−06 | 2.334364E−06 | 1.400287E−05 | 2.112652E−04 | 3.901218E−04 | −1.602381E−05 |
| A8 | −2.487400E−10 | 9.605910E−09 | −7.479362E−08 | −1.688929E−07 | −1.344586E−05 | −4.925422E−05 | −8.452359E−06 |
| A10 | 1.170000E−12 | −8.256000E−11 | 1.701570E−09 | 3.829807E−08 | 1.000482E−06 | 4.139741E−06 | 7.243999E−07 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |

| Surface | 9 | 10 | 11 | 12 | 13 | 14 | 15 |
|---|---|---|---|---|---|---|---|
| k | −7.549291E+00 | −5.000000E+01 | −1.740728E+00 | −4.709650E+00 | −4.509781E+00 | −3.427137E+00 | −3.215123E+00 |
| A4 | −5.583548E−03 | 1.240671E−04 | 6.467538E−04 | −1.872317E−03 | −8.967310E−04 | −3.189453E−03 | −2.815022E−03 |
| A6 | 1.947110E−04 | −4.949077E−05 | −4.981838E−05 | −1.523141E−05 | −2.688331E−05 | −1.058126E−05 | 1.884580E−05 |
| A8 | −1.486947E−05 | 2.088854E−06 | 9.129031E−07 | −2.169414E−06 | −8.324958E−07 | 1.760103E−06 | −1.017223E−08 |
| A10 | −6.501246E−08 | −1.438383E−08 | 7.108550E−09 | −2.308304E−08 | −6.184250E−09 | −4.730294E−08 | 3.660000E−12 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |

The detail parameters of the first embodiment are listed in Table 1, in which the unit of the radius of curvature, thickness, and focal length are millimeter, and surface 0-10 indicates the surfaces of all elements in the system in sequence from the object side to the image side. Table 2 is the list of coefficients of the aspheric surfaces, in which A1-A20 indicate the coefficients of aspheric surfaces from the first order to the twentieth order of each aspheric surface. The following embodiments have the similar diagrams and tables, which are the same as those of the first embodiment, so we do not describe it again.

[Second Embodiment]

Figure 2A:
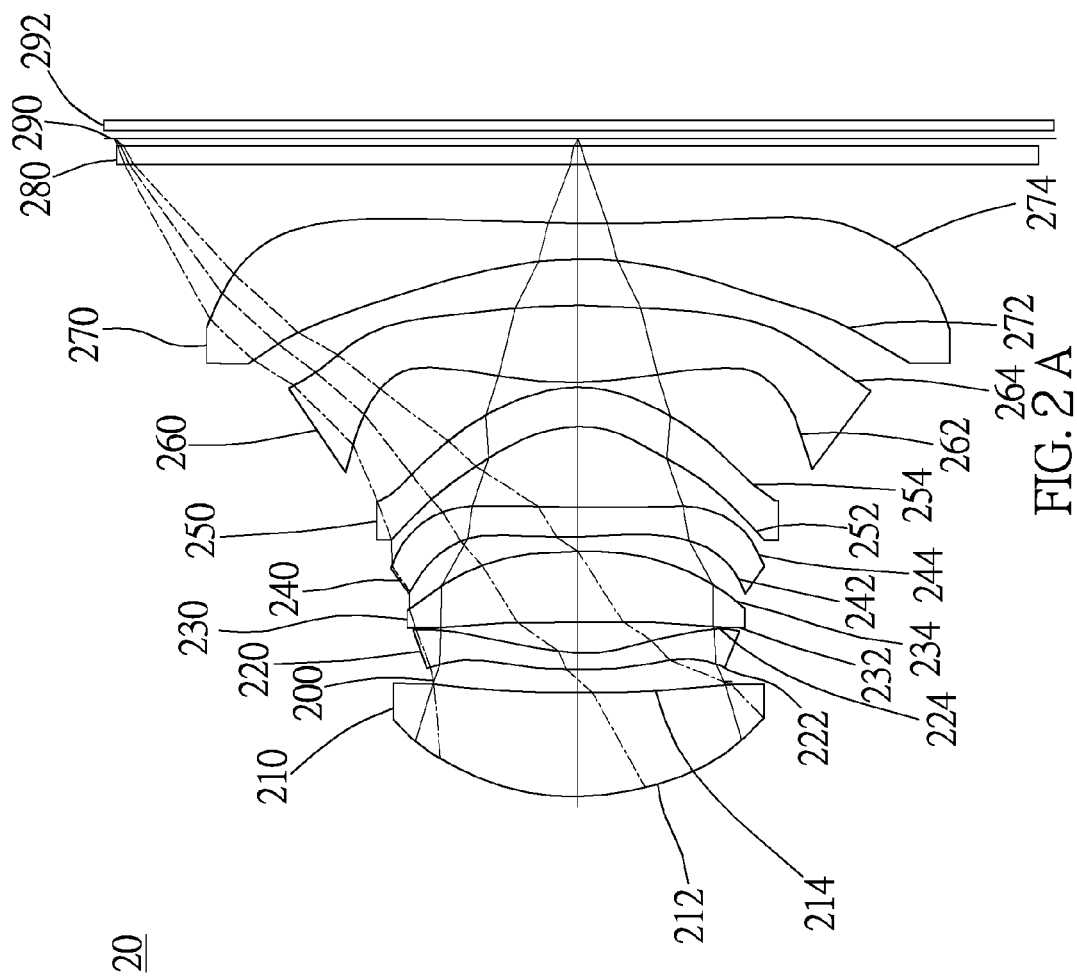
FIG. 2A is a schematic diagram of a second embodiment of the present invention.
Figure 2B:
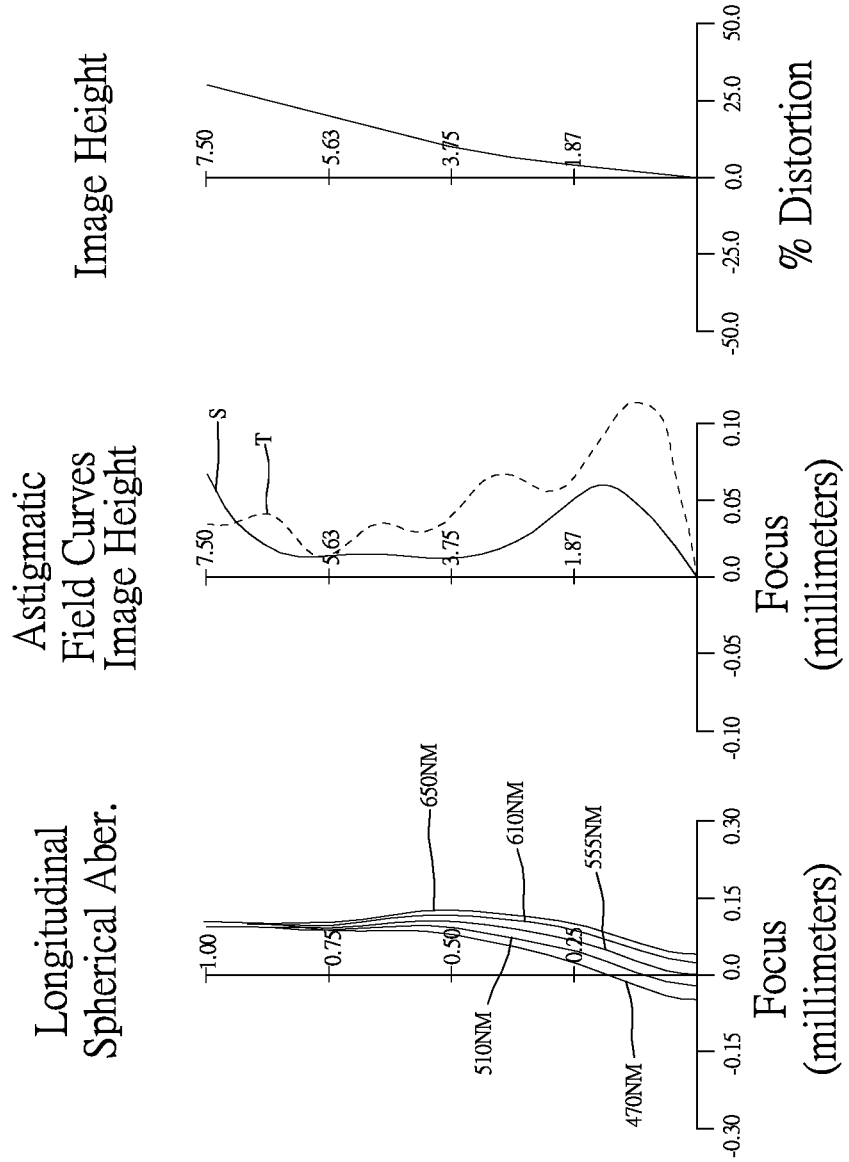
FIG. 2B shows curve diagrams of longitudinal spherical aberration, astigmatic field, and optical distortion of the optical image capturing system in the order from left to right of the second embodiment of the present application.

As shown in FIG. 2A and FIG. 2B, an optical image capturing system 20 of the second embodiment of the present invention includes, along an optical axis from an object side to an image side, a first lens 210, an aperture 200, a second lens 220, a third lens 230, a fourth lens 240, a fifth lens 250, a sixth lens 260, a seventh lens 270, an infrared rays filter 280, an image plane 290, and an image sensor 292. FIG. 2C shows a modulation transformation of the optical image capturing system 20 of the second embodiment of the present application in visible spectrum.

The first lens 210 has positive refractive power and is made of plastic. An object-side surface 212 thereof, which faces the object side, is a convex aspheric surface, and an image-side surface 214 thereof, which faces the image side, is a concave aspheric surface.

The second lens 220 has negative refractive power and is made of plastic. An object-side surface 222 thereof, which faces the object side, is a convex aspheric surface, and an image-side surface 224 thereof, which faces the image side, is a concave aspheric surface. The object-side surface 222 has an inflection point, and the image-side 224 surface has two inflection points.

The third lens 230 has positive refractive power and is made of plastic. An object-side surface 232, which faces the object side, is a concave aspheric surface, and an image-side surface 234, which faces the image side, is a convex aspheric surface. The object-side surface 232 the image-side surface 234 both have an inflection point.

The fourth lens 240 has positive refractive power and is made of plastic. An object-side surface 242, which faces the object side, is a convex aspheric surface, and an image-side surface 244, which faces the image side, is a concave aspheric surface. The object-side surface 242 and the image-side surface 244 both have an inflection point.

The fifth lens 250 has negative refractive power and is made of plastic. An object-side surface 252, which faces the object side, is a concave aspheric surface, and an image-side surface 254, which faces the image side, is a convex aspheric surface. The image-side surface 254 has an inflection point.

The sixth lens 260 has positive refractive power and is made of plastic. An object-side surface 262, which faces the object side, is a convex aspheric surface, and an image-side surface 254, which faces the image side, is a convex aspheric surface. The object-side surface 262 has an inflection point, and the image-side surface 264 has two inflection points. Whereby, the incident angle of each view field entering the sixth lens 260 can be effectively adjusted to improve aberration.

The seventh lens 270 has negative refractive power and is made of plastic. An object-side surface 272, which faces the object side, is a concave surface, and an image-side surface 274, which faces the image side, is a concave surface. It may help to shorten the back focal length to keep small in size. In addition, the object-side surface 272 has two inflection points, and the image-side surface 274 has an inflection point, which may reduce an incident angle of the light of an off-axis field of view and correct the aberration of the off-axis field of view.

The infrared rays filter 280 is made of glass and between the seventh lens 270 and the image plane 290. The infrared rays filter 280 gives no contribution to the focal length of the system.

In the second embodiment, the optical image capturing system of the second embodiment further satisfies $\Sigma PP=112.6399$ mm; and $f1/\Sigma PP=0.0907$, where $\Sigma PP$ is a sum of the focal lengths of each positive lens. It is helpful to share the positive refractive power of one single lens to the other positive lens to avoid the significant aberration caused by the incident rays.

The optical image capturing system of the second embodiment further satisfies $\Sigma NP=-58.9049$ mm; and $f7/\Sigma NP=0.1182$, where $\Sigma NP$ is a sum of the focal lengths of each negative lens. It is helpful to share the negative refractive power of the sixth lens 260 to other negative lenses.

The parameters of the lenses of the second embodiment are listed in Table 3 and Table 4.

TABLE 3 f = 7.3981 mm; f/HEP = 1.4; HAF = 37.5 deg

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | 1$^{st}$ lens | 4.540107024 | 1.702 | plastic | 1.565 | 58.00 | 10.221 |
| 2 | | 18.14724612 | 0.208 | | | | |
| 3 | Aperture | plane | 0.165 | | | | |
| 4 | 2$^{nd}$ lens | 3.639282865 | 0.300 | plastic | 1.650 | 21.40 | −28.437 |
| 5 | | 2.945398119 | 0.519 | | | | |
| 6 | 3$^{rd}$ lens | −32.97337991 | 1.172 | plastic | 1.565 | 58.00 | 14.202 |
| 7 | | −6.553207522 | 0.244 | | | | |
| 8 | 4$^{th}$ lens | 11.83806932 | 0.478 | plastic | 1.607 | 26.60 | 81.729 |
| 9 | | 15.27791187 | 1.363 | | | | |
| 10 | 5$^{th}$ lens | −1.539619547 | 0.662 | plastic | 1.650 | 21.40 | −23.505 |
| 11 | | −2.001908277 | 0.050 | | | | |
| 12 | 6$^{th}$ lens | 4.851764306 | 1.300 | plastic | 1.607 | 26.60 | 6.488 |
| 13 | | −19.48629895 | 0.768 | | | | |
| 14 | 7$^{th}$ lens | −7.112479218 | 0.581 | plastic | 1.650 | 21.40 | −6.963 |
| 15 | | 13.14911542 | 1.000 | | | | |
| 16 | Infrared rays filter | plane | 0.300 | BK_7 | 1.517 | 64.2 | |
| 17 | | plane | 0.044 | | | | |
| 18 | Image plane | plane | 0.095 | | | | |

Reference wavelength (d-line): 555 nm

TABLE 4

Coefficients of the aspheric surfaces

| Surface | 1 | 2 | 4 | 5 | 6 | 7 | 8 |
|---|---|---|---|---|---|---|---|
| k | −4.875568E+00 | −5.000000E+01 | −1.676073E+01 | −4.680304E+00 | 5.000000E+01 | 3.721744E+00 | −5.000000E+01 |
| A4 | 7.344150E−03 | −3.973450E−03 | 2.662221E−02 | −1.308314E−02 | 4.964298E−05 | −8.260152E−03 | −1.095602E−02 |
| A6 | −7.459683E−04 | 1.760892E−03 | −1.131725E−02 | 1.646226E−03 | 5.872398E−04 | 7.786565E−05 | −3.039081E−03 |
| A8 | 2.242006E−04 | −1.686811E−04 | 5.584613E−03 | −8.461823E−06 | −2.155411E−04 | 6.502447E−04 | 1.162066E−03 |
| A10 | −4.894969E−05 | −6.697240E−05 | −1.702728E−03 | −8.784909E−05 | 5.116732E−05 | −2.619295E−04 | −3.599534E−04 |
| A12 | 6.784149E−06 | 2.498565E−04 | 3.110902E−04 | 1.922030E−05 | −1.669358E−05 | 4.823445E−05 | 5.939494E−05 |
| A14 | −4.968050E−07 | −3.231451E−06 | −3.133806E−05 | −2.039078E−06 | 2.690957E−06 | −4.389645E−06 | −4.564835E−06 |
| A16 | 1.531497E−08 | 1.511465E−07 | 1.312517E−06 | 9.781704E−08 | −1.356427E−07 | 1.687907E−07 | 1.081353E−07 |

| Surface | 9 | 10 | 11 | 12 | 13 | 14 | 15 |
|---|---|---|---|---|---|---|---|
| k | −2.147168E+00 | −1.417610E+00 | −8.098865E−01 | −1.349690E+00 | 1.523105E+01 | −1.420397E−01 | −4.247552E+00 |
| A4 | −2.757887E−03 | 4.473058E−02 | 3.215721E−02 | −1.633779E−02 | −7.157361E−03 | −4.765358E−03 | −4.148944E−03 |
| A6 | −3.779966E−03 | −1.811946E−02 | −9.953447E−03 | 2.870284E−03 | 2.430960E−03 | 1.500432E−03 | 4.018766E−04 |
| A8 | 1.179723E−03 | 4.871273E−03 | 2.395917E−03 | −4.751890E−04 | −3.351483E−04 | −1.853896E−04 | −3.441282E−05 |
| A10 | −2.725621E−04 | −8.658927E−04 | −3.804019E−04 | 4.734240E−05 | 2.166505E−05 | 1.332742E−05 | 1.756637E−06 |

TABLE 4-continued

| | Coefficients of the aspheric surfaces | | | | | |
|---|---|---|---|---|---|---|
| A12 | 3.800871E−05 | 9.274320E−05 | 3.621653E−05 | −3.299378E−06 | −7.320811E−07 | −5.535770E−07 | −5.226930E−08 |
| A14 | −2.865640E−06 | −5.422388E−06 | −1.817585E−06 | 1.287761E−07 | 1.263598E−08 | 1.204853E−08 | 8.341542E−10 |
| A16 | 8.462583E−08 | 1.338454E−07 | 3.786058E−08 | −2.240515E−09 | −8.270280E−11 | −1.054114E−10 | −5.747740E−12 |

An equation of the aspheric surfaces of the second embodiment is the same as that of the first embodiment, and the definitions are the same as well.

The exact parameters of the second embodiment based on Table 3 and Table 4 are listed in the following table:

| Second embodiment (Reference wavelength: 555 nm) | | | | | |
|---|---|---|---|---|---|
| ETP1 | ETP2 | ETP3 | ETP4 | ETP5 | ETP6 |
| 1.156 | 0.613 | 0.599 | 0.715 | 0.732 | 0.852 |
| ETP7 | ETL | EBL | EIN | EIR | PIR |
| 1.111 | 10.269 | 1.317 | 8.952 | 0.878 | 1.000 |
| EIN/ETL | SETP/EIN | EIR/PIR | SETP | STP | SETP/STP |
| 0.872 | 0.645 | 0.878 | 5.777 | 6.196 | 0.932 |
| ETP1/TP1 | ETP2/TP2 | ETP3/TP3 | ETP4/TP4 | ETP5/TP5 | ETP6/TP6 |
| 0.679 | 2.045 | 0.511 | 1.495 | 1.105 | 0.655 |
| ETP7/TP7 | BL | EBL/BL | SED | SIN | SED/SIN |
| 1.911 | 1.439 | 0.9152 | 3.175 | 3.318 | 0.957 |
| ED12 | ED23 | ED34 | ED45 | ED56 | ED67 |
| 0.315 | 0.030 | 0.537 | 0.306 | 1.447 | 0.539 |

-continued

| Second embodiment (Reference wavelength: 555 nm) | | | | | |
|---|---|---|---|---|---|
| ED12/IN12 | ED23/IN23 | ED34/IN34 | ED45/IN45 | ED56/IN56 | ED67/IN67 |
| 0.845 | 0.058 | 2.197 | 0.225 | 28.949 | 0.702 |
| $|f/f1|$ | $|f/f2|$ | $|f/f3|$ | $|f/f4|$ | $|f/f5|$ | $|f/f6|$ |
| 0.7238 | 0.2602 | 0.5209 | 0.0905 | 0.3147 | 1.1403 |
| $|f/f7|$ | ΣPPR | ΣNPR | ΣPPR/ΣNPR | IN12/f | IN67/f |
| 0.9446 | 2.1860 | 1.1194 | 1.9528 | 0.0184 | 0.0589 |
| $|f1/f2|$ | $|f2/f3|$ | (TP1 + IN12)/TP2 | | (TP7 + IN67)/TP6 | |
| 0.1445 | 1.9707 | 3.8697 | | 0.9631 | |
| HOS | InTL | HOS/HOI | InS/HOS | ODT % | TDT % |
| 10.9531 | 9.5145 | 1.4604 | 0.8256 | 28.8819 | 30.9635 |
| HVT11 | HVT12 | HVT21 | HVT22 | HVT31 | HVT32 |
| 0.0000 | 0.0000 | 1.7733 | 2.3058 | 2.5321 | 0.0000 |
| HVT61 | HVT62 | HVT71 | HVT72 | HVT72/HOI | HVT72/HOS |
| 2.3739 | 0.0000 | 0.0000 | 2.9885 | 0.3985 | 0.2728 |
| MTFE0 | MTFE3 | MTFE7 | MTFQ0 | MTFQ3 | MTFQ7 |
| 0.86 | 0.7 | 0.7 | 0.64 | 0.18 | 0.18 |

The results of the equations of the second embodiment based on Table 3 and Table 4 are listed in the following table:

| Values related to the inflection points of the second embodiment | | | | | | | |
|---|---|---|---|---|---|---|---|
| HIF211 | 0.9366 | HIF211/HOI | 0.1249 | SGI211 | 0.0962 | $|SGI211|/(|SGI211| + TP2)$ | 0.2427 |
| HIF221 | 1.2605 | HIF221/HOI | 0.1681 | SGI221 | 0.2081 | $|SGI221|/(|SGI221| + TP2)$ | 0.4095 |
| HIF222 | 2.5812 | HIF222/HOI | 0.3442 | SGI222 | 0.3740 | $|SGI222|/(|SGI222| + TP2)$ | 0.5549 |
| HIF311 | 2.2429 | HIF311/HOI | 0.2990 | SGI311 | −0.0854 | $|SGI311|/(|SGI311| + TP3)$ | 0.0679 |
| HIF321 | 2.5873 | HIF321/HOI | 0.3450 | SGI321 | −0.8600 | $|SGI321|/(|SGI321| + TP3)$ | 0.4232 |
| HIF411 | 0.6530 | HIF411/HOI | 0.0871 | SGI411 | 0.0152 | $|SGI411|/(|SGI411| + TP4)$ | 0.0308 |
| HIF421 | 0.8553 | HIF421/HOI | 0.1140 | SGI421 | 0.0213 | $|SGI421|/(|SGI421| + TP4)$ | 0.0426 |
| HIF521 | 2.6973 | HIF521/HOI | 0.3596 | SGI521 | −1.4739 | $|SGI521|/(|SGI521| + TP5)$ | 0.6900 |
| HIF611 | 1.3749 | HIF611/HOI | 0.1833 | SGI611 | 0.1494 | $|SGI611|/(|SGI611| + TP6)$ | 0.1031 |
| HIF621 | 4.0917 | HIF621/HOI | 0.5456 | SGI621 | −0.9661 | $|SGI621|/(|SGI621| + TP6)$ | 0.4263 |
| HIF622 | 4.6912 | HIF622/HOI | 0.6255 | SGI622 | −1.3669 | $|SGI622|/(|SGI622| + TP6)$ | 0.5125 |
| HIF711 | 4.9710 | HIF711/HOI | 0.6628 | SGI711 | −1.4770 | $|SGI711|/(|SGI711| + TP7)$ | 0.7176 |
| HIF712 | 5.4045 | HIF712/HOI | 0.7206 | SGI712 | −1.7430 | $|SGI712|/(|SGI712| + TP7)$ | 0.7499 |
| HIF721 | 1.5362 | HIF721/HOI | 0.2048 | SGI721 | 0.0700 | $|SGI721|/(|SGI721| + TP7)$ | 0.1075 |

(Reference wavelength: 555 nm)

[Third Embodiment]

Figure 3A:
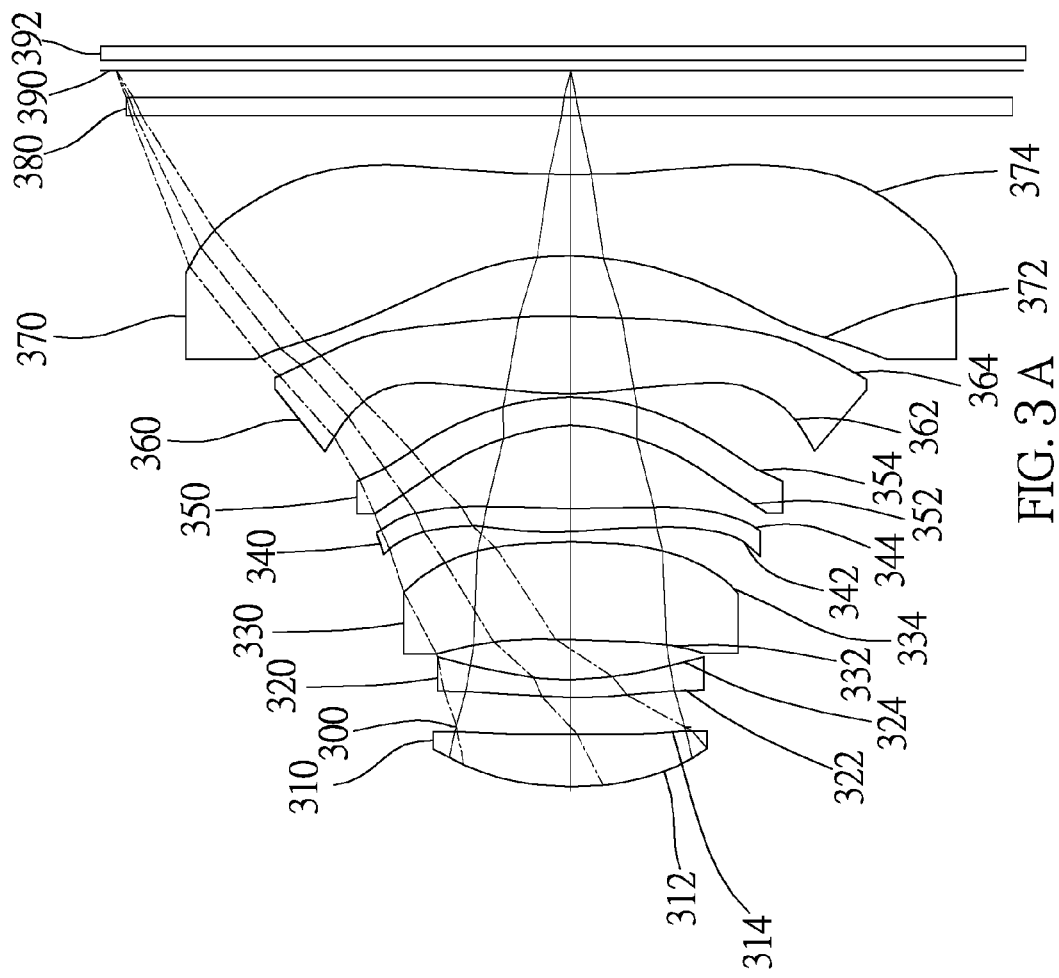
FIG. 3A is a schematic diagram of a third embodiment of the present invention.
Figure 3:
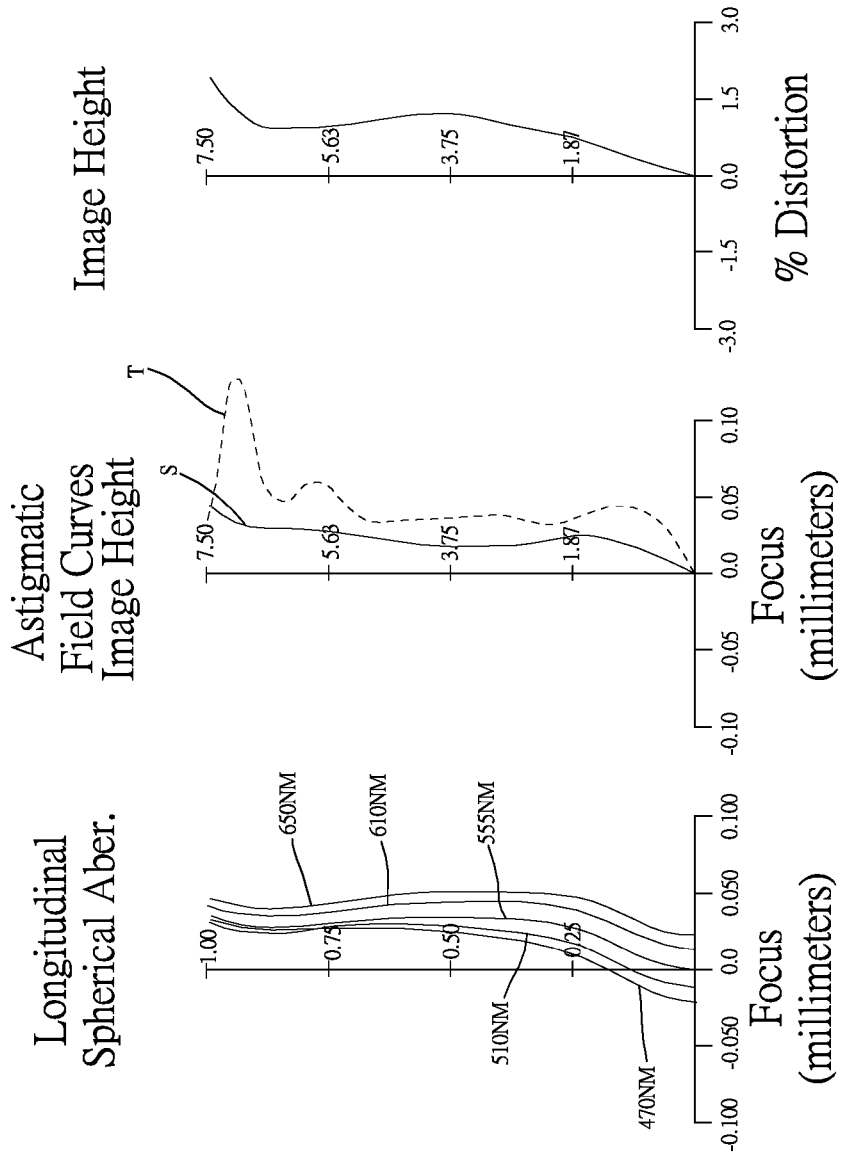
FIG. 3B shows curve diagrams of longitudinal spherical aberration, astigmatic field, and optical distortion of the optical image capturing system in the order from left to right of the third embodiment of the present application.
FIG. 3C shows a feature map of modulation transformation of the optical image capturing system of the third embodiment of the present application in visible spectrum.
Figure 3C:
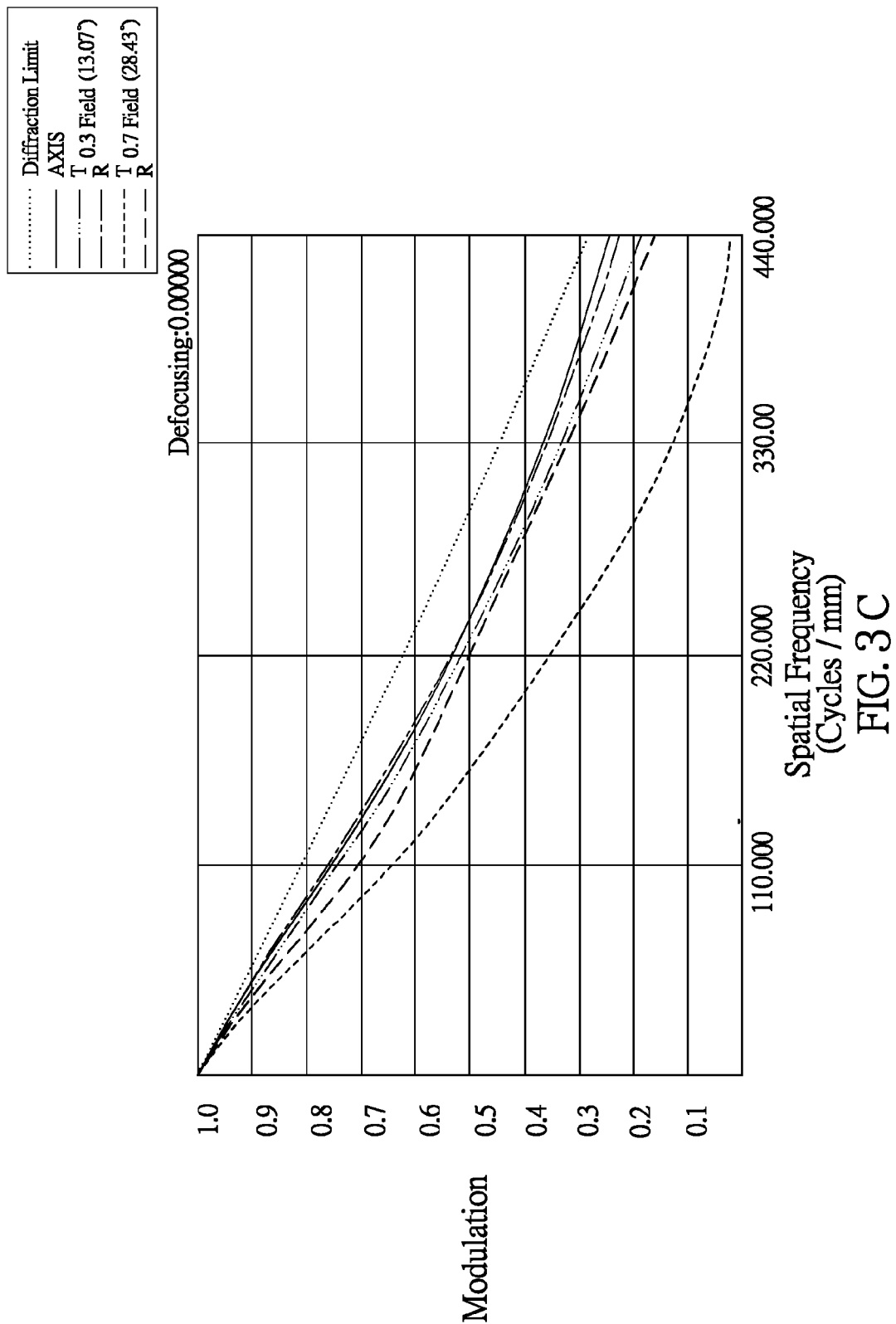

As shown in FIG. 3A and FIG. 3B, an optical image capturing system of the third embodiment of the present invention includes, along an optical axis from an object side to an image side, a first lens 310, an aperture 300, a second lens 320, a third lens 330, a fourth lens 340, a fifth lens 350, a sixth lens 360, a seventh lens 370, an infrared rays filter 380, an image plane 390, and an image sensor 392. FIG. 3C shows a modulation transformation of the optical image capturing system 30 of the third embodiment of the present application in visible spectrum.

The first lens 310 has positive refractive power and is made of plastic. An object-side surface 312 thereof, which faces the object side, is a convex aspheric surface, and an image-side surface 314 thereof, which faces the image side, is a concave aspheric surface.

The second lens 320 has negative refractive power and is made of plastic. An object-side surface 322 thereof, which faces the object side, is a convex aspheric surface, and an image-side surface 324 thereof, which faces the image side, is a concave aspheric surface. The object-side surface 322 has an inflection point.

The third lens 330 has positive refractive power and is made of plastic. An object-side surface 332 thereof, which faces the object side, is a concave aspheric surface, and an image-side surface 334 thereof, which faces the image side, is a convex aspheric surface.

The fourth lens 340 has positive refractive power and is made of plastic. An object-side surface 342, which faces the object side, is a convex aspheric surface, and an image-side surface 344, which faces the image side, is a concave aspheric surface. The object-side surface 342 and the image-side surface 344 both have an inflection point.

The fifth lens 350 has negative refractive power and is made of plastic. An object-side surface 352, which faces the object side, is a concave aspheric surface, and an image-side surface 354, which faces the image side, is a convex aspheric surface. The object-side surface 352 has two inflection points, and the image-side surface 354 has an inflection point.

The sixth lens 360 has positive refractive power and is made of plastic. An object-side surface 362, which faces the object side, is a convex surface, and an image-side surface 364, which faces the image side, is a convex surface. The object-side surface 362 has an inflection point, and the image-side surface 364 has four inflection points. Whereby, the incident angle of each view field entering the sixth lens 360 can be effectively adjusted to improve aberration.

The seventh lens 370 has negative refractive power and is made of plastic. An object-side surface 372, which faces the object side, is a concave surface, and an image-side surface 374, which faces the image side, is a concave surface. It may help to shorten the back focal length to keep small in size. In addition, the object-side surface 372 has two inflection points, and the image-side surface 374 has an inflection point, which may reduce an incident angle of the light of an off-axis field of view and correct the aberration of the off-axis field of view.

The infrared rays filter 380 is made of glass and between the seventh lens 370 and the image plane 390. The infrared rays filter 390 gives no contribution to the focal length of the system.

In the third embodiment, the optical image capturing system of the third embodiment further satisfies ΣPP=78.5104 mm; and f1/ΣPP=0.1151, where ΣPP is a sum of the focal lengths of each positive lens. It is helpful to share the positive refractive power of one single lens to other positive lenses to avoid the significant aberration caused by the incident rays.

The optical image capturing system of the third embodiment further satisfies ΣNP=−45.7313 mm; and f7/ΣNP=0.1319, where ΣNP is a sum of the focal lengths of each negative lens. It is helpful to share the negative refractive power of one single lens to the other negative lens.

The parameters of the lenses of the third embodiment are listed in Table 5 and Table 6.

TABLE 5 f = 9.5618 mm; f/HEP = 2.4; HAF = 37.5 deg

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | 1st lens | 4.458622634 | 0.877 | plastic | 1.565 | 58.00 | 9.039 |
| 2 | | 31.92259502 | 0.132 | | | | |
| 3 | Aperture | plane | 0.486 | | | | |
| 4 | 2nd lens | 6.321588325 | 0.319 | plastic | 1.650 | 21.40 | −19.494 |
| 5 | | 4.144642961 | 0.676 | | | | |
| 6 | 3rd lens | −20.59925719 | 1.649 | plastic | 1.565 | 58.00 | 27.476 |
| 7 | | −9.125206377 | 0.182 | | | | |
| 8 | 4th lens | 10.94722522 | 0.393 | plastic | 1.565 | 58.00 | 33.702 |
| 9 | | 25.31040695 | 1.394 | | | | |
| 10 | 5th lens | −2.265382263 | 0.494 | plastic | 1.650 | 21.40 | −20.204 |
| 11 | | −2.968628844 | 0.057 | | | | |
| 12 | 6th lens | 6.501396026 | 1.324 | plastic | 1.583 | 30.20 | 8.293 |
| 13 | | −17.85062529 | 0.997 | | | | |
| 14 | 7th lens | −5.581859792 | 1.393 | plastic | 1.583 | 30.20 | −6.034 |
| 15 | | 10.55945401 | 1.000 | | | | |
| 16 | Infrared rays filter | plane | 0.300 | BK_7 | 1.517 | 64.2 | |
| 17 | | plane | 0.423 | | | | |
| 18 | Image plane | plane | 0.032 | | | | |

Reference wavelength (d-line): 555 nm.

TABLE 6

Coefficients of the aspheric surfaces

| Surface | 1 | 2 | 4 | 5 | 6 | 7 | 8 |
|---|---|---|---|---|---|---|---|
| k | −6.769918E+00 | −6.188364E+00 | −5.000000E+01 | −4.610981E+00 | 3.619848E+01 | 7.237748E+00 | −6.435971E+00 |
| A4 | 9.837048E−03 | −2.042280E−03 | 2.517370E−03 | −1.235437E−02 | −1.138829E−03 | −4.713368E−03 | −5.984906E−03 |
| A6 | −1.028091E−03 | 5.748931E−04 | −8.151008E−03 | 2.639372E−03 | −3.002219E−04 | −8.957672E−04 | −2.516480E−03 |
| A8 | 1.947168E−04 | −4.338855E−05 | 4.869132E−03 | −7.497695E−05 | −2.687398E−04 | 7.039258E−04 | 1.292396E−03 |
| A10 | −3.693735E−05 | −3.916043E−05 | −1.644482E−03 | −8.622551E−05 | 1.058477E−04 | −2.523668E−04 | −3.632848E−04 |
| A12 | 7.032633E−06 | 2.055394E−05 | 3.290150E−04 | 1.925433E−05 | −1.927678E−05 | 4.735523E−05 | 5.736779E−05 |
| A14 | −8.140090E−07 | −4.306716E−06 | −3.573085E−05 | −1.506259E−06 | 3.547277E−07 | −4.606171E−06 | −4.642640E−06 |
| A16 | 3.109772E−08 | 3.274301E−07 | 1.573251E−06 | 1.805685E−08 | 1.612013E−07 | 1.832176E−07 | 1.469521E−07 |

| Surface | 9 | 10 | 11 | 12 | 13 | 14 | 15 |
|---|---|---|---|---|---|---|---|
| k | −5.000000E+01 | −1.126207E+00 | −6.621843E−01 | −8.901952E+00 | 1.137843E+01 | −5.654885E−02 | −6.181232E−01 |
| A4 | −9.357064E−04 | 4.514442E−02 | 2.856261E−02 | −1.273411E−02 | −6.416628E−03 | −5.280222E−03 | −5.381431E−03 |
| A6 | −3.040558E−03 | −1.809690E−02 | −1.009240E−02 | 3.050361E−03 | 2.448657E−03 | 1.523583E−03 | 4.360113E−04 |
| A8 | 1.151924E−03 | 4.843654E−03 | 2.419435E−03 | −5.107229E−04 | −3.344984E−04 | −1.838859E−04 | −3.472939E−05 |
| A10 | −2.760117E−04 | −8.632331E−04 | −3.794917E−04 | 4.934688E−05 | 2.168603E−05 | 1.337660E−05 | 1.755233E−06 |
| A12 | 3.872468E−05 | 9.340766E−05 | 3.615582E−05 | −3.223107E−06 | −7.308963E−07 | −5.527811E−07 | −5.233690E−08 |
| A14 | −2.791092E−06 | −5.377363E−06 | −1.828714E−06 | 1.292612E−07 | 1.260641E−08 | 1.203841E−08 | 8.353595E−10 |
| A16 | 7.822557E−08 | 1.250015E−07 | 3.741685E−08 | −2.293268E−09 | −9.118725E−11 | −1.078366E−10 | −5.527053E−12 |

An equation of the aspheric surfaces of the third embodiment is the same as that of the first embodiment, and the definitions are the same as well.

The exact parameters of the third embodiment based on Table 5 and Table 6 are listed in the following table:

Third embodiment (Reference wavelength: 555 nm)

| ETP1 | ETP2 | ETP3 | ETP4 | ETP5 | ETP6 |
|---|---|---|---|---|---|
| 0.495 | 0.492 | 1.506 | 0.344 | 0.586 | 1.051 |

| ETP7 | ETL | EBL | EIN | EIR | PIR |
|---|---|---|---|---|---|
| 1.858 | 11.702 | 1.640 | 10.062 | 0.884 | 1.000 |

| EIN/ETL | SETP/EIN | EIR/PIR | SETP | STP | SETP/STP |
|---|---|---|---|---|---|
| 0.860 | 0.629 | 0.884 | 6.333 | 6.448 | 0.982 |

| ETP1/TP1 | ETP2/TP2 | ETP3/TP3 | ETP4/TP4 | ETP5/TP5 | ETP6/TP6 |
|---|---|---|---|---|---|
| 0.565 | 1.541 | 0.914 | 0.875 | 1.188 | 0.794 |

| ETP7/TP7 | BL | EBL/BL | SED | SIN | SED/SIN |
|---|---|---|---|---|---|
| 1.334 | 1.756 | 0.9339 | 3.729 | 3.925 | 0.950 |

| ED12 | ED23 | ED34 | ED45 | ED56 | ED67 |
|---|---|---|---|---|---|
| 0.700 | 0.239 | 0.516 | 0.814 | 0.695 | 0.765 |

Third embodiment (Reference wavelength: 555 nm)

| ED12/IN12 | ED23/IN23 | ED34/IN34 | ED45/IN45 | ED56/IN56 | ED67/IN67 |
|---|---|---|---|---|---|
| 1.132 | 0.353 | 2.837 | 0.584 | 12.136 | 0.767 |

| |f/f1| | |f/f2| | |f/f3| | |f/f4| | |f/f5| | |f/f6| |
|---|---|---|---|---|---|
| 1.0578 | 0.4905 | 0.3480 | 0.2837 | 0.4733 | 1.1531 |

| |f/f7| | ΣPPR | ΣNPR | ΣPPR/|ΣNPR| | IN12/f | IN67/f |
|---|---|---|---|---|---|
| 1.5847 | 2.8426 | 2.5485 | 1.1154 | 0.0647 | 0.1043 |

| |f1/f2| | |f2/f3| | (TP1 + IN12)/TP2 | | (TP7 + IN67)/TP6 | |
|---|---|---|---|---|---|
| 0.4637 | 0.7095 | 4.6868 | | 1.8055 | |

| HOS | InTL | HOS/HOI | InS/HOS | ODT % | TDT % |
|---|---|---|---|---|---|
| 12.1287 | 10.3731 | 1.6172 | 0.9168 | 1.9999 | 1.0913 |

| HVT11 | HVT12 | HVT21 | HVT22 | HVT31 | HVT32 |
|---|---|---|---|---|---|
| 0.0000 | 0.0000 | 0.0000 | 0.0000 | 0.0000 | 0.0000 |

| HVT61 | HVT62 | HVT71 | HVT72 | HVT72/HOI | HVT72/HOS |
|---|---|---|---|---|---|
| 2.3701 | 0.0000 | 0.0000 | 2.9021 | 0.3870 | 0.2393 |

| MTFE0 | MTFE3 | MTFE7 | MTFQ0 | MTFQ3 | MTFQ7 |
|---|---|---|---|---|---|
| 0.88 | 0.87 | 0.85 | 0.76 | 0.75 | 0.65 |

The results of the equations of the third embodiment based on Table 5 and Table 6 are listed in the following table:

| \multicolumn{7}{c}{Values related to the inflection points of the third embodiment} |||||||
| --- | --- | --- | --- | --- | --- | --- |
| HIF211 | 0.9746 | HIF211/HOI | 0.1299 | SGI211 | 0.0590 | \|SGI211\|/(\|SGI211\| + TP2) | 0.1560 |
| HIF411 | 0.9274 | HIF411/HOI | 0.1237 | SGI411 | 0.0334 | \|SGI411\|/(\|SGI411\| + TP4) | 0.0784 |
| HIF421 | 0.8439 | HIF421/HOI | 0.1125 | SGI421 | 0.0126 | \|SGI421\|/(\|SGI421\| + TP4) | 0.0310 |
| HIF511 | 2.5530 | HIF511/HOI | 0.3404 | SGI511 | −1.0094 | \|SGI511\|/(\|SGI511\| + TP5) | 0.6716 |
| HIF512 | 3.0072 | HIF512/HOI | 0.4010 | SGI512 | −1.3198 | \|SGI512\|/(\|SGI512\| + TP5) | 0.7278 |
| HIF521 | 2.6861 | HIF521/HOI | 0.3581 | SGI521 | −0.9666 | \|SGI521\|/(\|SGI521\| + TP5) | 0.6620 |
| HIF611 | 1.2794 | HIF611/HOI | 0.1706 | SGI611 | 0.0936 | \|SGI611\|/(\|SGI611\| + TP6) | 0.0660 |
| HIF621 | 1.8102 | HIF621/HOI | 0.2414 | SGI621 | −0.1089 | \|SGI621\|/(\|SGI621\| + TP6) | 0.0760 |
| HIF622 | 2.1205 | HIF622/HOI | 0.2827 | SGI622 | −0.1416 | \|SGI622\|/(\|SGI622\| + TP6) | 0.0966 |
| HIF623 | 4.0505 | HIF623/HOI | 0.5401 | SGI623 | −0.6438 | \|SGI623\|/(\|SGI623\| + TP6) | 0.3272 |
| HIF624 | 4.3558 | HIF624/HOI | 0.5808 | SGI624 | −0.7849 | \|SGI624\|/(\|SGI624\| + TP6) | 0.3722 |
| HIF711 | 3.1387 | HIF711/HOI | 0.4185 | SGI711 | −0.9134 | \|SGI711\|/(\|SGI711\| + TP7) | 0.3960 |
| HIF712 | 4.6732 | HIF712/HOI | 0.6231 | SGI712 | −1.5278 | \|SGI712\|/(\|SGI712\| + TP7) | 0.5230 |
| HIF721 | 1.4794 | HIF721/HOI | 0.1973 | SGI721 | 0.0819 | \|SGI721\|/(\|SGI721\| + TP7) | 0.0555 |

(Reference wavelength: 555 nm)

[Fourth Embodiment]

Figure 4A:
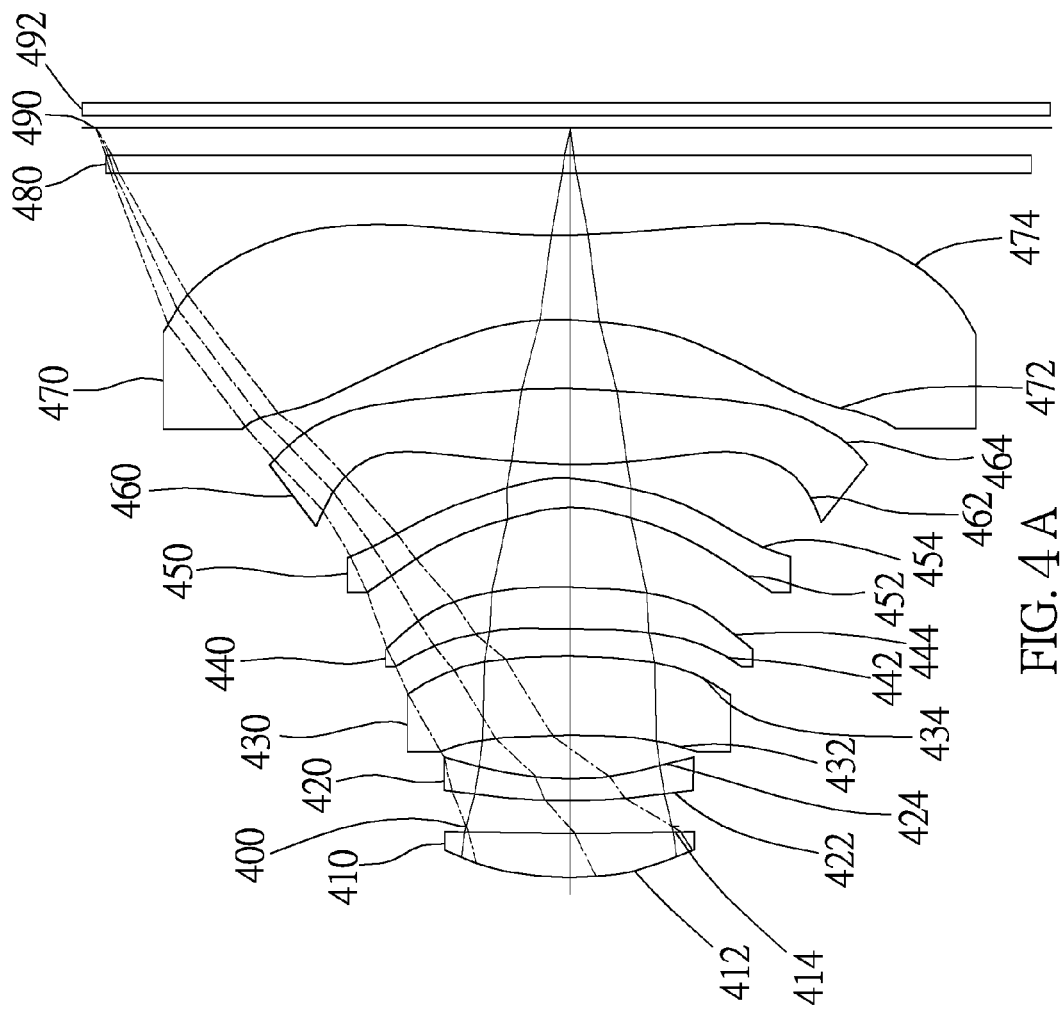
FIG. 4A is a schematic diagram of a fourth embodiment of the present invention.
Figure 4B:
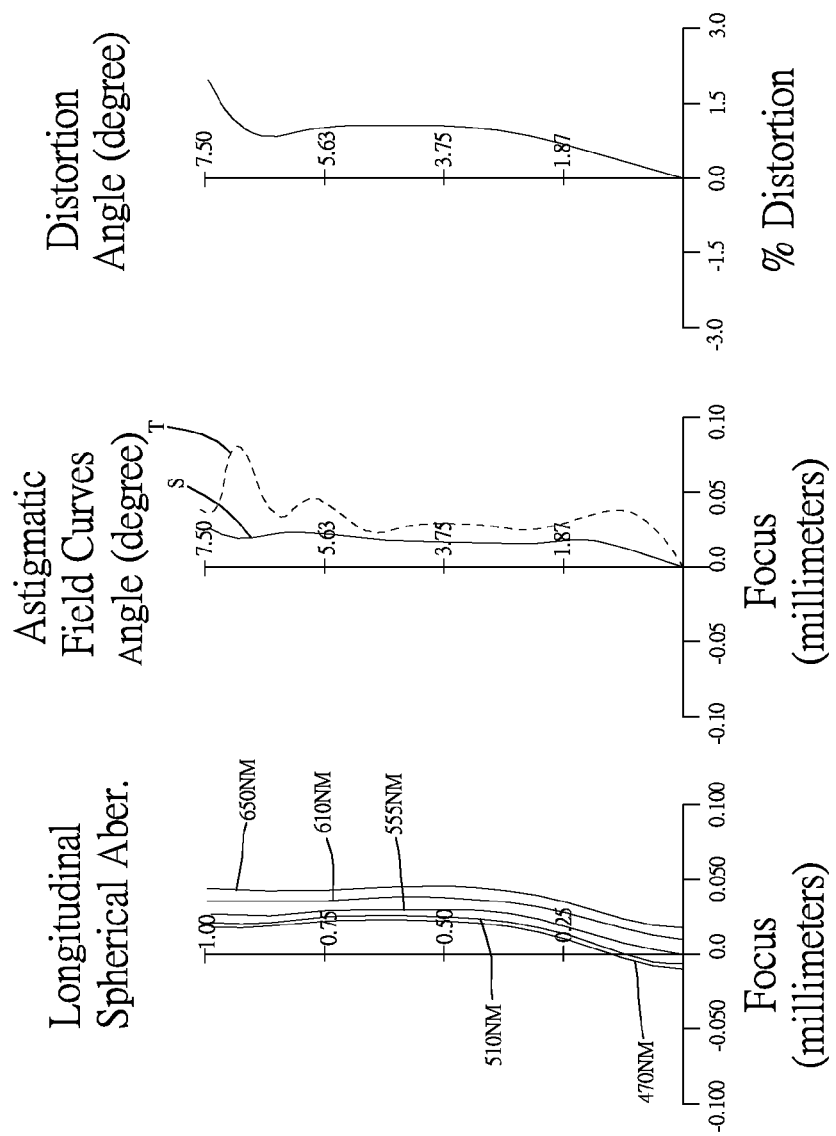
FIG. 4B shows curve diagrams of longitudinal spherical aberration, astigmatic field, and optical distortion of the optical image capturing system in the order from left to right of the fourth embodiment of the present application.
Figure 4C:
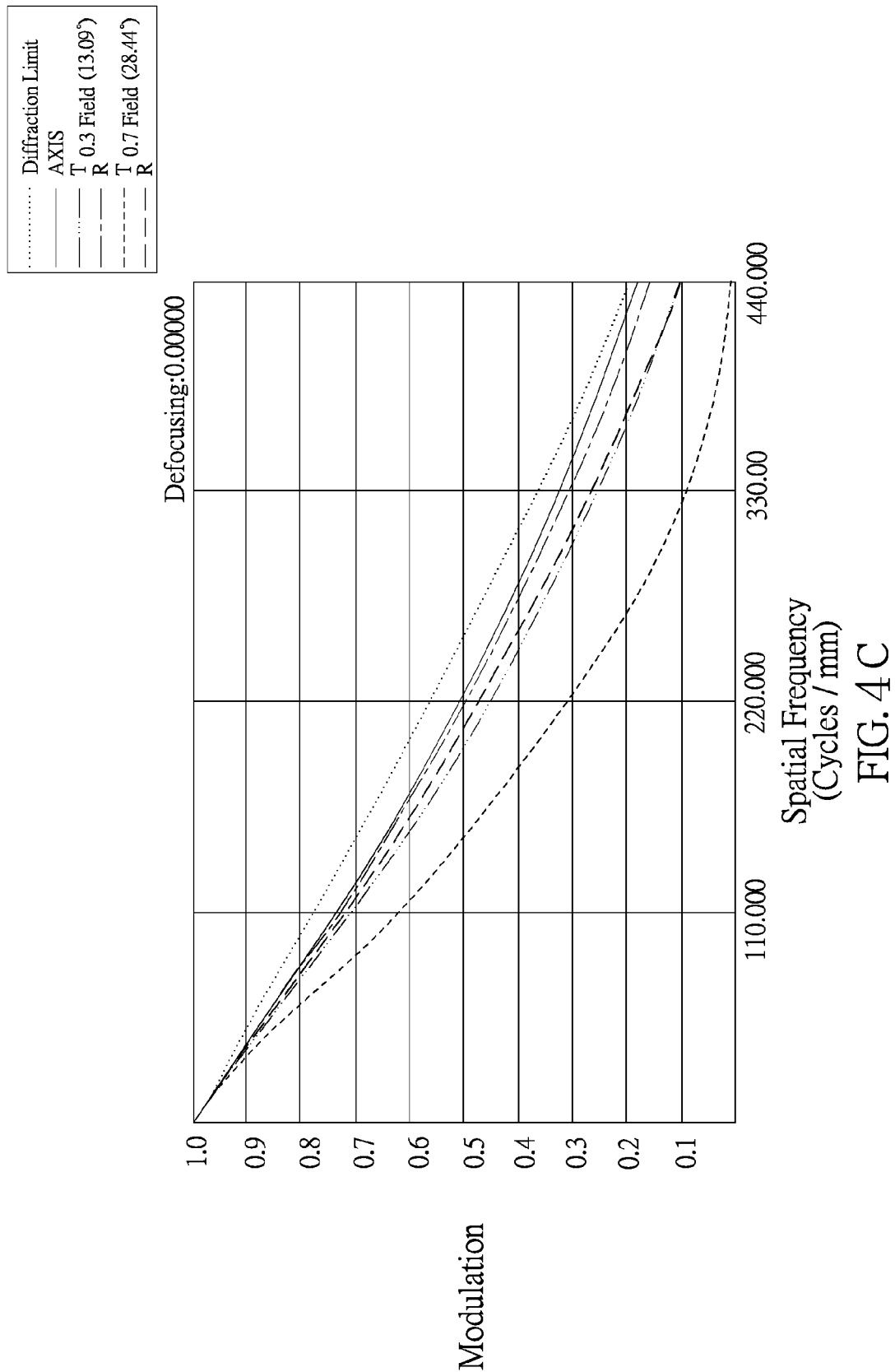
FIG. 4C shows a feature map of modulation transformation of the optical image capturing system of the fourth embodiment in visible spectrum.

As shown in FIG. 4A and FIG. 4B, an optical image capturing system 40 of the fourth embodiment of the present invention includes, along an optical axis from an object side to an image side, a first lens 410, an aperture 400, a second lens 420, a third lens 430, a fourth lens 440, a fifth lens 450, a sixth lens 460, a seventh lens 470, an infrared rays filter 480, an image plane 490, and an image sensor 492. FIG. 4C shows a modulation transformation of the optical image capturing system 40 of the fourth embodiment of the present application in visible spectrum.

The first lens 410 has positive refractive power and is made of plastic. An object-side surface 412 thereof, which faces the object side, is a convex aspheric surface, and an image-side surface 414 thereof, which faces the image side, is a concave aspheric surface.

The second lens 420 has negative refractive power and is made of plastic. An object-side surface 422 thereof, which faces the object side, is a convex aspheric surface, and an image-side surface 424 thereof, which faces the image side, is a concave aspheric surface. The object-side surface 422 has an inflection point.

The third lens 430 has positive refractive power and is made of plastic. An object-side surface 432 thereof, which faces the object side, is a concave aspheric surface, and an image-side surface 434 thereof, which faces the image side, is a convex aspheric surface.

The fourth lens 440 has positive refractive power and is made of plastic. An object-side surface 442, which faces the object side, is a concave aspheric surface, and an image-side surface 444, which faces the image side, is a convex aspheric surface. The object-side surface 442 and the image-side surface 444 both have an inflection point.

The fifth lens 450 has negative refractive power and is made of plastic. An object-side surface 452, which faces the object side, is a concave aspheric surface, and an image-side surface 454, which faces the image side, is a convex aspheric surface. The object-side surface 452 has three inflection points, and the image-side surface 454 has an inflection point.

The sixth lens 460 has positive refractive power and is made of plastic. An object-side surface 462, which faces the object side, is a convex surface, and an image-side surface 464, which faces the image side, is a convex surface. The object-side surface 462 has an inflection point, and the image-side surface 464 has two inflection points. Whereby, the incident angle of each view field entering the sixth lens 460 can be effectively adjusted to improve aberration.

The seventh lens 470 has negative refractive power and is made of plastic. An object-side surface 472, which faces the object side, is a concave surface, and an image-side surface 474, which faces the image side, is a concave surface. It may help to shorten the back focal length to keep small in size. In addition, the object-side surface 472 has an inflection point, and the image-side surface 474 has an inflection point, which may reduce an incident angle of the light of an off-axis field of view and correct the aberration of the off-axis field of view.

The infrared rays filter 480 is made of glass and between the seventh lens 470 and the image plane 490. The infrared rays filter 480 gives no contribution to the focal length of the system.

In the fourth embodiment, the optical image capturing system of the fourth embodiment further satisfies ΣPP=78.8784 mm; and f1/ΣPP=0.1113, where ΣPP is a sum of the focal lengths of each positive lens. It is helpful to share the positive refractive power of one single lens to other positive lenses to avoid the significant aberration caused by the incident rays.

The optical image capturing system of the fourth embodiment further satisfies ΣNP=−42.9439 mm; and f7/ΣNP=0.1363, where ΣNP is a sum of the focal lengths of each negative lens. It is helpful to share the negative refractive power of the sixth lens 460 to the other negative lens.

The parameters of the lenses of the fourth embodiment are listed in Table 7 and Table 8.

TABLE 7 f = 9.5666 mm; f/HEP = 2.8; HAF = 37.5 deg

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | 1st lens | 4.788559965 | 0.728 | plastic | 1.565 | 58.00 | 8.775 |
| 2 | | 121.5515646 | 0.108 | | | | |
| 3 | Aperture | plane | 0.425 | | | | |
| 4 | 2nd lens | 6.563453471 | 0.353 | plastic | 1.650 | 21.40 | −18.156 |
| 5 | | 4.140212814 | 0.686 | | | | |
| 6 | 3rd lens | −15.64535928 | 1.318 | plastic | 1.565 | 58.00 | 40.219 |
| 7 | | −9.560449295 | 0.449 | | | | |
| 8 | 4th lens | −26.50102493 | 0.681 | plastic | 1.565 | 58.00 | 21.587 |
| 9 | | −8.448471717 | 1.275 | | | | |
| 10 | 5th lens | −2.3703115 | 0.458 | plastic | 1.650 | 21.40 | −18.933 |
| 11 | | −3.154082475 | 0.260 | | | | |
| 12 | 6th lens | 6.350358479 | 1.224 | plastic | 1.583 | 30.20 | 8.297 |
| 13 | | −19.33348548 | 1.128 | | | | |
| 14 | 7th lens | −5.556630688 | 1.387 | plastic | 1.583 | 30.20 | −5.855 |
| 15 | | 9.81809086 | 1.000 | | | | |
| 16 | Infrared rays filter | plane | 0.300 | BK_7 | 1.517 | 64.2 | |
| 17 | | plane | 0.421 | | | | |
| 18 | Image plane | plane | 0.027 | | | | |

Reference wavelength (d-line): 555 nm.

TABLE 8

Coefficients of the aspheric surfaces

| | Surface | | | | | | |
|---|---|---|---|---|---|---|---|
| | 1 | 2 | 4 | 5 | 6 | 7 | 8 |
| k | −8.541451E+00 | 5.000000E+01 | −5.000000E+01 | −1.255860E+00 | 3.438780E+01 | 1.037012E+01 | 5.000000E+01 |
| A4 | 1.054197E−02 | 1.458164E−04 | 7.218547E−03 | −1.329818E−02 | −3.083862E−03 | −4.374156E−03 | −6.951863E−03 |
| A6 | −1.095839E−03 | 4.265172E−04 | −8.070234E−03 | 2.322558E−03 | −1.147034E−04 | −8.820916E−04 | −2.543939E−03 |
| A8 | 1.593040E−04 | −1.125463E−04 | 4.485382E−03 | −2.002043E−04 | −1.578306E−04 | 7.109484E−04 | 1.290083E−03 |
| A10 | −1.021325E−05 | −6.667591E−07 | −1.623724E−03 | −5.609750E−05 | 5.573740E−05 | −2.462473E−04 | −3.645877E−04 |
| A12 | 5.847968E−06 | 2.186462E−05 | 3.553178E−04 | 2.358188E−05 | −1.417555E−05 | 4.756165E−05 | 5.753038E−05 |
| A14 | −2.275257E−06 | −8.495319E−06 | −3.942184E−05 | −1.810874E−06 | 1.976971E−06 | −4.611415E−06 | −4.629210E−06 |
| A16 | 2.721299E−07 | 1.040794E−06 | 1.370809E−06 | −1.298768E−07 | −1.119901E−07 | 1.685553E−07 | 1.516391E−07 |

| | Surface | | | | | | |
|---|---|---|---|---|---|---|---|
| | 9 | 10 | 11 | 12 | 13 | 14 | 15 |
| k | 5.330959E+00 | −1.196341E+00 | −6.824307E−01 | −6.404575E+00 | 1.484850E+01 | −5.580928E−02 | −2.903132E−01 |
| A4 | −8.044999E−04 | 4.578808E−02 | 2.909557E−02 | −1.322926E−02 | −6.285271E−03 | −5.164617E−03 | −5.610506E−03 |
| A6 | −3.038872E−03 | −1.803425E−02 | −1.009390E−02 | 3.112061E−03 | 2.449247E−03 | 1.520939E−03 | 4.474495E−04 |
| A8 | 1.141016E−03 | 4.834947E−03 | 2.420551E−03 | −5.106637E−04 | −3.348453E−04 | −1.839025E−04 | −3.491290E−05 |
| A10 | −2.772937E−04 | −8.645702E−04 | −3.797089E−04 | 4.934527E−05 | 2.166639E−05 | 1.337651E−05 | 1.753545E−06 |
| A12 | 3.833665E−05 | 9.332471E−05 | 3.611415E−05 | −3.220971E−06 | −7.315875E−07 | −5.527936E−07 | −5.231885E−08 |
| A14 | −2.807598E−06 | −5.374714E−06 | −1.831530E−06 | 1.291317E−07 | 1.259274E−08 | 1.203746E−08 | 8.361821E−10 |
| A16 | 9.023221E−08 | 1.260842E−07 | 3.774371E−08 | −2.360800E−09 | −9.081864E−11 | −1.079155E−10 | −5.517533E−12 |

An equation of the aspheric surfaces of the fourth embodiment is the same as that of the first embodiment, and the definitions are the same as well.

The exact parameters of the fourth embodiment based on Table 7 and Table 8 are listed in the following table:

Fourth embodiment (Reference wavelength: 555 nm)

| ETP1 | ETP2 | ETP3 | ETP4 | ETP5 | ETP6 |
|---|---|---|---|---|---|
| 0.450 | 0.474 | 1.257 | 0.599 | 0.533 | 1.003 |

Fourth embodiment (Reference wavelength: 555 nm)

| ETP7 | ETL | EBL | EIN | EIR | PIR |
|---|---|---|---|---|---|
| 1.749 | 11.934 | 1.645 | 10.289 | 0.897 | 1.000 |

| EIN/ETL | SETP/EIN | EIR/PIR | SETP | STP | SETP/STP |
|---|---|---|---|---|---|
| 0.862 | 0.590 | 0.897 | 6.065 | 6.149 | 0.986 |

| ETP1/TP1 | ETP2/TP2 | ETP3/TP3 | ETP4/TP4 | ETP5/TP5 | ETP6/TP6 |
|---|---|---|---|---|---|
| 0.618 | 1.344 | 0.953 | 0.880 | 1.164 | 0.819 |

-continued

Fourth embodiment (Reference wavelength: 555 nm)

| ETP7/TP7 | BL | EBL/BL | SED | SIN | SED/SIN |
|---|---|---|---|---|---|
| 1.261 | 1.748 | 0.9411 | 4.223 | 4.331 | 0.975 |
| ED12 | ED23 | ED34 | ED45 | ED56 | ED67 |
| 0.651 | 0.308 | 0.517 | 1.066 | 0.730 | 0.952 |
| ED12/IN12 | ED23/IN23 | ED34/IN34 | ED45/IN45 | ED56/IN56 | ED67/IN67 |
| 1.220 | 0.449 | 1.149 | 0.836 | 2.808 | 0.844 |
| \|f/f1\| | \|f/f2\| | \|f/f3\| | \|f/f4\| | \|f/f5\| | \|f/f6\| |
| 1.0902 | 0.5269 | 0.2379 | 0.4432 | 0.5053 | 1.1530 |
| \|f/f7\| | ΣPPR | ΣNPR | ΣPPR/\|ΣNPR\| | IN12/f | IN67/f |
| 1.6339 | 2.9242 | 2.6661 | 1.0968 | 0.0557 | 0.1179 |
| \|f1/f2\| | \|f2/f3\| | (TP1 + IN12)/TP2 | | (TP7 + IN67)/TP6 | |
| 0.4833 | 0.4514 | 3.5722 | | 2.0547 | |
| HOS | InTL | HOS/HOI | InS/HOS | ODT % | TDT % |
| 12.2277 | 10.4799 | 1.6304 | 0.9317 | 2.0000 | 1.1825 |
| HVT11 | HVT12 | HVT21 | HVT22 | HVT31 | HVT32 |
| 0.0000 | 0.0000 | 0.0000 | 0.0000 | 0.0000 | 0.0000 |
| HVT61 | HVT62 | HVT71 | HVT72 | HVT72/HOI | HVT72/HOS |
| 2.4666 | 0.0000 | 0.0000 | 3.0243 | 0.4032 | 0.2473 |
| MTFE0 | MTFE3 | MTFE7 | MTFQ0 | MTFQ3 | MTFQ7 |
| 0.88 | 0.87 | 0.85 | 0.74 | 0.73 | 0.63 |

The results of the equations of the fourth embodiment based on Table 7 and Table 8 are listed in the following table:

Values related to the inflection points of the fourth embodiment
(Reference wavelength: 555 nm)

| HIF211 | 1.2844 | HIF211/HOI | 0.1712 | SGI211 | 0.0959 | \|SGI211\|/(\|SGI211\| + TP2) | 0.2137 |
|---|---|---|---|---|---|---|---|
| HIF411 | 2.6305 | HIF411/HOI | 0.3507 | SGI411 | −0.5590 | \|SGI411\|/(\|SGI411\| + TP4) | 0.4507 |
| HIF421 | 2.7033 | HIF421/HOI | 0.3604 | SGI421 | −0.8491 | \|SGI421\|/(\|SGI421\| + TP4) | 0.5549 |
| HIF511 | 2.6892 | HIF511/HOI | 0.3586 | SGI511 | −1.0098 | \|SGI511\|/(\|SGI511\| + TP5) | 0.6880 |
| H1F512 | 2.9994 | HIF512/HOI | 0.3999 | SGI512 | −1.2196 | \|SGI512\|/(\|SGI512\| + TP5) | 0.7270 |
| HIF513 | 3.1429 | HIF513/HOI | 0.4191 | SGI513 | −1.3157 | \|SGI513\|/(\|SGI513\| + TP5) | 0.7418 |
| HIF521 | 2.6929 | HIF521/HOI | 0.3591 | SGI521 | −0.8562 | \|SGI521\|/(\|SGI521\| + TP5) | 0.6515 |
| HIF611 | 1.3753 | HIF611/HOI | 0.1834 | SGI611 | 0.1088 | \|SGI611\|/(\|SGI611\| + TP6) | 0.0816 |
| HIF621 | 1.7184 | HIF621/HOI | 0.2291 | SGI621 | −0.0917 | \|SGI621\|/(\|SGI621\| + TP6) | 0.0697 |
| HIF622 | 2.1923 | HIF622/HOI | 0.2923 | SGI622 | −0.1360 | \|SGI622\|/(\|SGI622\| + TP6) | 0.1000 |
| HIF711 | 3.1340 | HIF711/HOI | 0.4179 | SGI711 | −0.9079 | \|SGI711\|/(\|SGI711\| + TP7) | 0.3956 |
| HIF712 | 4.5559 | HIF712/HOI | 0.6075 | SGI712 | −1.4952 | \|SGI712\|/(\|SGI712\| + TP7) | 0.5188 |
| HIF721 | 1.5264 | HIF721/HOI | 0.2035 | SGI721 | 0.0935 | \|SGI721\|/(\|SGI721\| + TP7) | 0.0631 |

[Fifth Embodiment]

Figure 5A:
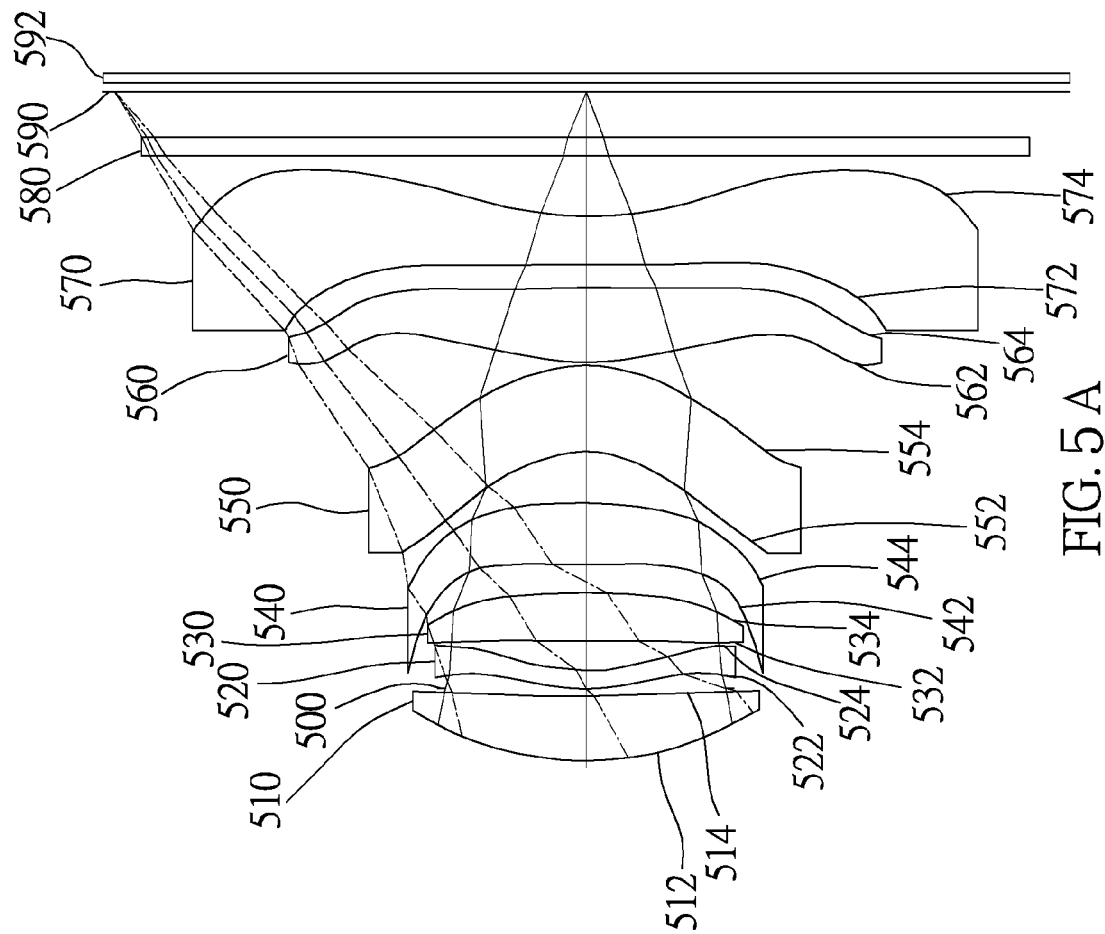
FIG. 5A is a schematic diagram of a fifth embodiment of the present invention.
Figure 5:
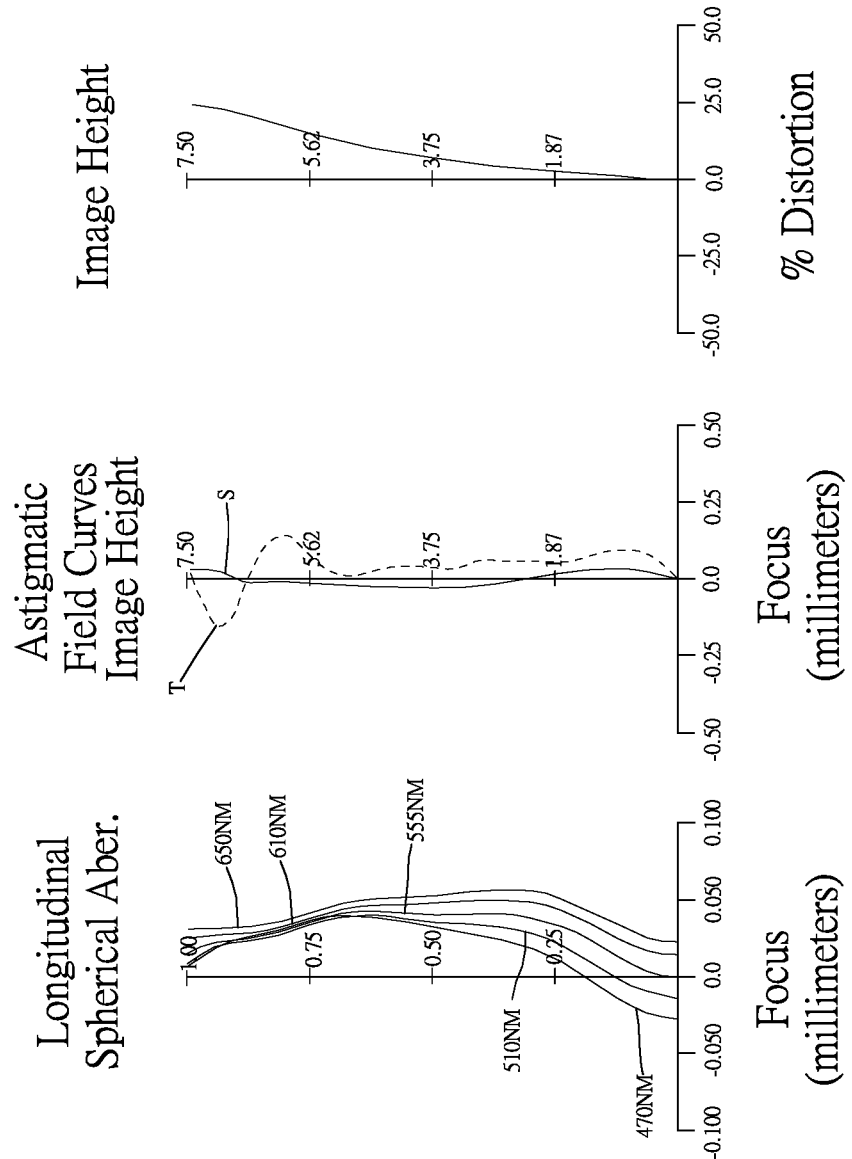
FIG. 5B shows curve diagrams of longitudinal spherical aberration, astigmatic field, and optical distortion of the optical image capturing system in the order from left to right of the fifth embodiment of the present application.
FIG. 5C shows a feature map of modulation transformation of the optical image capturing system of the fifth embodiment of the present application in visible spectrum.
Figure 5:
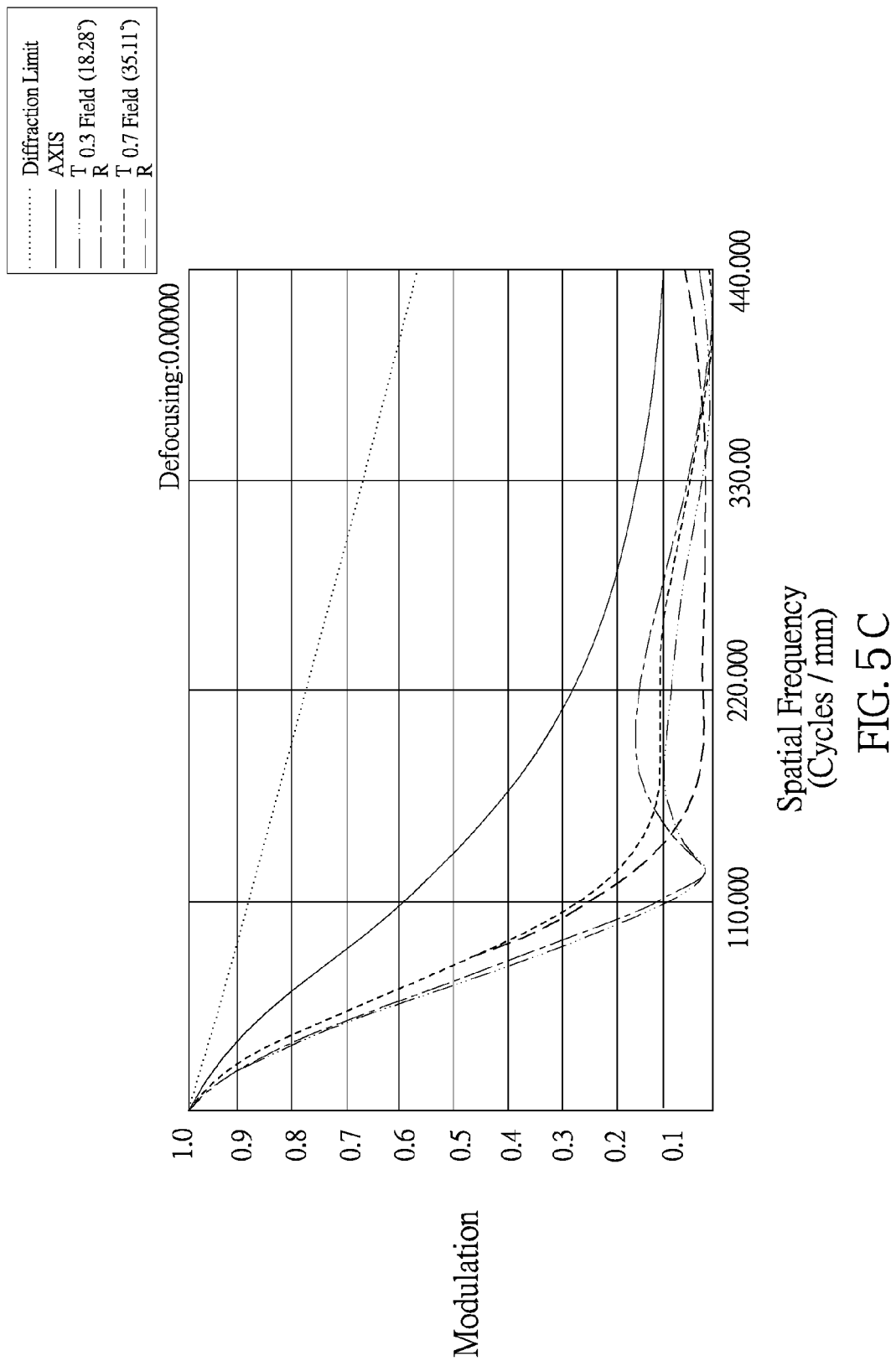

As shown in FIG. 5A and FIG. 5B, an optical image capturing system of the fifth embodiment of the present invention includes, along an optical axis from an object side to an image side, a first lens 510, an aperture 500, a second lens 520, a third lens 530, a fourth lens 540, a fifth lens 550, a sixth lens 560, a seventh lens 570, an infrared rays filter 580, an image plane 590, and an image sensor 592. FIG. 5C shows a modulation transformation of the optical image capturing system 50 of the fifth embodiment of the present application in visible spectrum, and FIG. 5D shows a modulation transformation of the optical image capturing system 50 of the fifth embodiment of the present application in infrared spectrum.

The first lens 510 has positive refractive power and is made of plastic. An object-side surface 512, which faces the object side, is a convex aspheric surface, and an image-side surface 514, which faces the image side, is a concave aspheric surface.

The second lens 520 has negative refractive power and is made of plastic. An object-side surface 522 thereof, which faces the object side, is a convex aspheric surface, and an image-side surface 524 thereof, which faces the image side, is a concave aspheric surface. The object-side surface 522 and the image-side surface 524 both have an inflection point.

The third lens 530 has positive refractive power and is made of plastic. An object-side surface 532, which faces the object side, is a convex aspheric surface, and an image-side surface 534, which faces the image side, is a convex aspheric surface. The object-side surface 532 has two inflection points.

The fourth lens 540 has positive refractive power and is made of plastic. An object-side surface 542, which faces the object side, is a convex aspheric surface, and an image-side surface 544, which faces the image side, is a convex aspheric surface. The object-side surface 542 has an inflection point.

The fifth lens 550 has negative refractive power and is made of plastic. An object-side surface 552, which faces the object side, is a concave aspheric surface, and an image-side surface 554, which faces the image side, is a convex aspheric surface. The object-side surface 552 has two inflection points, and the image-side surface 554 has an inflection point.

The sixth lens 560 has positive refractive power and is made of plastic. An object-side surface 562, which faces the object side, is a convex surface, and an image-side surface 564, which faces the image side, is a convex surface. The object-side surface 562 has two inflection points, and the image-side surface 564 has three inflection points. Whereby, the incident angle of each view field entering the sixth lens 560 can be effectively adjusted to improve aberration.

The seventh lens 570 has negative refractive power and is made of plastic. An object-side surface 572, which faces the object side, is a concave surface, and an image-side surface 574, which faces the image side, is a concave surface. It may help to shorten the back focal length to keep small in size. In addition, the object-side surface 572 has two inflection points, and the image-side surface 574 has an inflection point, which may reduce an incident angle of the light of an off-axis field of view and correct the aberration of the off-axis field of view.

The infrared rays filter 580 is made of glass and between the seventh lens 570 and the image plane 590. The infrared rays filter 580 gives no contribution to the focal length of the system.

In the fifth embodiment, the optical image capturing system of the fifth embodiment further satisfies ΣPP=77.0412 mm; and f1/ΣPP=0.1705, where ΣPP is a sum of the focal lengths of each positive lens. It is helpful to share the positive refractive power of one single lens to other positive lenses to avoid the significant aberration caused by the incident rays.

The optical image capturing system of the fifth embodiment further satisfies ΣNP=−162.0436 mm; and f7/ΣNP=0.0429, where ΣNP is a sum of the focal lengths of each negative lens. It is helpful to share the negative refractive power of one single lens to the other negative lens.

The parameters of the lenses of the fifth embodiment are listed in Table 9 and Table 10.

TABLE 9 f = 6.5733 mm; f/HEP = 1.4; HAF = 42.5 deg

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | 1st lens | 5.446364908 | 1.040 | plastic | 1.565 | 58.00 | 13.139 |
| 2 | | 18.87365407 | 0.121 | | | | |
| 3 | Aperture | plane | 0.000 | | | | |
| 4 | 2nd lens | 3.396487656 | 0.300 | plastic | 1.650 | 21.40 | −90.957 |
| 5 | | 3.101036314 | 0.471 | | | | |
| 6 | 3rd lens | 1111.885105 | 0.771 | plastic | 1.565 | 54.50 | 46.154 |
| 7 | | −26.78814758 | 0.468 | | | | |
| 8 | 4th lens | 21.12493198 | 1.022 | plastic | 1.565 | 58.00 | 10.650 |
| 9 | | −8.303556039 | 0.829 | | | | |
| 10 | 5th lens | −1.857091195 | 1.420 | plastic | 1.650 | 21.40 | −64.128 |
| 11 | | −2.531101729 | 0.050 | | | | |
| 12 | 6th lens | 4.26425423 | 1.222 | plastic | 1.565 | 58.00 | 7.098 |
| 13 | | −63.72206001 | 0.387 | | | | |
| 14 | 7th lens | −23.65770031 | 0.790 | plastic | 1.650 | 21.40 | −6.959 |
| 15 | | 5.725020915 | 1.000 | | | | |
| 16 | Infrared rays filter | plane | 0.300 | BK_7 | 1.517 | 64.2 | |
| 17 | | plane | 0.715 | | | | |
| 18 | Image plane | plane | 0.031 | | | | |

Reference wavelength (d-line): 555 nm; the position of blocking light: blocking at the first surface with effective semi diameter of 2.750 mm; blocking at the seventh surface with effective semi diameter of 2.500 mm.

TABLE 10

Coefficients of the aspheric surfaces

| | Surface | | | | | | |
|---|---|---|---|---|---|---|---|
| | 1 | 2 | 4 | 5 | 6 | 7 | 8 |
| k | 3.602747E−01 | 3.097617E+01 | −4.914929E+00 | −9.449708E−01 | −5.000000E+01 | 5.000000E+01 | −4.178150E+00 |
| A4 | 1.025175E−03 | −8.694810E−03 | −8.340919E−03 | −1.113956E−02 | −1.649846E−03 | −1.101535E−02 | −1.191129E−02 |
| A6 | 3.415693E−04 | 3.302085E−03 | −1.258698E−03 | −3.166952E−03 | 1.102903E−03 | −4.039507E−04 | −2.494873E−03 |
| A8 | −2.962521E−04 | −1.244063E−03 | −1.161113E−03 | 3.628299E−04 | −3.720513E−04 | 6.241343E−04 | 9.331250E−04 |
| A10 | 9.802308E−05 | 3.390037E−04 | 6.982355E−04 | 1.591186E−04 | 4.959135E−05 | −2.789218E−04 | −4.023604E−04 |
| A12 | −1.674386E−05 | −5.833077E−05 | −1.577616E−04 | −5.487693E−05 | −8.662730E−06 | 6.243935E−05 | 9.060507E−05 |
| A14 | 1.465645E−06 | 5.546200E−06 | 1.675460E−05 | 5.980045E−06 | 1.396475E−06 | −6.722999E−06 | −1.061610E−05 |
| A16 | −5.229988E−08 | −2.210286E−07 | −7.061959E−07 | −1.960326E−07 | −6.322729E−08 | 2.776015E−07 | 4.736098E−07 |

TABLE 10-continued

Coefficients of the aspheric surfaces

| | Surface | | | | | | |
|---|---|---|---|---|---|---|---|
| | 9 | 10 | 11 | 12 | 13 | 14 | 15 |
| k | −2.888377E+01 | −6.539364E−01 | −5.980761E−01 | −1.326514E+01 | −4.269993E+01 | 9.240303E+00 | −1.121151E+01 |
| A4 | −9.835062E−03 | 2.945936E−02 | 7.060393E−03 | 1.838522E−03 | −6.822278E−03 | 6.993184E−03 | 8.517562E−03 |
| A6 | −1.122282E−03 | −7.400431E−03 | −2.559604E−04 | −8.947241E−04 | 3.419590E−03 | −5.371355E−05 | −1.823942E−03 |
| A8 | 1.245332E−04 | 2.084361E−03 | −2.804894E−05 | 2.008524E−04 | −5.633828E−04 | −1.823336E−04 | 1.657220E−04 |
| A10 | −5.996834E−05 | −4.046282E−04 | 2.586716E−05 | −2.845687E−05 | 4.282588E−05 | 2.332620E−05 | −8.391854E−06 |
| A12 | 1.402146E−05 | 5.840699E−05 | −3.712356E−06 | 1.890028E−06 | −1.737673E−06 | −1.315443E−06 | 2.409729E−07 |
| A14 | −1.214827E−06 | −4.740857E−06 | 2.391870E−07 | −5.732399E−08 | 3.700734E−08 | 3.640479E−08 | −3.661828E−09 |
| A16 | 2.793602E−08 | 1.581652E−07 | −5.607171E−09 | 6.541259E−10 | −3.242797E−10 | −4.077483E−10 | 2.277145E−11 |

An equation of the aspheric surfaces of the fifth embodiment is the same as that of the first embodiment, and the definitions are the same as well.

The exact parameters of the fifth embodiment based on Table 9 and Table 10 are listed in the following table:

Fifth embodiment (Reference wavelength: 555 nm)

| ETP1 | ETP2 | ETP3 | ETP4 | ETP5 | ETP6 |
|---|---|---|---|---|---|
| 0.596 | 0.478 | 0.451 | 0.835 | 1.630 | 0.823 |

| ETP7 | ETL | EBL | EIN | EIR | PIR |
|---|---|---|---|---|---|
| 1.189 | 10.428 | 1.646 | 8.783 | 0.600 | 1.000 |

| EIN/ETL | SETP/EIN | EIR/PIR | SETP | STP | SETP/STP |
|---|---|---|---|---|---|
| 0.842 | 0.683 | 0.600 | 6.003 | 6.565 | 0.914 |

| ETP1/TP1 | ETP2/TP2 | ETP3/TP3 | ETP4/TP4 | ETP5/TP5 | ETP6/TP6 |
|---|---|---|---|---|---|
| 0.573 | 1.594 | 0.585 | 0.818 | 1.148 | 0.674 |

| ETP7/TP7 | BL | EBL/BL | SED | SIN | SED/SIN |
|---|---|---|---|---|---|
| 1.506 | 2.046 | 0.8045 | 2.780 | 2.326 | 1.195 |

| ED12 | ED23 | ED34 | ED45 | ED56 | ED67 |
|---|---|---|---|---|---|
| 0.273 | 0.047 | 0.427 | 0.285 | 1.335 | 0.413 |

| ED12/IN12 | ED23/IN23 | ED34/IN34 | ED45/IN45 | ED56/IN56 | ED67/IN67 |
|---|---|---|---|---|---|
| 2.258 | 0.099 | 0.914 | 0.344 | 26.691 | 1.066 |

Fifth embodiment (Reference wavelength: 555 nm)

| |f/f1| | |f/f2| | |f/f3| | |f/f4| | |f/f5| | |f/f6| |
|---|---|---|---|---|---|
| 0.5003 | 0.0723 | 0.1424 | 0.6172 | 0.1025 | 0.9261 |

| |f/f7| | ΣPPR | ΣNPR | ΣPPR/|ΣNPR| | IN12/f | IN67/f |
|---|---|---|---|---|---|
| 0.9446 | 2.1860 | 1.1194 | 1.9528 | 0.0184 | 0.0589 |

| |f1/f2| | |f2/f3| | (TP1 + IN12)/TP2 | | (TP7 + IN67)/TP6 | |
|---|---|---|---|---|---|
| 0.1445 | 1.9707 | 3.8697 | | 0.9631 | |

| HOS | InTL | HOS/HOI | InS/HOS | ODT % | TDT % |
|---|---|---|---|---|---|
| 10.9367 | 8.8907 | 1.4582 | 0.8938 | 24.0649 | 14.4258 |

| HVT11 | HVT12 | HVT21 | HVT22 | HVT31 | HVT32 |
|---|---|---|---|---|---|
| 0.0000 | 0.0000 | 1.8837 | 2.2022 | 0.4002 | 0.0000 |

| HVT61 | HVT62 | HVT71 | HVT72 | HVT72/HOI | HVT72/HOS |
|---|---|---|---|---|---|
| 2.9336 | 0.0000 | 0.0000 | 4.2652 | 0.5687 | 0.3900 |

| MTFE0 | MTFE3 | MTFE7 | MTFQ0 | MTFQ3 | MTFQ7 |
|---|---|---|---|---|---|
| 0.86 | 0.65 | 0.75 | 0.6 | 0.1 | 0.27 |

The results of the equations of the fifth embodiment based on Table 9 and Table 10 are listed in the following table:

Values related to the inflection points of the fifth embodiment
(Reference wavelength: 555 nm)

| HIF211 | 1.0559 | HIF211/HOI | 0.1408 | SGI211 | 0.1380 | |SGI211|/(|SGI211| + TP2) | 0.3151 |
|---|---|---|---|---|---|---|---|
| HIF221 | 1.2431 | HIF221/HOI | 0.1657 | SGI221 | 0.2143 | |SGI221|/(|SGI221| + TP2) | 0.4166 |
| HIF311 | 0.2221 | HIF311/HOI | 0.0296 | SGI311 | 0.00002 | |SGI311|/(|SGI311| + TP3) | 0.00002 |
| HIF312 | 2.1666 | HIF312/HOI | 0.2889 | SGI312 | −0.0252 | |SGI312|/(|SGI312| + TP3) | 0.0317 |
| HIF411 | 0.5411 | HIF411/HOI | 0.0722 | SGI411 | 0.0058 | |SGI411|/(|SGI411| + TP4) | 0.0057 |
| HIF511 | 2.1614 | HIF511/HOI | 0.2882 | SGI511 | −1.0614 | |SGI511|/(|SGI511| + TP5) | 0.4278 |
| HIF512 | 2.7106 | HIF512/HOI | 0.3614 | SGI512 | −1.4982 | |SGI512|/(|SGI512| + TP5) | 0.5134 |
| HIF521 | 2.5210 | HIF521/HOI | 0.3361 | SGI521 | −1.1318 | |SGI521|/(|SGI521| + TP5) | 0.4435 |
| HIF611 | 1.8550 | HIF611/HOI | 0.2473 | SGI611 | 0.2885 | |SGI611|/(|SGI611| + TP6) | 0.1910 |
| HIF612 | 3.8589 | HIF612/HOI | 0.5145 | SGI612 | 0.1827 | |SGI612|/(|SGI612| + TP6) | 0.1301 |
| HIF621 | 1.1967 | HIF621/HOI | 0.1596 | SGI621 | −0.0173 | |SGI621|/(|SGI621| + TP6) | 0.0139 |
| HIF622 | 2.2074 | HIF622/HOI | 0.2943 | SGI622 | −0.0250 | |SGI622|/(|SGI622| + TP6) | 0.0201 |
| HIF623 | 4.0580 | HIF623/HOI | 0.5411 | SGI623 | −0.5252 | |SGI623|/(|SGI623| + TP6) | 0.3006 |
| HIF711 | 0.7303 | HIF711/HOI | 0.0974 | SGI711 | −0.0093 | |SGI711|/(|SGI711| + TP7) | 0.0117 |
| HIF712 | 1.9781 | HIF712/HOI | 0.2637 | SGI712 | −0.0060 | |SGI712|/(|SGI712| + TP7) | 0.0075 |
| HIF721 | 2.0688 | HIF721/HOI | 0.2758 | SGI721 | 0.3537 | |SGI721|/(|SGI721| + TP7) | 0.3093 |

[Sixth Embodiment]

Figure 6A:
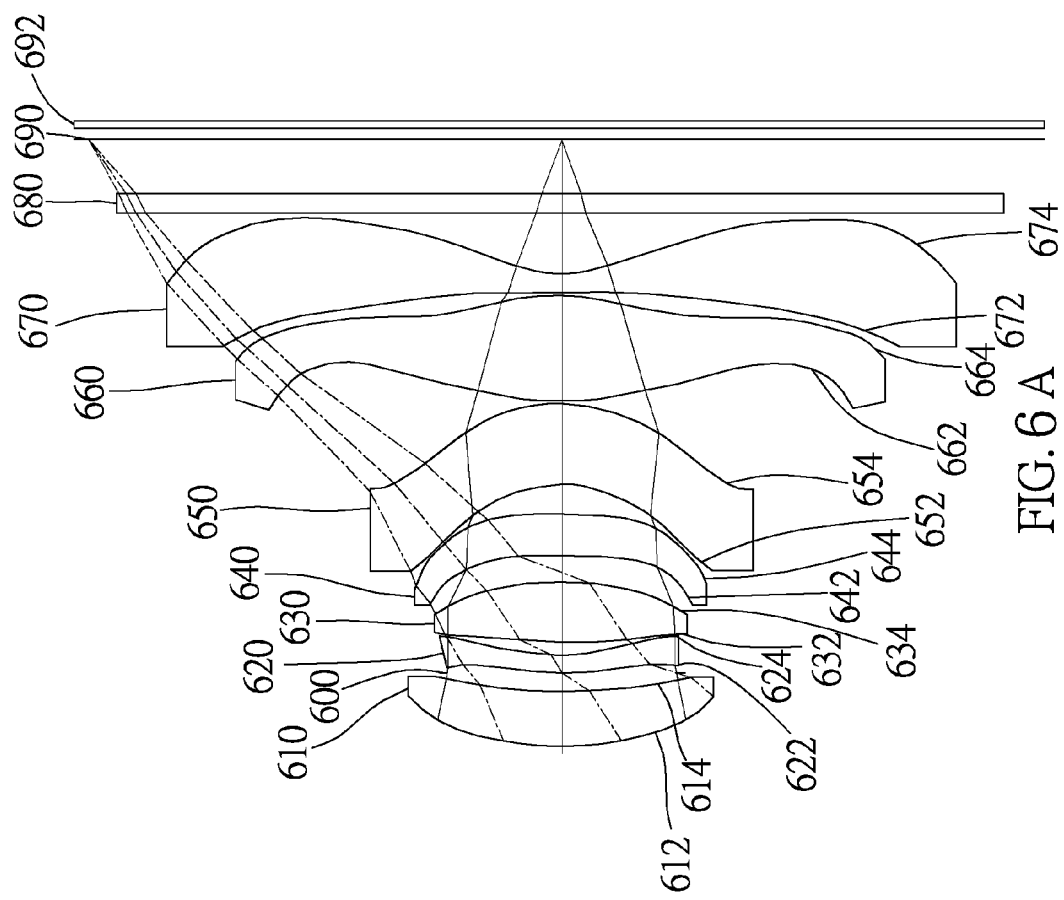
FIG. 6A is a schematic diagram of a sixth embodiment of the present invention.
Figure 6:
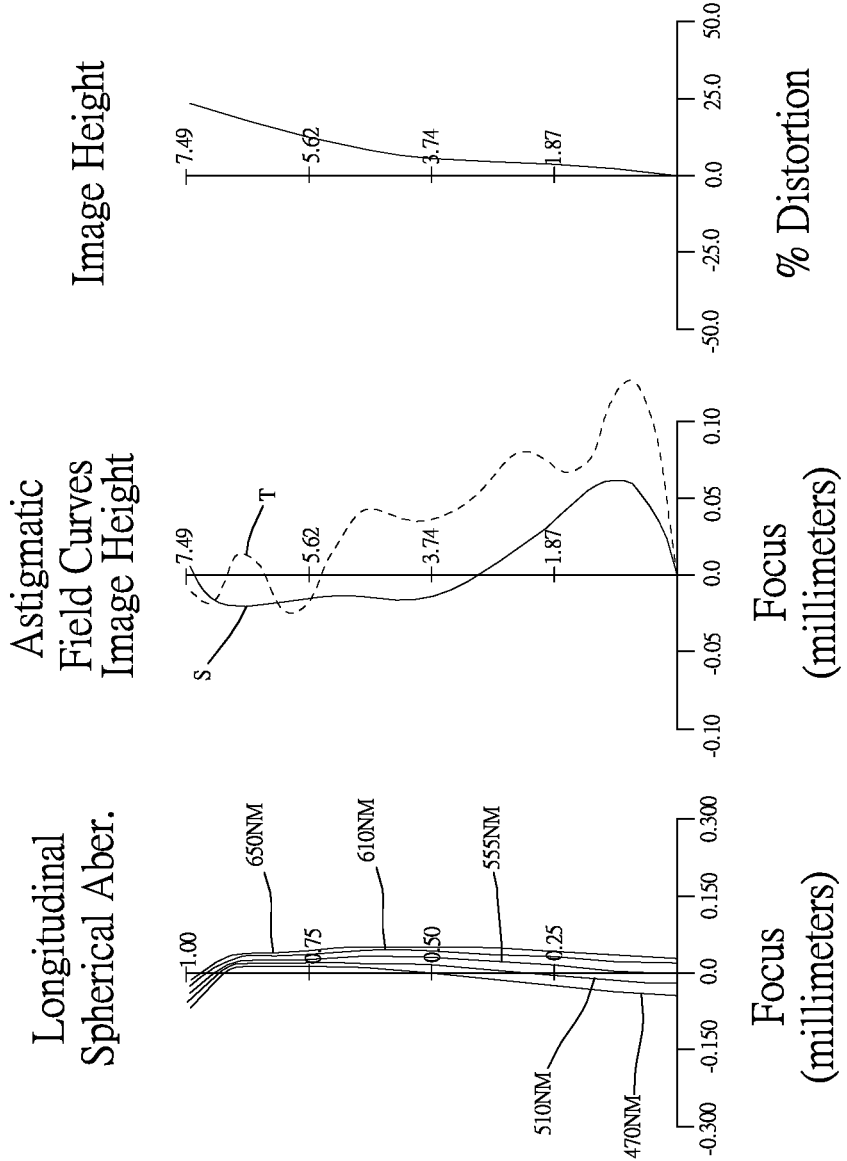
FIG. 6B shows curve diagrams of longitudinal spherical aberration, astigmatic field, and optical distortion of the optical image capturing system in the order from left to right of the sixth embodiment of the present application.
FIG. 6C shows a feature map of modulation transformation of the optical image capturing system of the sixth embodiment of the present application in visible spectrum.
Figure 6C:
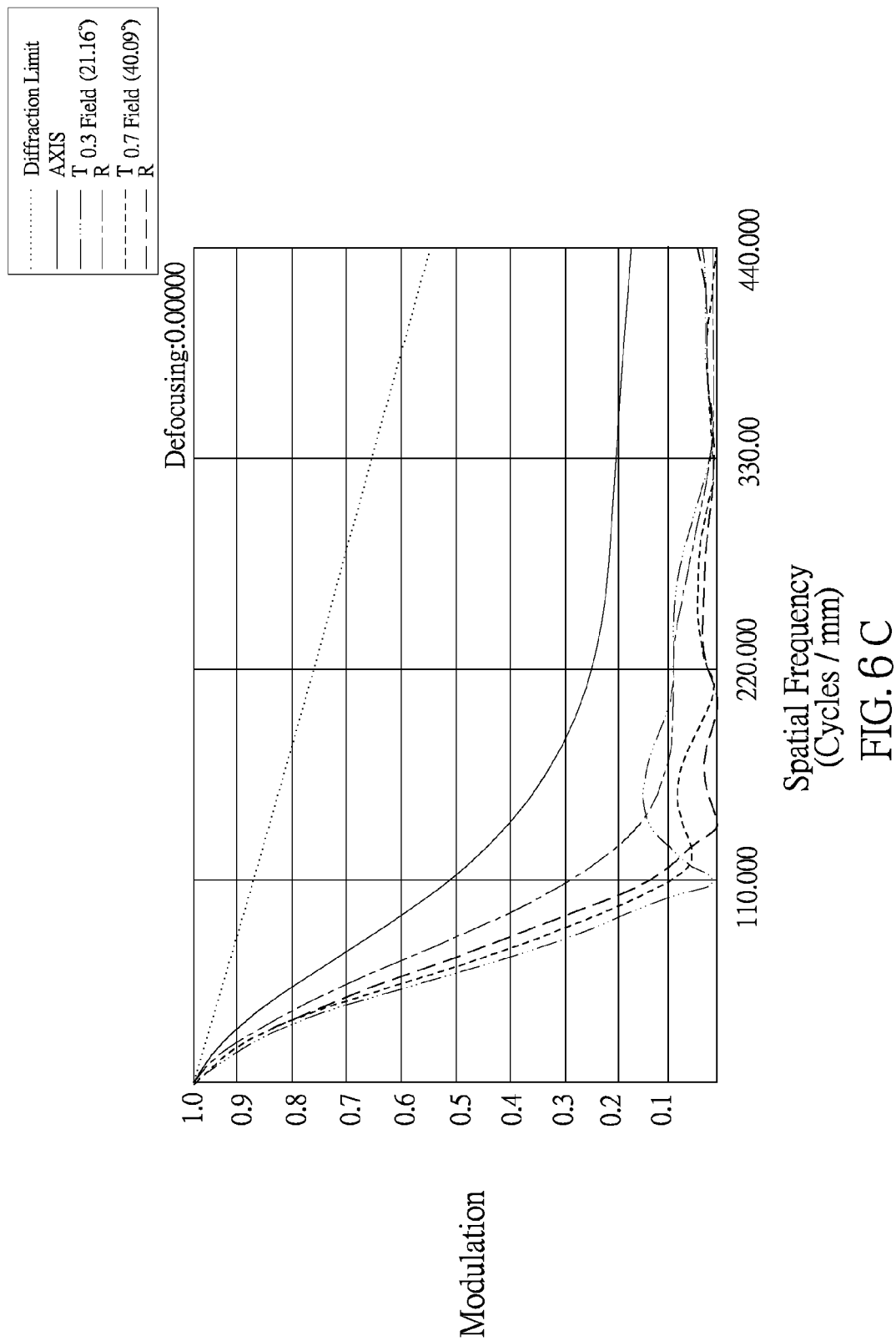

As shown in FIG. 6A and FIG. 6B, an optical image capturing system of the sixth embodiment of the present invention includes, along an optical axis from an object side to an image side, a first lens 610, an aperture 600, a second lens 620, a third lens 630, a fourth lens 640, a fifth lens 650, a sixth lens 660, a seventh lens 670, an infrared rays filter 680, an image plane 690, and an image sensor 692. FIG. 6C shows a modulation transformation of the optical image capturing system 60 of the sixth embodiment of the present application in visible spectrum.

The first lens 610 has positive refractive power and is made of plastic. An object-side surface 612, which faces the object side, is a convex aspheric surface, and an image-side surface 614, which faces the image side, is a concave aspheric surface.

The second lens 620 has negative refractive power and is made of plastic. An object-side surface 622 thereof, which faces the object side, is a convex aspheric surface, and an image-side surface 624 thereof, which faces the image side, is a concave aspheric surface. The object-side surface 612 and the image-side surface 614 both have an inflection point.

The third lens 630 has positive refractive power and is made of plastic. An object-side surface 632, which faces the object side, is a convex aspheric surface, and an image-side surface 634, which faces the image side, is a convex aspheric surface. The object-side surface 632 has an inflection point.

The fourth lens 640 has positive refractive power and is made of plastic. An object-side surface 642, which faces the object side, is a concave aspheric surface, and an image-side surface 644, which faces the image side, is a convex aspheric surface.

The fifth lens 650 has positive refractive power and is made of plastic. An object-side surface 652, which faces the object side, is a concave aspheric surface, and an image-side surface 654, which faces the image side, is a convex aspheric surface. The object-side surface 652 has two inflection points, and the image-side surface 654 has an inflection point.

The sixth lens 660 has positive refractive power and is made of plastic. An object-side surface 662, which faces the object side, is a convex surface, and an image-side surface 664, which faces the image side, is a convex surface. The object-side surface 662 has an inflection point, and the image-side surface 664 has two inflection points. Whereby, the incident angle of each view field entering the sixth lens 660 can be effectively adjusted to improve aberration.

The seventh lens 670 has negative refractive power and is made of plastic. An object-side surface 672, which faces the object side, is a concave surface, and an image-side surface 674, which faces the image side, is a concave surface. The image-side surface 664 has an inflection point. It may help to shorten the back focal length to keep small in size. In addition, it may reduce an incident angle of the light of an off-axis field of view and correct the aberration of the off-axis field of view.

The infrared rays filter 680 is made of glass and between the seventh lens 670 and the image plane 690. The infrared rays filter 680 gives no contribution to the focal length of the system.

The optical image capturing system of the sixth embodiment further satisfies ΣPP=126.2162 mm; and f1/ΣPP=0.1279, where ΣPP is a sum of the focal lengths of each positive lens. It is helpful to share the positive refractive power of one single lens to other positive lenses to avoid the significant aberration caused by the incident rays.

The optical image capturing system of the sixth embodiment further satisfies ΣNP=−67.2059 mm; and f7/ΣNP=0.0439, where ΣNP is a sum of the focal lengths of each negative lens. It is helpful to share the negative refractive power of one single lens to the other negative lens to avoid the significant aberration caused by the incident rays.

The parameters of the lenses of the sixth embodiment are listed in Table 11 and Table 12.

TABLE 11 f = 5.5641 mm; f/HEP = 1.4; HAF = 47.4997 deg

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | 1$^{st}$ lens | 4.835295814 | 0.900 | plastic | 1.583 | 30.20 | 16.143 |
| 2 | | 9.202478641 | 0.285 | | | | |
| 3 | Aperture | plane | 0.000 | | | | |
| 4 | 2$^{nd}$ lens | 3.441455186 | 0.300 | plastic | 1.650 | 21.40 | −64.253 |
| 5 | | 3.071668034 | 0.224 | | | | |
| 6 | 3$^{rd}$ lens | 23.31186563 | 0.956 | plastic | 1.565 | 58.00 | 9.049 |
| 7 | | −6.477580922 | 0.444 | | | | |
| 8 | 4$^{th}$ lens | −17.052696 | 0.683 | plastic | 1.583 | 30.20 | 32.205 |
| 9 | | −9.094338954 | 0.484 | | | | |
| 10 | 5$^{th}$ lens | −1.774149519 | 1.310 | plastic | 1.650 | 21.40 | 65.478 |
| 11 | | −2.201644982 | 0.050 | | | | |
| 12 | 6$^{th}$ lens | 4.867708036 | 1.710 | plastic | 1.565 | 58.00 | 3.341 |
| 13 | | −2.705046837 | 0.050 | | | | |
| 14 | 7$^{th}$ lens | −494.7308627 | 0.319 | plastic | 1.632 | 23.40 | −2.953 |
| 15 | | 1.888118555 | 1.000 | | | | |
| 16 | Infrared rays filter | plane | 0.300 | BK_7 | 1.517 | 64.2 | |
| 17 | | plane | 0.844 | | | | |
| 18 | Image plane | plane | 0.030 | | | | |

Reference wavelength (d-line): 555 nm; the position of blocking light: blocking at the fifth surface with effective semi diameter of 1.800 mm.

TABLE 12

Coefficients of the aspheric surfaces

| | Surface | | | | | | |
|---|---|---|---|---|---|---|---|
| | 1 | 2 | 4 | 5 | 6 | 7 | 8 |
| k | 2.768284E+00 | −5.000000E+01 | −1.035316E+01 | −8.272938E−02 | 3.601860E+01 | 7.814113E+00 | 4.524743E+01 |
| A4 | −1.475794E−03 | −1.088211E−03 | −5.308306E−03 | −2.364538E−02 | 4.629937E−03 | −9.146872E−03 | −2.590179E−02 |
| A6 | −2.331608E−04 | 2.062780E−03 | −1.187216E−02 | −5.094192E−03 | 2.194458E−04 | −1.315089E−03 | −1.117375E−03 |
| A8 | −4.121856E−05 | −8.257885E−04 | 3.585864E−03 | 2.778677E−03 | 5.904392E−04 | 1.721749E−03 | 1.799055E−04 |
| A10 | 1.938112E−05 | 2.459819E−04 | −4.421450E−04 | −6.203167E−04 | −3.772064E−04 | −6.934823E−04 | 1.170661E−05 |
| A12 | −4.307645E−06 | −3.183023E−05 | −8.389137E−07 | 8.042273E−05 | 8.304326E−05 | 1.461540E−04 | −8.184639E−06 |
| A14 | −1.796938E−07 | −2.247683E−06 | 2.054647E−06 | −9.987278E−06 | −1.015623E−05 | −1.374920E−05 | 2.951361E−06 |
| A16 | 5.534772E−08 | 9.836096E−07 | −1.372780E−07 | −1.233460E−07 | −1.487042E−07 | 5.950855E−07 | −1.618381E−06 |

| | Surface | | | | | | |
|---|---|---|---|---|---|---|---|
| | 9 | 10 | 11 | 12 | 13 | 14 | 15 |
| k | −1.024500E+00 | −5.565418E−01 | −6.036603E−01 | 4.086985E−02 | −2.098867E+01 | 5.000000E+01 | −6.302732E+00 |
| A4 | −1.978975E−02 | 2.414207E−02 | 1.317775E−02 | −1.104408E−02 | −5.902830E−03 | −8.544737E−03 | −5.130267E−03 |
| A6 | −1.703764E−03 | −6.364618E−03 | −2.350597E−03 | 1.594649E−03 | 2.891567E−03 | 1.563878E−03 | 4.397092E−04 |
| A8 | −1.278484E−05 | 1.339730E−03 | 5.627750E−04 | −1.783258E−04 | −3.862756E−04 | −1.634816E−04 | −2.936151E−05 |
| A10 | −2.950492E−05 | −6.883022E−05 | −5.960294E−05 | 9.891271E−06 | 2.474392E−05 | 9.876828E−06 | 1.303617E−06 |
| A12 | 1.818520E−05 | 1.340413E−05 | 5.877376E−06 | −3.399782E−07 | −8.467402E−07 | −3.371806E−07 | −3.620071E−08 |
| A14 | −1.042020E−06 | −1.827701E−06 | −3.791703E−07 | 8.475571E−09 | 1.489296E−08 | 5.979359E−09 | 5.537102E−10 |
| A16 | −3.109811E−07 | 8.816615E−08 | 1.052032E−08 | −1.363672E−10 | −1.069406E−10 | −4.271087E−11 | −3.571421E−12 |

An equation of the aspheric surfaces of the sixth embodiment is the same as that of the first embodiment, and the definitions are the same as well.

The exact parameters of the sixth embodiment based on Table 11 and Table 12 are listed in the following table:

| Sixth embodiment (Reference wavelength: 555 nm) | | | | | |
|---|---|---|---|---|---|
| ETP1 | ETP2 | ETP3 | ETP4 | ETP5 | ETP6 |
| 0.678 | 0.490 | 0.434 | 0.658 | 1.507 | 1.148 |
| ETP7 | ETL | EBL | EIN | EIR | PIR |
| 0.842 | 9.511 | 1.708 | 7.803 | 0.534 | 1.000 |
| EIN/ETL | SETP/EIN | EIR/PIR | SETP | STP | SETP/STP |
| 0.820 | 0.738 | 0.534 | 5.758 | 6.178 | 0.932 |
| ETP1/TP1 | ETP2/TP2 | ETP3/TP3 | ETP4/TP4 | ETP5/TP5 | ETP6/TP6 |
| 0.754 | 1.635 | 0.455 | 0.964 | 1.151 | 0.671 |
| ETP7/TP7 | BL | EBL/BL | SED | SIN | SED/SIN |
| 2.637 | 2.174 | 0.7856 | 2.045 | 1.537 | 1.330 |
| ED12 | ED23 | ED34 | ED45 | ED56 | ED67 |
| 0.233 | 0.047 | 0.416 | 0.043 | 1.021 | 0.284 |
| ED12/IN12 | ED23/IN23 | ED34/IN34 | ED45/IN45 | ED56/IN56 | ED67/IN67 |
| 0.817 | 0.211 | 0.936 | 0.089 | 20.428 | 5.687 |

-continued

| Sixth embodiment (Reference wavelength: 555 nm) | | | | | |
|---|---|---|---|---|---|
| |f/f1| | |f/f2| | |f/f3| | |f/f4| | |f/f5| | |f/f6| |
| 0.3447 | 0.0866 | 0.6149 | 0.1728 | 0.0850 | 1.6655 |
| |f/f7| | ΣPPR | ΣNPR | ΣPPR/|ΣNPR| | IN12/f | IN67/f |
| 1.8844 | 2.8829 | 1.9710 | 1.4627 | 0.0512 | 0.0090 |
| |f1/f2| | |f2/f3| | (TP1 + IN12)/TP2 | | (TP7 + IN67)/TP6 | |
| 0.2512 | 7.1009 | 3.9501 | | 0.2159 | |
| HOS | InTL | HOS/HOI | InS/HOS | ODT % | TDT % |
| 9.8889 | 7.7147 | 1.3185 | 0.8802 | 23.1027 | 15.1146 |
| HVT11 | HVT12 | HVT21 | HVT22 | HVT31 | HVT32 |
| 0.0000 | 0.0000 | 1.4514 | 0.0000 | 0.0000 | 0.0000 |
| HVT61 | HVT62 | HVT71 | HVT72 | HVT72/HOI | HVT72/HOS |
| 3.4244 | 0.0000 | 0.0000 | 4.0945 | 0.5459 | 0.4140 |
| MTFE0 | MTFE3 | MTFE7 | MTFQ0 | MTFQ3 | MTFQ7 |
| 0.85 | 0.64 | 0.65 | 0.52 | 0.001 | 0.008 |

The results of the equations of the sixth embodiment based on Table 11 and Table 12 are listed in the following table:

Values related to the inflection points of the sixth embodiment
(Reference wavelength: 555 nm)

| | | | | | | | |
|---|---|---|---|---|---|---|---|
| HIF211 | 0.8235 | HIF211/HOI | 0.1098 | SGI211 | 0.0825 | \|SGI211\|/(\|SGI211\| + TP2) | 0.2158 |
| HIF221 | 1.1073 | HIF221/HOI | 0.1476 | SGI221 | 0.1658 | \|SGI221\|/(\|SGI221\| + TP2) | 0.3559 |
| HIF311 | 1.5989 | HIF311/HOI | 0.2132 | SGI311 | 0.0911 | \|SGI311\|/(\|SGI311\| + TP3) | 0.0870 |
| HIF511 | 1.9364 | HIF511/HOI | 0.2582 | SGI511 | −1.0136 | \|SGI511\|/(\|SGI511\| + TP5) | 0.4363 |
| HIF512 | 2.3698 | HIF512/HOI | 0.3160 | SGI512 | −1.4047 | \|SGI512\|/(\|SGI512\| + TP5) | 0.5175 |
| HIF521 | 2.1173 | HIF521/HOI | 0.2823 | SGI521 | −0.9258 | \|SGI521\|/(\|SGI521\| + TP5) | 0.4141 |
| HIF611 | 2.3238 | HIF611/HOI | 0.3098 | SGI611 | 0.4076 | \|SGI611\|/(\|SGI611\| + TP6) | 0.1925 |
| HIF621 | 1.2488 | HIF621/HOI | 0.1665 | SGI621 | −0.1805 | \|SGI621\|/(\|SGI621\| + TP6) | 0.0955 |
| HIF622 | 2.8784 | HIF622/HOI | 0.3838 | SGI622 | −0.3737 | \|SGI622\|/(\|SGI622\| + TP6) | 0.1793 |
| HIF721 | 1.3346 | HIF721/HOI | 0.1779 | SGI721 | 0.3101 | \|SGI721\|/(\|SGI721\| + TP7) | 0.4927 |

[Seventh Embodiment]

Figure 7A:
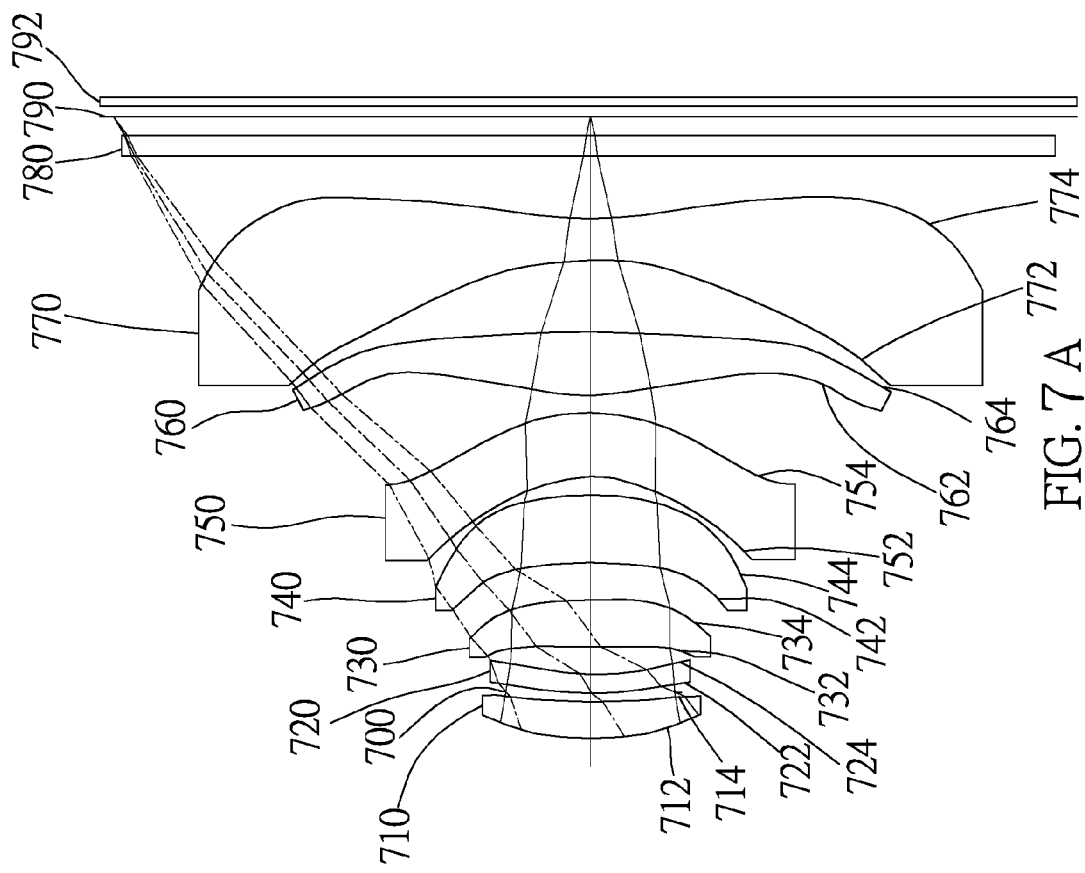
FIG. 7A is a schematic diagram of a seventh embodiment of the present invention.
Figure 7B:
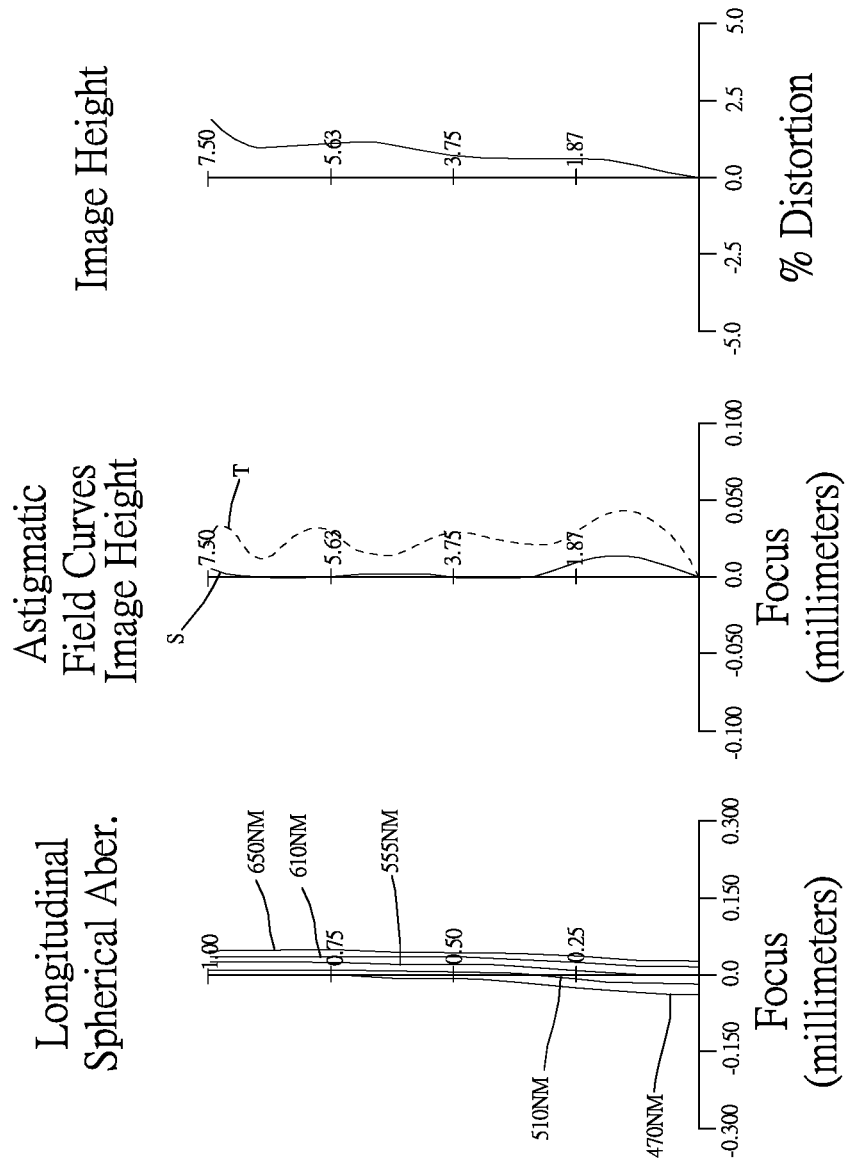
FIG. 7B shows curve diagrams of longitudinal spherical aberration, astigmatic field, and optical distortion of the optical image capturing system in the order from left to right of the seventh embodiment of the present application.
Figure 7C:
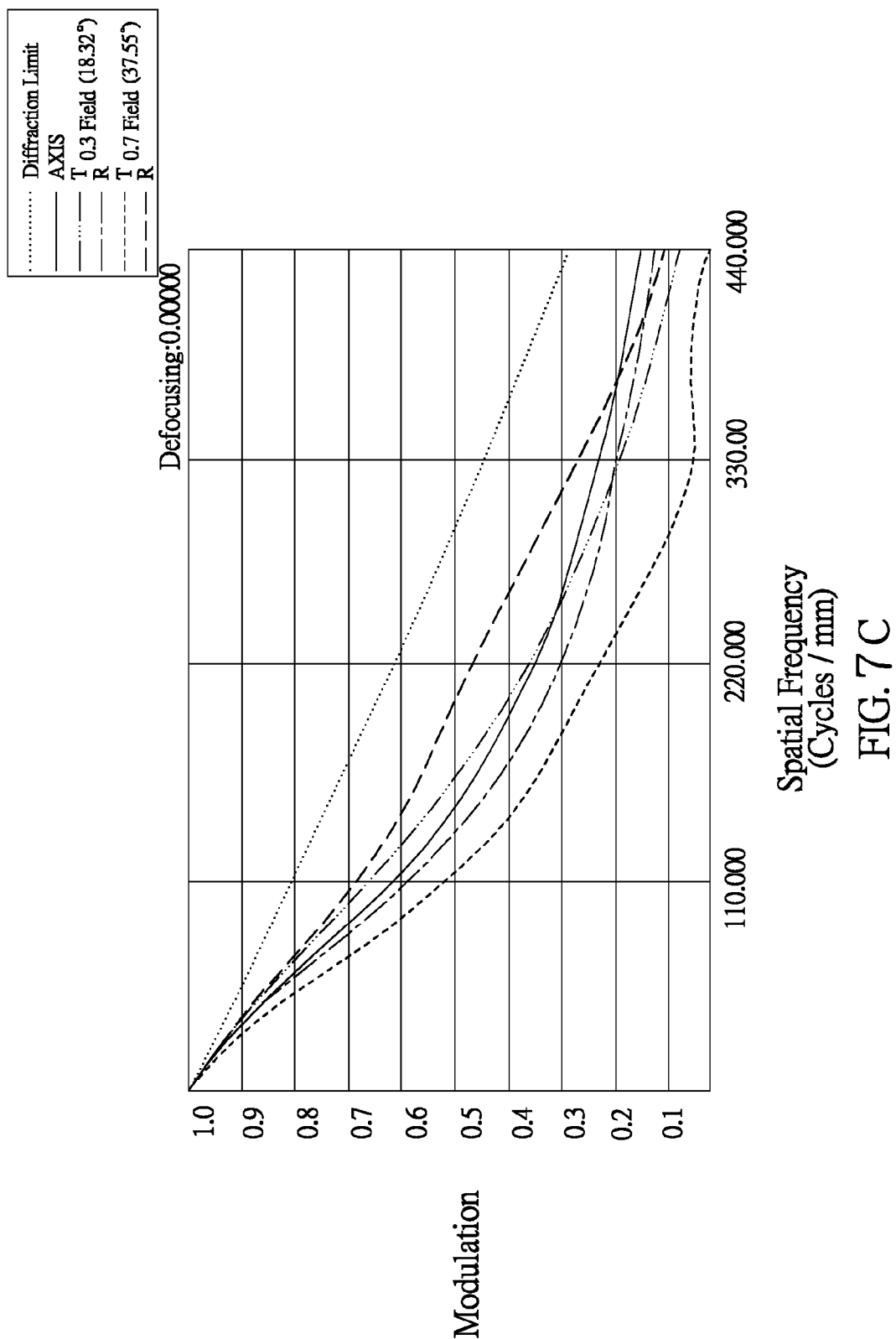
FIG. 7C shows a feature map of modulation transformation of the optical image capturing system of the seventh embodiment of the present application in visible spectrum.

As shown in FIG. 7A and FIG. 7B, an optical image capturing system of the seventh embodiment of the present invention includes, along an optical axis from an object side to an image side, a first lens 710, an aperture 700, a second lens 720, a third lens 730, a fourth lens 740, a fifth lens 750, a sixth lens 760, a seventh lens 770, an infrared rays filter 780, an image plane 790, and an image sensor 792. FIG. 7C shows a modulation transformation of the optical image capturing system 70 of the seventh embodiment of the present application in visible spectrum.

The first lens 710 has positive refractive power and is made of plastic. An object-side surface 712, which faces the object side, is a convex aspheric surface, and an image-side surface 714, which faces the image side, is a concave aspheric surface.

The second lens 720 has negative refractive power and is made of plastic. An object-side surface 722 thereof, which faces the object side, is a convex aspheric surface, and an image-side surface 724 thereof, which faces the image side, is a concave aspheric surface. The object-side surface 722 has an inflection point.

The third lens 730 has positive refractive power and is made of plastic. An object-side surface 732, which faces the object side, is a concave aspheric surface, and an image-side surface 734, which faces the image side, is a convex aspheric surface.

The fourth lens 740 has positive refractive power and is made of plastic. An object-side surface 742, which faces the object side, is a concave aspheric surface, and an image-side surface 744, which faces the image side, is a convex aspheric surface.

The fifth lens 750 has negative refractive power and is made of plastic. An object-side surface 752, which faces the object side, is a concave aspheric surface, and an image-side surface 754, which faces the image side, is a convex aspheric surface. The image-side surface 754 has an inflection point.

The sixth lens 760 has positive refractive power and is made of plastic. An object-side surface 762, which faces the object side, is a convex surface, and an image-side surface 764, which faces the image side, is a convex surface. The object-side surface 762 has two inflection points, and the image-side surface 764 has three inflection points. Whereby, the incident angle of each view field entering the sixth lens 760 can be effectively adjusted to improve aberration.

The seventh lens 770 has negative refractive power and is made of plastic. An object-side surface 772, which faces the object side, is a concave aspheric surface, and an image-side surface 774, which faces the image side, is a concave aspheric surface. The image-side surface 774 has an inflection point. It may help to shorten the back focal length to keep small in size. In addition, it may reduce an incident angle of the light of an off-axis field of view and correct the aberration of the off-axis field of view.

The infrared rays filter 780 is made of glass and between the seventh lens 770 and the image plane 790. The infrared rays filter 780 gives no contribution to the focal length of the system.

The optical image capturing system of the seventh embodiment further satisfies ΣPP=51.7940 mm; and f1/ΣPP=0.2627, where ΣPP is a sum of the focal lengths of each positive lens. It is helpful to share the positive refractive power of one single lens to other positive lenses to avoid the significant aberration caused by the incident rays.

The optical image capturing system of the seventh embodiment further satisfies ΣNP=−123.3579 mm; and f7/ΣNP=0.0412, where ΣNP is a sum of the focal lengths of each negative lens. It is helpful to share the negative refractive power of one single lens to the other negative lens to avoid the significant aberration caused by the incident rays.

The parameters of the lenses of the seventh embodiment are listed in Table 13 and Table 14.

TABLE 13 f = 6.7312 mm; f/HEP = 2.4; HAF = 47.5 deg

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | 1$^{st}$ lens | 4.576054873 | 0.584 | plastic | 1.565 | 58.00 | 13.609 |
| 2 | | 10.73151703 | 0.146 | | | | |
| 3 | Aperture | plane | 0.000 | | | | |
| 4 | 2$^{nd}$ lens | 4.349729546 | 0.300 | plastic | 1.650 | 21.40 | −78.642 |
| 5 | | 3.901701278 | 0.466 | | | | |
| 6 | 3$^{rd}$ lens | −105.5977355 | 0.736 | plastic | 1.565 | 58.00 | 13.873 |
| 7 | | −7.33624907 | 0.600 | | | | |
| 8 | 4$^{th}$ lens | −12.30461992 | 1.093 | plastic | 1.565 | 58.00 | 16.081 |
| 9 | | −5.404219933 | 0.305 | | | | |

TABLE 13-continued f = 6.7312 mm; f/HEP = 2.4; HAF = 47.5 deg

| Surface | | Radius of curvature (mm) | Thickness (mm) | Material | Refractive index | Abbe number | Focal length (mm) |
|---|---|---|---|---|---|---|---|
| 10 | $5^{th}$ lens | −2.042065329 | 1.038 | plastic | 1.650 | 21.40 | −39.630 |
| 11 | | −2.662144583 | 0.299 | | | | |
| 12 | $6^{th}$ lens | 5.225384838 | 1.002 | plastic | 1.565 | 58.00 | 8.231 |
| 13 | | −40.50587392 | 1.179 | | | | |
| 14 | $7^{th}$ lens | −5.140384905 | 0.683 | plastic | 1.583 | 30.20 | −5.086 |
| 15 | | 7.455490677 | 1.000 | | | | |
| 16 | Infrared rays filter | plane | 0.300 | BK_7 | 1.517 | 64.2 | |
| 17 | | plane | 0.308 | | | | |
| 18 | Image plane | plane | 0.021 | | | | |

Reference wavelength (d-line): 555 nm.

TABLE 14

Coefficients of the aspheric surfaces

| | Surface | | | | | | |
|---|---|---|---|---|---|---|---|
| | 1 | 2 | 4 | 5 | 6 | 7 | 8 |
| k | 3.983741E−01 | −4.897919E+01 | −1.346812E+01 | 1.709440E+00 | 2.796516E+01 | 1.348422E+01 | 3.002689E+01 |
| A4 | 2.913392E−03 | −1.075801E−03 | −4.722246E−03 | −2.157240E−02 | −1.142048E−02 | −1.289707E−02 | −1.813933E−02 |
| A6 | 1.441858E−04 | 3.517095E−03 | −1.071444E−03 | −1.504717E−04 | −2.380434E−03 | −2.113505E−03 | −1.073421E−03 |
| A8 | 3.444720E−04 | −6.440188E−04 | 5.560008E−04 | 6.756521E−04 | 1.308695E−04 | 6.047950E−04 | −1.864017E−04 |
| A10 | −5.586964E−05 | −2.956724E−04 | −2.875384E−04 | −2.753827E−04 | −7.922573E−04 | −4.718839E−04 | 2.914704E−05 |
| A12 | −2.288119E−05 | 1.964145E−04 | 5.202399E−05 | −3.828904E−05 | 2.490353E−04 | 1.789349E−04 | −3.549875E−06 |
| A14 | 1.485701E−05 | −3.377318E−05 | 3.415657E−07 | 3.001792E−05 | −2.851243E−05 | −4.586750E−05 | −3.256825E−06 |
| A16 | −1.930238E−06 | 3.169793E−07 | −1.357556E−07 | −1.415328E−07 | 1.559500E−07 | 7.552034E−06 | 1.187434E−06 |

| | Surface | | | | | | |
|---|---|---|---|---|---|---|---|
| | 9 | 10 | 11 | 12 | 13 | 14 | 15 |
| k | 1.878477E+00 | −4.254837E−01 | −5.629283E−01 | −1.475158E+00 | 4.334642E+01 | −7.079531E−03 | −5.361072E+00 |
| A4 | −1.091857E−02 | 2.799566E−02 | 1.213832E−02 | −1.093232E−02 | −8.871208E−03 | −5.211838E−03 | −4.787415E−03 |
| A6 | −9.800727E−04 | −5.491994E−03 | −2.342425E−03 | 1.697719E−03 | 2.900021E−03 | 1.558862E−03 | 4.143097E−04 |
| A8 | −1.534843E−04 | 1.122697E−03 | 5.035552E−04 | −2.142729E−04 | −3.845059E−04 | −1.638382E−04 | −2.918764E−05 |
| A10 | −3.106815E−05 | −1.115266E−04 | −4.841164E−05 | 1.249698E−05 | 2.474663E−05 | 9.868077E−06 | 1.306532E−06 |
| A12 | 1.443849E−05 | 1.182262E−05 | 3.361279E−06 | −3.643681E−07 | −8.481899E−07 | −3.373650E−07 | −3.618409E−08 |
| A14 | −2.111326E−06 | −8.161698E−07 | −1.486190E−07 | 6.388407E−09 | 1.491450E−08 | 5.996697E−09 | 5.531837E−10 |
| A16 | 6.795226E−08 | 5.681613E−08 | 2.219835E−09 | −7.002687E−11 | −1.033092E−10 | −4.078697E−11 | −3.615103E−12 |

An equation of the aspheric surfaces of the seventh embodiment is the same as that of the first embodiment, and the definitions are the same as well.

The exact parameters of the seventh embodiment based on Table 13 and Table 14 are listed in the following table:

Seventh embodiment (Reference wavelength: 555 nm)

| ETP1 | ETP2 | ETP3 | ETP4 | ETP5 | ETP6 |
|---|---|---|---|---|---|
| 0.451 | 0.336 | 0.608 | 1.024 | 1.122 | 0.823 |

| ETP7 | ETL | EBL | EIN | EIR | PIR |
|---|---|---|---|---|---|
| 0.971 | 9.848 | 1.527 | 8.321 | 0.898 | 1.000 |

| EIN/ETL | SETP/EIN | EIR/PIR | SETP | STP | SETP/STP |
|---|---|---|---|---|---|
| 0.845 | 0.641 | 0.898 | 5.336 | 5.436 | 0.982 |

Seventh embodiment (Reference wavelength: 555 nm)

| ETP1/TP1 | ETP2/TP2 | ETP3/TP3 | ETP4/TP4 | ETP5/TP5 | ETP6/TP6 |
|---|---|---|---|---|---|
| 0.773 | 1.121 | 0.826 | 0.937 | 1.082 | 0.821 |

| ETP7/TP7 | BL | EBL/BL | SED | SIN | SED/SIN |
|---|---|---|---|---|---|
| 1.421 | 1.629 | 0.9374 | 2.986 | 2.997 | 0.996 |

| ED12 | ED23 | ED34 | ED45 | ED56 | ED67 |
|---|---|---|---|---|---|
| 0.212 | 0.218 | 0.647 | 0.121 | 0.756 | 1.031 |

| ED12/IN12 | ED23/IN23 | ED34/IN34 | ED45/IN45 | ED56/IN56 | ED67/IN67 |
|---|---|---|---|---|---|
| 1.450 | 0.468 | 1.078 | 0.395 | 2.527 | 0.874 |

| |f/f1| | |f/f2| | |f/f3| | |f/f4| | |f/f5| | |f/f6| |
|---|---|---|---|---|---|
| 0.4946 | 0.0856 | 0.4852 | 0.4186 | 0.1699 | 0.8178 |

-continued

| Seventh embodiment (Reference wavelength: 555 nm) | | | | | |
|---|---|---|---|---|---|
| \|f/f7\| | ΣPPR | ΣNPR | ΣPPR/\|ΣNPR\| | IN12/f | IN67/f |
| 1.3235 | 2.2162 | 1.5790 | 1.4036 | 0.0218 | 0.1752 |
| \|f1/f2\| | \|f2/f3\| | (TP1 + IN12)/TP2 | | (TP7 + IN67)/TP6 | |
| 0.1730 | 5.6689 | 2.4355 | | 1.8583 | |
| HOS | InTL | HOS/HOI | InS/HOS | ODT % | TDT % |
| 10.0613 | 8.4321 | 1.3415 | 0.9274 | 1.9205 | 1.0066 |
| HVT11 | HVT12 | HVT21 | HVT22 | HVT31 | HVT32 |
| 0.0000 | 0.0000 | 0.0000 | 0.0000 | 0.0000 | 0.0000 |
| HVT61 | HVT62 | HVT71 | HVT72 | HVT72/HOI | HVT72/HOS |
| 2.7883 | 0.0000 | 0.0000 | 3.5682 | 0.4758 | 0.3546 |
| MTFE0 | MTFE3 | MTFE7 | MTFQ0 | MTFQ3 | MTFQ7 |
| 0.86 | 0.87 | 0.8 | 0.63 | 0.67 | 0.52 |

The results of the equations of the seventh embodiment based on Table 13 and Table 14 are listed in the following table:

| Values related to the inflection points of the seventh embodiment (Reference wavelength: 555 nm) | | | | | | | |
|---|---|---|---|---|---|---|---|
| HIF211 | 1.0924 | HIF211/HOI | 0.1457 | SGI211 | 0.1095 | \|SGI211\|/(\|SGI211\| + TP2) | 0.2673 |
| HIF521 | 2.1002 | HIF521/HOI | 0.2800 | SGI521 | −0.7289 | \|SGI521\|/(\|SGI521\| + TP5) | 0.4126 |
| HIF611 | 1.7227 | HIF611/HOI | 0.2297 | SGI611 | 0.2145 | \|SGI611\|/(\|SGI611\| + TP6) | 0.1763 |
| HIF612 | 3.9127 | HIF612/HOI | 0.5217 | SGI612 | 0.0038 | \|SGI612\|/(\|SGI612\| + TP6) | 0.0038 |
| HIF621 | 1.6536 | HIF621/HOI | 0.2205 | SGI621 | −0.0595 | \|SGI621\|/(\|SGI621\| + TP6) | 0.0560 |
| HIF622 | 2.2525 | HIF622/HOI | 0.3003 | SGI622 | −0.0994 | \|SGI622\|/(\|SGI622\| + TP6) | 0.0902 |
| HIF623 | 4.2291 | HIF623/HOI | 0.5639 | SGI623 | −0.6719 | \|SGI623\|/(\|SGI623\| + TP6) | 0.4013 |
| HIF721 | 1.7490 | HIF721/HOI | 0.2332 | SGI721 | 0.1590 | \|SGI721\|/(\|SGI721\| + TP7) | 0.1887 |

[Eighth Embodiment]

Figure 8A:
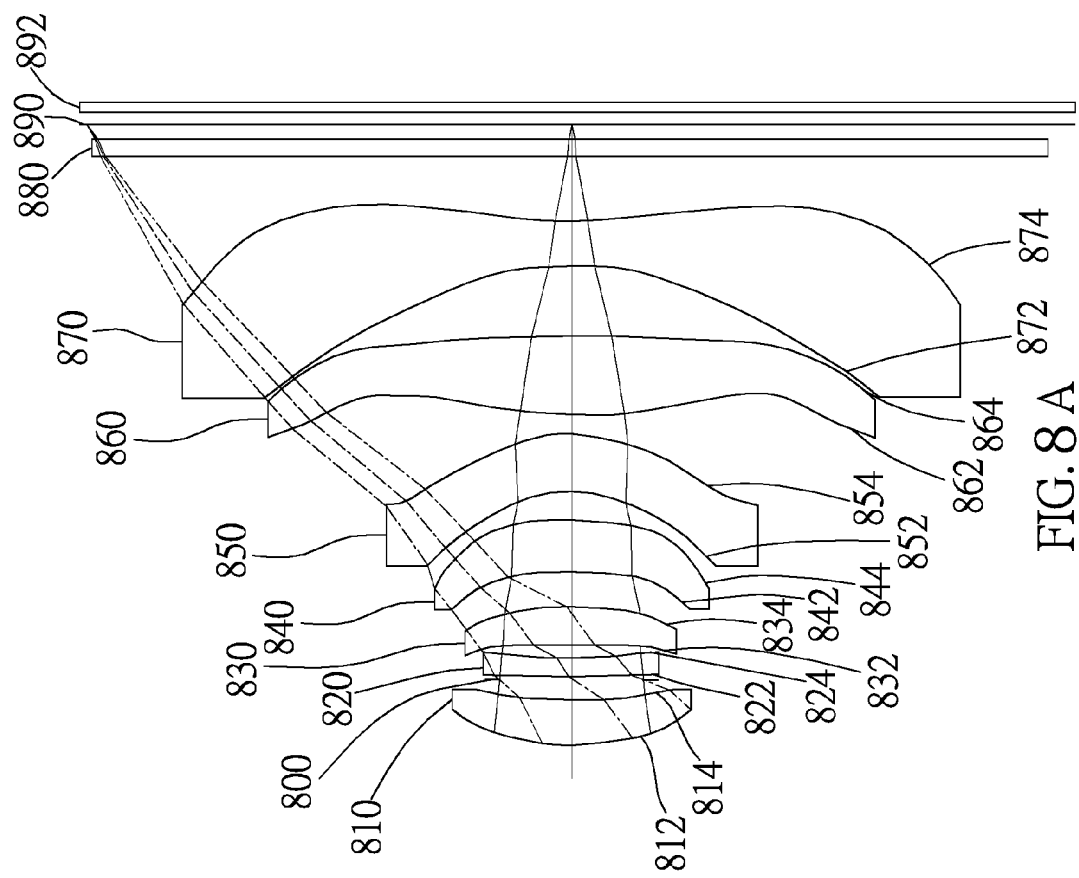
FIG. 8A is a schematic diagram of an eighth embodiment of the present invention.
Figure 8B:
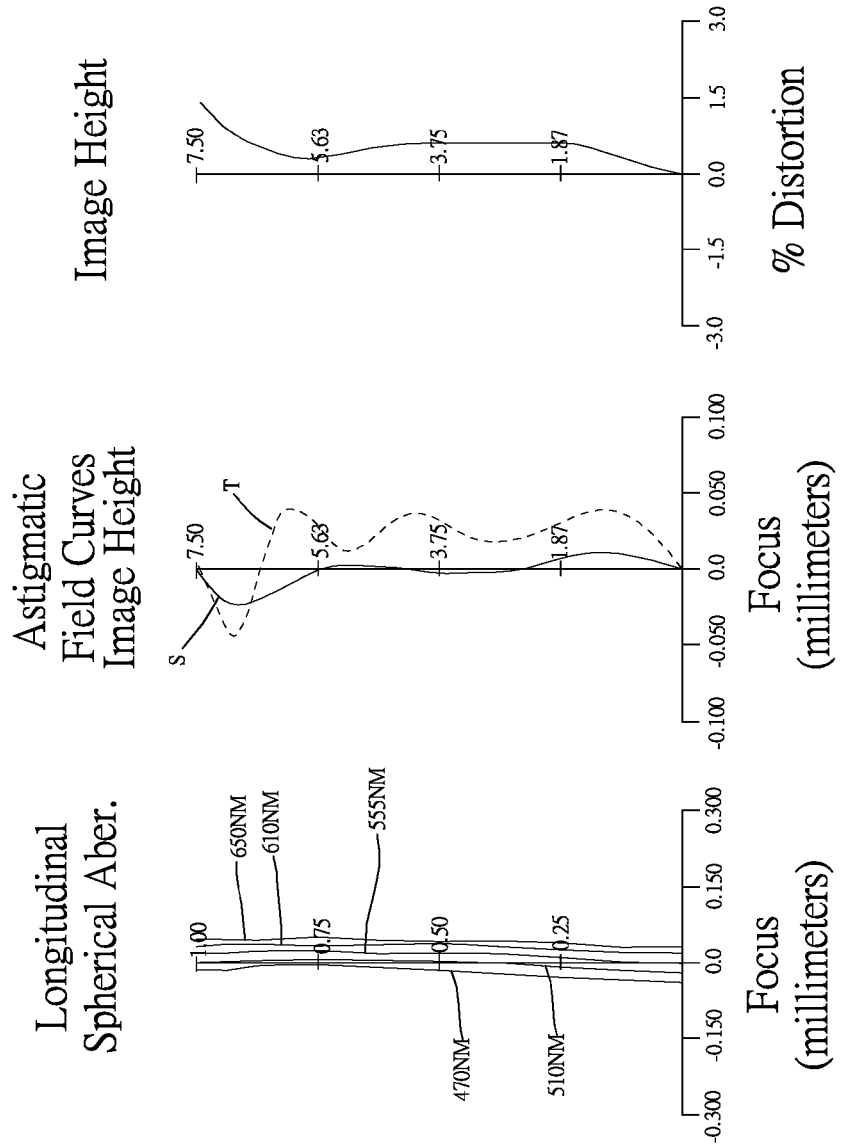
FIG. 8B shows curve diagrams of longitudinal spherical aberration, astigmatic field, and optical distortion of the optical image capturing system in the order from left to right of the eighth embodiment of the present application.

As shown in FIG. 8A and FIG. 8B, an optical image capturing system of the eighth embodiment of the present invention includes, along an optical axis from an object side to an image side, a first lens 810, an aperture 800, a second lens 820, a third lens 830, a fourth lens 840, a fifth lens 850, a sixth lens 860, a seventh lens 870, an infrared rays filter 880, an image plane 890, and an image sensor 892. FIG. 8C shows a modulation transformation of the optical image capturing system 80 of the eighth embodiment of the present application in visible spectrum, and FIG.

The first lens 810 has positive refractive power and is made of plastic. An object-side surface 812, which faces the object side, is a convex aspheric surface, and an image-side surface 814, which faces the image side, is a concave aspheric surface.

The second lens 820 has negative refractive power and is made of plastic. An object-side surface 822 thereof, which faces the object side, is a convex aspheric surface, and an image-side surface 824 thereof, which faces the image side, is a concave aspheric surface. The object-side surface 822 and the image-side surface 824 both have an inflection point.

The third lens 830 has positive refractive power and is made of plastic. An object-side surface 832, which faces the object side, is a convex aspheric surface, and an image-side surface 834, which faces the image side, is a convex aspheric surface. The object-side surface 832 has an inflection point.

The fourth lens 840 has positive refractive power and is made of plastic. An object-side surface 842, which faces the object side, is a concave aspheric surface, and an image-side surface 844, which faces the image side, is a convex aspheric surface. The object-side surface 842 and the image-side surface 844 both have an inflection point.

The fifth lens 850 has negative refractive power and is made of plastic. An object-side surface 852, which faces the object side, is a concave aspheric surface, and an image-side surface 854, which faces the image side, is a convex aspheric surface. The image-side surface 854 has an inflection point.

The sixth lens 860 has positive refractive power and is made of plastic. An object-side surface 862, which faces the object side, is a convex surface, and an image-side surface 864, which faces the image side, is a convex surface. The object-side surface 862 and the image-side surface 864 both have two inflection points. Whereby, the incident angle of each view field entering the sixth lens 860 can be effectively adjusted to improve aberration.

The seventh lens 870 has negative refractive power and is made of plastic. An object-side surface 882, which faces the object side, is a concave surface, and an image-side surface 884, which faces the image side, is a concave surface. The image-side surface 874 has an inflection point. It may help to shorten the back focal length to keep small in size. In addition, it may reduce an incident angle of the light of an off-axis field of view and correct the aberration of the off-axis field of view.

The infrared rays filter 880 is made of glass and between the seventh lens 870 and the image plane 890. The infrared rays filter 880 gives no contribution to the focal length of the system.

The optical image capturing system of the eighth embodiment further satisfies ΣPP=58.8575 mm; and f1/ΣPP=0.2270, where ΣPP is a sum of the focal lengths of each positive lens. It is helpful to share the positive refractive power of one single lens to other positive lenses to avoid the significant aberration caused by the incident rays.

The optical image capturing system of the eighth embodiment further satisfies ΣNP=−151.0523 mm; and f7/ΣNP=0.0333, where ΣNP is a sum of the focal lengths of each negative lens. It is helpful to share the negative refractive power of one single lens to the other negative lens to avoid the significant aberration caused by the incident rays.

The parameters of the lenses of the eighth embodiment are listed in Table 15 and Table 16.

TABLE 15 f = 6.7652 mm; f/HEP = 2.8; HAF = 47.4999 deg

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | 1st lens | 3.971861976 | 0.704 | plastic | 1.543 | 56.50 | 13.358 |
| 2 | | 8.198255892 | 0.329 | | | | |
| 3 | Aperture | plane | 0.026 | | | | |
| 4 | 2nd lens | 5.77169029 | 0.300 | plastic | 1.650 | 21.40 | −44.180 |
| 5 | | 4.713442648 | 0.215 | | | | |
| 6 | 3rd lens | 94.59884361 | 0.616 | plastic | 1.543 | 56.50 | 11.105 |
| 7 | | −6.447953968 | 0.557 | | | | |
| 8 | 4th lens | −8.179862942 | 0.829 | plastic | 1.565 | 58.00 | 25.453 |
| 9 | | −5.411402961 | 0.433 | | | | |
| 10 | 5th lens | −2.026486659 | 0.924 | plastic | 1.650 | 21.40 | −101.838 |
| 11 | | −2.467389187 | 0.312 | | | | |
| 12 | 6th lens | 5.633670908 | 1.253 | plastic | 1.543 | 56.50 | 8.941 |
| 13 | | −33.15343005 | 1.113 | | | | |
| 14 | 7th lens | −5.076660311 | 0.722 | plastic | 1.607 | 26.60 | −5.035 |
| 15 | | 8.230543784 | 1.000 | | | | |
| 16 | Infrared rays filter | plane | 0.300 | BK_7 | 1.517 | 64.2 | |
| 17 | | plane | 0.205 | | | | |
| 18 | Image plane | plane | 0.017 | | | | |

Reference wavelength (d-line): 555 nm.

TABLE 16

Coefficients of the aspheric surfaces

| | Surface | | | | | | |
|---|---|---|---|---|---|---|---|
| | 1 | 2 | 4 | 5 | 6 | 7 | 8 |
| k | 5.195598E−01 | −1.128183E+01 | −1.943087E+01 | 3.467668E−01 | −5.000000E+01 | 1.338720E+01 | 1.761403E+01 |
| A4 | 2.356299E−03 | 2.397565E−03 | −1.680699E−02 | −2.546780E−02 | −7.060172E−03 | −1.007863E−02 | −2.355210E−02 |
| A6 | 6.485149E−04 | 1.229684E−03 | −2.729378E−03 | −3.136590E−03 | −2.003546E−03 | −1.218487E−03 | −9.785530E−04 |
| A8 | 1.170764E−04 | 2.918717E−04 | −2.459869E−04 | 1.932658E−03 | −2.237902E−03 | 7.543922E−04 | −1.852033E−04 |
| A10 | 3.039274E−05 | −1.491091E−04 | 5.676525E−04 | −1.058044E−03 | 1.435439E−04 | −7.355860E−04 | −1.348843E−04 |
| A12 | 6.643196E−07 | −4.266383E−05 | −7.384056E−05 | 1.268094E−04 | 4.255759E−04 | 2.634268E−04 | −1.539980E−05 |
| A14 | −2.883111E−06 | 9.237416E−05 | −1.409057E−05 | 4.839477E−05 | −2.015694E−04 | 2.011329E−05 | 1.121679E−05 |
| A16 | 1.624359E−06 | −2.281995E−05 | −1.202828E−05 | 3.364385E−06 | 1.861152E−05 | −3.268269E−06 | 5.139585E−06 |

| | Surface | | | | | | |
|---|---|---|---|---|---|---|---|
| | 9 | 10 | 11 | 12 | 13 | 14 | 15 |
| k | 4.494834E+00 | −2.599360E−01 | −5.817157E−01 | −1.432572E+00 | 3.780652E+01 | −3.317069E−02 | −5.648669E+00 |
| A4 | −1.496778E−02 | 2.840014E−02 | 1.192087E−02 | −1.085707E−02 | −8.701398E−03 | −5.652365E−03 | −5.333227E−03 |
| A6 | −1.207485E−03 | −5.261084E−03 | −2.232665E−03 | 1.702507E−03 | 2.912311E−03 | 1.558055E−03 | 4.182781E−04 |
| A8 | −1.928552E−04 | 1.084879E−03 | 5.252541E−04 | −2.142161E−04 | −3.841236E−04 | −1.631492E−04 | −2.906249E−05 |
| A10 | −7.621215E−05 | −9.710755E−05 | −4.639259E−05 | 1.251520E−05 | 2.474808E−05 | 9.896558E−06 | 1.305194E−06 |
| A12 | 1.195672E−05 | 1.741965E−05 | 3.509831E−06 | −3.632770E−07 | −8.486325E−07 | −3.366865E−07 | −3.626114E−08 |
| A14 | −8.617708E−07 | 7.804099E−08 | −1.504508E−07 | 6.388220E−09 | 1.487244E−08 | 5.983719E−09 | 5.528456E−10 |
| A16 | 2.229654E−07 | −1.196294E−08 | −2.297951E−09 | −7.540487E−11 | −1.059054E−10 | −4.339767E−11 | −3.536156E−12 |

An equation of the aspheric surfaces of the eighth embodiment is the same as that of the first embodiment, and the definitions are the same as well.

The exact parameters of the eighth embodiment based on Table 15 and Table 16 are listed in the following table:

Eighth embodiment (Reference wavelength: 555 nm)

| ETP1 | ETP2 | ETP3 | ETP4 | ETP5 | ETP6 |
|---|---|---|---|---|---|
| 0.618 | 0.328 | 0.502 | 0.804 | 0.972 | 1.131 |

Eighth embodiment (Reference wavelength: 555 nm)

| ETP7 | ETL | EBL | EIN | EIR | PIR |
|---|---|---|---|---|---|
| 0.916 | 9.692 | 1.457 | 8.235 | 0.934 | 1.000 |

| EIN/ETL | SETP/EIN | EIR/PIR | SETP | STP | SETP/STP |
|---|---|---|---|---|---|
| 0.850 | 0.640 | 0.934 | 5.270 | 5.348 | 0.985 |

| ETP1/TP1 | ETP2/TP2 | ETP3/TP3 | ETP4/TP4 | ETP5/TP5 | ETP6/TP6 |
|---|---|---|---|---|---|
| 0.877 | 1.092 | 0.816 | 0.969 | 1.051 | 0.903 |

-continued

Eighth embodiment (Reference wavelength: 555 nm)

| ETP7/TP7 | BL | EBL/BL | SED | SIN | SED/SIN |
|---|---|---|---|---|---|
| 1.269 | 1.523 | 0.9567 | 2.965 | 2.985 | 0.993 |
| ED12 | ED23 | ED34 | ED45 | ED56 | ED67 |
| 0.340 | 0.113 | 0.561 | 0.292 | 0.647 | 1.012 |
| ED12/IN12 | ED23/IN23 | ED34/IN34 | ED45/IN45 | ED56/IN56 | ED67/IN67 |
| 0.958 | 0.524 | 1.007 | 0.676 | 2.069 | 0.909 |
| \|f/f1\| | \|f/f2\| | \|f/f3\| | \|f/f4\| | \|f/f5\| | \|f/f6\| |
| 0.5065 | 0.1531 | 0.6092 | 0.2658 | 0.0664 | 0.7566 |
| \|f/f7\| | ΣPPR | ΣNPR | ΣPPR/\|ΣNPR\| | IN12/f | IN67/f |
| 1.3438 | 2.1381 | 1.5633 | 1.3676 | 0.0525 | 0.1645 |
| \|f1/f2\| | \|f2/f3\| | (TP1 + IN12)/TP2 | | (TP7 + IN67)/TP6 | |
| 0.3024 | 3.9784 | 3.5329 | | 1.4635 | |
| HOS | InTL | HOS/HOI | InS/HOS | ODT % | TDT % |
| 9.8561 | 8.3336 | 1.3142 | 0.8951 | 1.4318 | 1.0977 |
| HVT11 | HVT12 | HVT21 | HVT22 | HVT31 | HVT32 |
| 0.0000 | 0.0000 | 0.0000 | 0.0000 | 0.5599 | 0.0000 |
| HVT61 | HVT62 | HVT71 | HVT72 | HVT72/HOI | HVT72/HOS |
| 2.7508 | 0.0000 | 0.0000 | 3.0221 | 0.4029 | 0.3066 |
| MTFE0 | MTFE3 | MTFE7 | MTFQ0 | MTFQ3 | MTFQ7 |
| 0.85 | 0.86 | 0.8 | 0.63 | 0.67 | 0.53 |

The results of the equations of the eighth embodiment based on Table 15 and Table 16 are listed in the following table:

Values related to the inflection points of the eighth embodiment
(Reference wavelength: 555nm)

| HIF211 | 0.7069 | HIF211/HOI | 0.0943 | SGI211 | 0.0361 | \|SGI211\|/(\|SGI211\| + TP2) | 0.1074 |
|---|---|---|---|---|---|---|---|
| HIF221 | 0.8103 | HIF221/HOI | 0.1080 | SGI221 | 0.0587 | \|SGI221\|/(\|SGI221\| + TP2) | 0.1637 |
| HIF311 | 0.3368 | HIF311/HOI | 0.0449 | SGI311 | 0.0005 | \|SGI311\|/(\|SGI311\| + TP3) | 0.0008 |
| HIF521 | 1.9895 | HIF521/HOI | 0.2653 | SGI521 | −0.7223 | \|SGI521\|/(\|SGI521\| + TP5) | 0.4387 |
| HIF611 | 1.6840 | HIF611/HOI | 0.2245 | SGI611 | 0.1891 | \|SGI611\|/(\|SGI611\| + TP6) | 0.1311 |
| HIF612 | 3.9045 | HIF612/HOI | 0.5206 | SGI612 | −0.0249 | \|SGI612\|/(\|SGI612\| + TP6) | 0.0195 |
| HIF621 | 1.6440 | HIF621/HOI | 0.2192 | SGI621 | −0.0651 | \|SGI621\|/(\|SGI621\| + TP6) | 0.0494 |
| HIF622 | 2.3170 | HIF622/HOI | 0.3089 | SGI622 | −0.1126 | \|SGI622\|/(\|SGI622\| + TP6) | 0.0824 |
| HIF721 | 1.5156 | HIF721/HOI | 0.2021 | SGI721 | 0.1106 | \|SGI721\|/(\|SGI721\| + TP7) | 0.1329 |

It must be pointed out that the embodiments described above are only some embodiments of the present invention. All equivalent structures which employ the concepts disclosed in this specification and the appended claims should fall within the scope of the present invention.

What is claimed is:

1. An optical image capturing system, in order along an optical axis from an object side to an image side, comprising:
    a first lens having refractive power;
    a second lens having refractive power;
    a third lens having refractive power;
    a fourth lens having refractive power;
    a fifth lens having refractive power;
    a sixth lens having refractive power;
    a seventh lens having refractive power; and
    an image plane;
    wherein the optical image capturing system consists of the seven lenses with refractive power; a maximum height for image formation perpendicular to the optical axis on the image plane is denoted as HOI; at least one lens among the first to the third lenses has positive refractive power; at least one lens among the fourth to the seventh lenses has positive refractive power; each lens of the first to the seventh lenses has an object-side surface, which faces the object side, and an image-side surface, which faces the image side;
    wherein the optical image capturing system satisfies:

$1.4 \leq f/HEP \leq 10.0$;

$0 \deg < HAF \leq 150 \deg$; and $0.5 \leq SETP/STP < 1$;

where f1, f2, f3, f4, f5, f6, and f7 are focal lengths of the first lens to the seventh lens, respectively; f is a focal length of the optical image capturing system; HEP is an entrance pupil diameter of the optical image capturing system; HOS is a distance on the optical axis between a point on an object-side surface of the first lens where the optical axis passes through and a point on the image plane where the optical axis passes through; InTL is a distance from the object-side surface of the first lens to the image-side surface of the seventh lens; HAF is a half of a maximum field angle of the optical image capturing system; ETP1, ETP2, ETP3, ETP4, ETP5, ETP6, and ETP7 are respectively a thickness at the height of ½ HEP of the first lens, the second lens, the third lens, the fourth lens, the fifth lens, the sixth lens, and the seventh lens; SETP is a sum of the aforementioned ETP1 to ETP7; TP1, TP2, TP3, TP4, TP5, TP6, and TP7 are respectively a thickness of the first lens, the second lens, the third lens, the fourth lens, the fifth lens, the sixth lens, and the seventh lens on the optical axis; STP is a sum of the aforementioned TP1 to TP7.

2. The optical image capturing system of claim 1, wherein the optical image capturing system further satisfies:

$0.2 \leq EIN/ETL < 1$;

where ETL is a distance in parallel with the optical axis between a coordinate point at a height of ½ HEP on the object-side surface of the first lens and the image plane; EIN is a distance in parallel with the optical axis between the coordinate point at the height of ½ HEP on the object-side surface of the first lens and a coordinate point at a height of ½ HEP on the image-side surface of the seventh lens.

3. The optical image capturing system of claim 2, wherein the optical image capturing system further satisfies:

$0.3 \leq SETP/EIN < 1$.

4. The optical image capturing system of claim 1, further comprising a filtering component provided between the seventh lens and the image plane, wherein the optical image capturing system further satisfies:

$0.1 \leq EIR/PIR \leq 1.1$;

where EIR is a horizontal distance in parallel with the optical axis between the coordinate point at the height of ½ HEP on the image-side surface of the seventh lens and the filtering component; PIR is a horizontal distance in parallel with the optical axis between a point on the image-side surface of the seventh lens where the optical axis passes through and the filtering component.

5. The optical image capturing system of claim 1, wherein at least one lens among the first lens to the third lens has negative refractive power.

6. The optical image capturing system of claim 1, wherein the optical image capturing system further satisfies:

$MTFE0 \geq 0.2$;

$MTFE3 \geq 0.01$; and $MTFE7 \geq 0.01$;

where MTFE0, MTFE3, and MTFE7 are respectively a value of modulation transfer function of visible light in a spatial frequency of 55 cycles/mm at the optical axis, 0.3 HOI, and 0.7 HOI on an image plane.

7. The optical image capturing system of claim 1, wherein the optical image capturing system further satisfies:

$30 \deg < HAF \leq 70 \deg$.

8. The optical image capturing system of claim 1, wherein the optical image capturing system further satisfies:

$0.1 \leq EBL/BL \leq 1.1$;

where EBL is a horizontal distance in parallel with the optical axis between a coordinate point at the height of ½ HEP on the image-side surface of the seventh lens and image surface; BL is a horizontal distance in parallel with the optical axis between the point on the image-side surface of the seventh lens where the optical axis passes through and the image plane.

9. The optical image capturing system of claim 1, further comprising an aperture and an image sensor, wherein the image sensor is provided on the image plane; the optical image capturing system further satisfies:

$0.1 \leq InS/HOS \leq 1.1$; and $0 \leq HIF/HOI \leq 0.9$;

where InS is a distance in parallel with the optical axis between the aperture and the image plane.

10. An optical image capturing system, in order along an optical axis from an object side to an image side, comprising:
a first lens having refractive power;
a second lens having refractive power;
a third lens having refractive power;
a fourth lens having refractive power;
a fifth lens having refractive power;
a sixth lens having refractive power;
a seventh lens having refractive power; and
an image plane;

wherein the optical image capturing system consists of the seven lenses with refractive power; at least one lens among the first to the third lenses has positive refractive power; at least one lens among the fourth to the seventh lenses has positive refractive power; at least a surface of each of at least two lenses among the first lens to the seventh lens has at least an inflection point thereon; a maximum height for image formation perpendicular to the optical axis on the image plane is denoted as HOI; each lens among the first to the seventh lenses has an object-side surface, which faces the object side, and an image-side surface, which faces the image side;

wherein the optical image capturing system satisfies:

$1.4 \leq f/HEP \leq 10.0$;

$0 \deg < HAF \leq 150 \deg$; and $0.2 \leq EIN/ETL < 1$;

where f1, f2, f3, f4, f5, f6, and f7 are focal lengths of the first lens to the seventh lens, respectively; f is a focal length of the optical image capturing system; HEP is an entrance pupil diameter of the optical image capturing system; HOS is a distance on the optical axis between a point on an object-side surface of the first lens where the optical axis passes through and a point on the image plane where the optical axis passes through; InTL is a distance from the object-side surface of the first lens to the image-side surface of the seventh lens; HAF is a half of the maximum field angle of the optical image capturing system; ETL is a distance in parallel with the optical axis between a coordinate point at a height of ½ HEP on the object-side surface of the first lens and the image plane; EIN is a distance in parallel with the optical axis between the coordinate point at the height of ½ HEP on the object-side surface of the first lens and a coordinate point at a height of ½ HEP on the image-side surface of the seventh lens.

11. The optical image capturing system of claim 10, wherein the optical image capturing system further satisfies:

$0 < ED67/IN67 \leq 50$;

where ED67 is a horizontal distance between the sixth lens and the seventh lens at the height of ½ HEP; IN67 is a horizontal distance between the sixth lens and the seventh lens on the optical axis.

12. The optical image capturing system of claim 10, wherein the optical image capturing system further satisfies:

$0 < ED12/IN12 \leq 35$;

where ED12 is a horizontal distance between the first lens and the second lens at the height of ½ HEP; IN12 is a horizontal distance between the first lens and the second lens on the optical axis.

13. The optical image capturing system of claim 10, wherein the optical image capturing system further satisfies:

$0 < ETP2/TP2 \leq 3$;

where ETP2 is a thickness of the second lens at the height of ½ HEP in parallel with the optical axis; TP2 is a thickness of the second lens on the optical axis.

14. The optical image capturing system of claim 10, wherein the optical image capturing system further satisfies:

$0 < ETP6/TP6 \leq 3$;

where ETP6 is a thickness of the sixth lens at the height of ½ HEP in parallel with the optical axis; TP6 is a thickness of the sixth lens on the optical axis.

15. The optical image capturing system of claim 10, wherein the optical image capturing system further satisfies:

$0 < ETP7/TP7 \le 5;$ where ETP7 is a thickness of the seventh lens at the height of ½ HEP in parallel with the optical axis; TP7 is a thickness of the seventh lens on the optical axis.

16. The optical image capturing system of claim 10, wherein the optical image capturing system further satisfies:

$0 < IN12/f \le 60;$ where IN12 is a distance on the optical axis between the first lens and the second lens.

17. The optical image capturing system of claim 10, wherein the optical image capturing system further satisfies:

$MTFI0 \ge 0.01;$ $MTFI3 \ge 0.01;$ and $MTFI7 \ge 0.01;$ where MTFI0, MTFI3, and MTFI7 are respectively values of modulation transfer function for an infrared of wavelength of 850 nm in a spatial frequency of 55 cycles/mm at the optical axis, 0.3 HOI, and 0.7 HOI on the image plane.

18. The optical image capturing system of claim 10, wherein the optical image capturing system further satisfies:

$MTFQ0 \ge 0.2;$ $MTFQ3 \ge 0.01;$ and $MTFQ7 \ge 0.01$ where HOI is a maximum height for image formation perpendicular to the optical axis on the image plane; MTFQ0, MTFQ3, and MTFQ7 are respectively values of modulation transfer function of visible light in a spatial frequency of 110 cycles/mm at the optical axis, 0.3 HOI, and 0.7 HOI on the image plane.

19. The optical image capturing system of claim 10, wherein at least one lens among the first lens to the seventh lens is a light filter, which is capable of filtering out light of wavelengths shorter than 500 nm.

20. An optical image capturing system, in order along an optical axis from an object side to an image side, comprising:
 a first lens having refractive power;
 a second lens having refractive power;
 a third lens having refractive power;
 a fourth lens having refractive power;
 a fifth lens having refractive power;
 a sixth lens having refractive power;
 a seventh lens having refractive power; and
 an image plane;
 wherein the optical image capturing system consists of the seven lenses having refractive power; at least one lens among the first to the third lens has positive refractive power; at least one lens among the fourth lens to the seventh lens has positive refractive power; at least a surface of each of at least three lenses among the first lens to the seventh lens has at least an inflection point thereon; the a maximum height for image formation perpendicular to the optical axis on the image plane is denoted as HOI; each lens of the first to the seventh lenses has an object-side surface, which faces the object side, and an image-side surface, which faces the image side;
 wherein the optical image capturing system satisfies:

$1.4 \le f/HEP \le 10;$ $0 \deg < HAF \le 100 \deg;$ and $0.2 \le EIN/ETL < 1;$ where f1, f2, f3, f4, f5, f6, and f7 are focal lengths of the first lens to the seventh lens, respectively; f is a focal length of the optical image capturing system; HEP is an entrance pupil diameter of the optical image capturing system; HAF is a half of a maximum field angle of the optical image capturing system; HOS is a distance on the optical axis between a point on an object-side surface of the first lens where the optical axis passes through and a point on the image plane where the optical axis passes through; ETL is a distance in parallel with the optical axis between a coordinate point at a height of ½ HEP on the object-side surface of the first lens and the image plane; EIN is a distance in parallel with the optical axis between the coordinate point at the height of ½ HEP on the object-side surface of the first lens and a coordinate point at a height of ½ HEP on the image-side surface of the seventh lens.

21. The optical image capturing system of claim 20, wherein the optical image capturing system further satisfies:

$0.1 \le EBL/BL \le 1.1;$ where EBL is a horizontal distance in parallel with the optical axis between a coordinate point at the height of ½ HEP on the image-side surface of the seventh lens and image surface; BL is a horizontal distance in parallel with the optical axis between the point on the image-side surface of the seventh lens where the optical axis passes through and the image plane.

22. The optical image capturing system of claim 21, wherein the optical image capturing system further satisfies:

$0 < ED67/IN67 \le 50;$ where ED67 is a horizontal distance between the sixth lens and the seventh lens at the height of ½ HEP; IN67 is a horizontal distance between the sixth lens and the seventh lens on the optical axis.

23. The optical image capturing system of claim 20, wherein the optical image capturing system further satisfies:

$0 < IN67/f \le 5.0;$ where IN67 is a horizontal distance between the sixth lens and the seventh lens on the optical axis.

24. The optical image capturing system of claim 23, wherein the optical image capturing system further satisfies:

$0 \text{ mm} < HOS \le 80 \text{ mm}.$

25. The optical image capturing system of claim 23, further comprising an aperture, an image sensor, and a driving module, wherein the image sensor is disposed on the image plane; the driving module is coupled with the lenses to move the lenses; the optical image capturing system further satisfies:

$0.1 \le InS/HOS \le 1.1;$ where InS is a distance in parallel with the optical axis between the aperture and the image plane.

\* \* \* \* \*